US007375716B2

(12) United States Patent
Toriumi et al.

(10) Patent No.: US 7,375,716 B2
(45) **Date of Patent: *May 20, 2008**

(54) DISPLAY DRIVER AND ELECTRO-OPTICAL DEVICE

(75) Inventors: Yuichi Toriumi, Chino (JP); Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 676 days.

This patent is subject to a terminal disclaimer.

(21) Appl. No.: 10/790,692

(22) Filed: Mar. 3, 2004

(65) Prior Publication Data

US 2004/0239603 A1 Dec. 2, 2004

(30) Foreign Application Priority Data

Mar. 11, 2003 (JP) ............................ 2003-065462

(51) Int. Cl.
*G09G 3/36* (2006.01)
*G09G 5/00* (2006.01)
*H04N 3/14* (2006.01)

(52) U.S. Cl. ............................ 345/99; 345/89; 345/98; 345/100; 345/204; 345/690; 348/793

(58) Field of Classification Search .................. 345/55, 345/89, 92, 98, 99, 100, 103, 204, 690; 348/793
See application file for complete search history.

(56) References Cited

U.S. PATENT DOCUMENTS

| | | | | |
|---|---|---|---|---|
| 4,481,511 | A * | 11/1984 | Hanmura et al. | 345/100 |
| 6,333,730 | B1 * | 12/2001 | Lee | 345/100 |
| 6,791,521 | B2 * | 9/2004 | Isami et al. | 345/89 |
| 6,909,417 | B2 * | 6/2005 | Washio et al. | 345/98 |
| 7,173,596 | B2 | 2/2007 | Toriumi et al. | |
| 7,199,779 | B2 | 4/2007 | Toriumi et al. | |
| 2003/0020702 | A1 * | 1/2003 | Matsuyama | 345/204 |
| 2004/0227744 | A1 | 11/2004 | Toriumi et al. | |
| 2004/0233184 | A1 | 11/2004 | Toriumi et al. | |
| 2005/0001803 | A1 * | 1/2005 | Morita et al. | 345/89 |
| 2005/0001858 | A1 | 1/2005 | Morita et al. | |

FOREIGN PATENT DOCUMENTS

| | | |
|---|---|---|
| JP | A-61-223791 | 4/1986 |
| JP | A-64-086774 | 3/1989 |
| JP | A-04-052684 | 2/1992 |
| JP | A-04-281429 | 10/1992 |
| JP | A-2000-193929 | 7/2000 |
| JP | A-2000-322017 | 11/2000 |
| JP | A-2001-051656 | 2/2001 |

* cited by examiner

*Primary Examiner*—My-Chau T. Tran
(74) *Attorney, Agent, or Firm*—Oliff & Berridge, PLC

(57) ABSTRACT

A display driver which drives a plurality of data lines of an electro-optical device includes a capture start timing setting register in which is set a period between a changing time of a given capture start timing instruction signal and a staring time of capturing the gray-scale data, and shift start signal generation circuit which generates a shift start signal based on a setting state of the capture start timing setting register. The display driver includes a shift register which shifts the shift start signal based on a given shift clock signal, and outputs a shift output, and a data latch which includes a plurality of flip-flops, each of which holds the gray-scale data based on the shift output from the shift register, and outputs a data signal corresponding to the gray-scale data held in the data latch to the data lines.

28 Claims, 35 Drawing Sheets

FIG. 29

| MULTIPLEX | NUMBER OF CLOCK SIGNALS | FIRST GROUP | | SECOND GROUP | |
|---|---|---|---|---|---|
| | | FIRST CLOCK SIGNAL LINE | SECOND CLOCK SIGNAL LINE | FIRST CLOCK SIGNAL LINE | SECOND CLOCK SIGNAL LINE |
| 3 | EVEN NUMBER | CLK1 | CLK2 | — | — |
| | ODD NUMBER | CLK2 | CLK1 | — | — |
| 6 | $4 \times n$ | CLK1 | CLK3 | CLK2 | CLK4 |
| | $4 \times n+1$ | CLK2 | CLK4 | CLK3 | CLK1 |
| | $4 \times n+2$ | CLK3 | CLK1 | CLK4 | CLK2 |
| | $4 \times n+3$ | CLK4 | CLK2 | CLK1 | CLK3 |

DISPLAY DRIVER AND ELECTRO-OPTICAL DEVICE

Japanese Patent Application No. 2003-65462, filed on Mar. 11, 2003, is hereby incorporated by reference in its entirety.

BACKGROUND OF THE INVENTION

The present invention relates to a display driver and an electro-optical device.

A display panel (electro-optical device or display device in a broad sense) represented by a liquid crystal display (LCD) panel is mounted on a portable telephone or a personal digital assistant (PDA). In particular, the LCD panel realizes a reduction of size, power consumption, and cost in comparison with other display panels, and is mounted on various electronic instruments.

BRIEF SUMMARY OF THE INVENTION

One aspect of the present invention relates to a display driver which drives a plurality of data lines of an electro-optical device which includes a plurality of pixels, a plurality of scan lines, and the data lines, the display driver comprising:

a gray-scale bus to which gray-scale data is supplied;

a capture start timing setting register in which is set a period between a changing time of a given capture start timing instruction signal and a staring time of capturing the gray-scale data;

a shift start signal generation circuit which generates a shift start signal based on a setting state of the capture start timing setting register;

a shift register which includes a plurality of flip-flops, shifts the shift start signal based on a given shift clock signal, and outputs a shift output from each of the flip-flops;

a data latch which includes a plurality of flip-flops, each of which holds the gray-scale data on the gray-scale bus based on the shift output from the shift register; and a data line driver circuit which outputs a data signal corresponding to the gray-scale data held in the data latch to the data lines.

Another aspect of the present invention relates to a display driver which drives a plurality of data signal supply lines of an electro-optical device which includes a plurality of pixels, a plurality of scan lines, a plurality of data lines, the data signal supply lines, and a plurality of demultiplexers, the data lines including data line groups alternately distributed inward from two opposite sides of the electro-optical device in a shape of comb teeth, each of the data line groups consisting of 3×N numbers of the data lines (N is a natural number), each of the data signal supply lines transmitting multiplexed data in which N set of data signals for first to third color components is multiplexed, and each of the demultiplexers demultiplexing the multiplexed data and outputting one of the data signals for the first to third color components to each of the 3×N data lines, the display driver comprising:

a gray-scale bus to which gray-scale data for one of the first to third color components is supplied corresponding to an arrangement order of each of the data lines;

N first clock signal line being provided with one of 2×N shift clock signals and belonging to one of first to N-th groups;

N second clock signal line being provided with one of the 2×N shift clock signals and belonging to one of the first to N-th groups;

a capture start timing setting register in which is set a period between a changing time of a given capture start timing instruction signal and a staring time of capturing the gray-scale data;

a shift start signal generation circuit which generates a shift start signal based on a setting state of the capture start timing setting register;

a shift clock signal assignment circuit which assigns and outputs each of the 2×N shift clock signals to one of the first clock signal lines and one of the second clock signal lines based on a setting state of the capture start timing setting register;

N first shift register including a plurality of flip-flops, shifting the shift start signal in a first shift direction based on one of the shift clock signals, outputting a shift output from each of the flip-flops, and belonging to one of the first to N-th groups;

N second shift register including a plurality of flip-flops, shifting the shift start signal in a second shift direction opposite to the first direction based on one of the shift clock signals, outputting a shift output from each of the flip-flops in the second shift register, and belonging to one of the first to N-th groups;

N first data latch holding the gray-scale data on the gray-scale bus based on the shift output from the first shift register and belonging to one of the first to N-th groups;

N second data latch holding the gray-scale data on the gray-scale bus based on the shift output from the second shift register and belonging to one of the first to N-th groups;

a multiplexer which generates first multiplexed data in which N set of the gray-scale data held in the first data latch is multiplexed and second multiplexed data in which N set of the gray-scale data held in the second data latch is multiplexed; and a data-signal-supply-line driver circuit in which a plurality of data output sections are disposed corresponding to the arrangement order of each of the data lines, each of the data output sections outputting a data signal corresponding to the first or second multiplexed data to one of the data signal supply lines, wherein the first shift register belonging to a j-th group ($1 \leqq j \leqq N$, j is an integer) among the first to N-th groups outputs the shift output based on one of the shift clock signals on the first clock signal line belonging to the j-th group, wherein the second shift register belonging to the j-th group outputs the shift output based on one of the shift clock signals on the second clock signal line belonging to the j-th group, wherein the first data latch belonging to the j-th group holds the gray-scale data based on the shift output from the first shift register belonging to the j-th group, and wherein the second data latch belonging to the j-th group holds the gray-scale data based on the shift output from the second shift register belonging to the j-th group.

BRIEF DESCRIPTION OF THE SEVERAL VIEWS OF THE DRAWING

FIG. 29 is an explanatory diagram of an assignment example of first to 2N-th shift clock signals by a shift clock signal assignment circuit.

DETAILED DESCRIPTION OF THE EMBODIMENT

Figure 1:
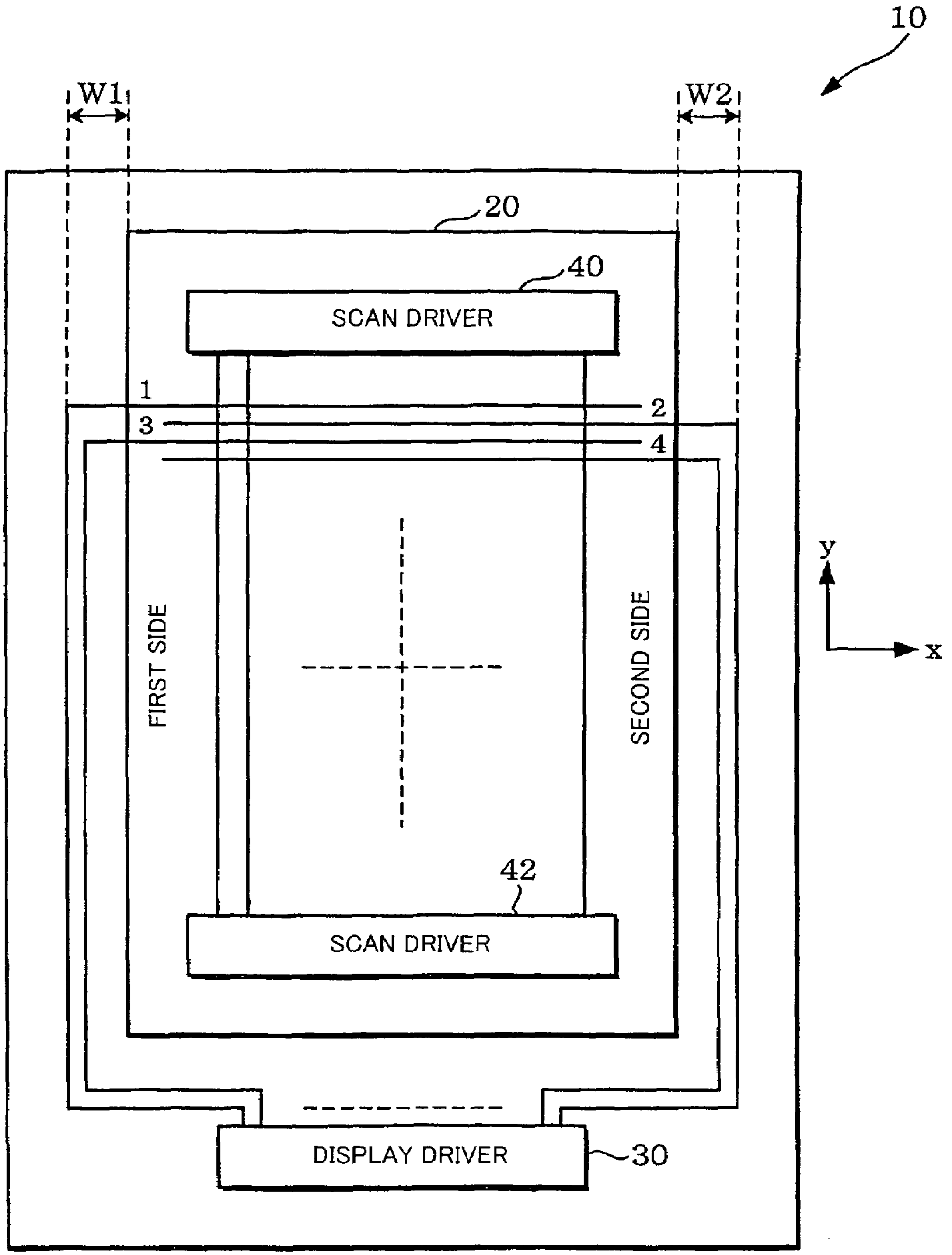
FIG. 1 is a block diagram schematically showing a configuration of an electro-optical device in an embodiment of the present invention.

Embodiments of the present invention are described below. Note that the embodiments described hereunder do not in any way limit the scope of the invention defined by the claims laid out herein. Note also that all of the elements described below should not be taken as essential requirements for the present invention.

An LCD panel is required to have a size equal to or greater than a certain size taking visibility of an image to be displayed into consideration. On the other hand, there has been a demand that the mounting area of the LCD panel be as small as possible when the LCD panel is mounted on an electronic instrument. As an LCD panel which can reduce the mounting area, a so-called comb-tooth distributed LCD panel has been known.

In order to reduce the mounting area of the LCD panel, it is effective to reduce the interconnect region between the LCD panel and a scan driver which drives scan lines of the LCD panel, or to reduce the interconnect region between the LCD panel and a display driver which drives data lines of the LCD panel.

A reduction of the size and weight and an increase in image quality have been demanded for electronic instruments on which the LCD panel is mounted. Therefore, a further reduction of the LCD panel size and the pixel size has been in demand. As a solution to satisfy such a demand, a technology for forming an LCD panel by using a low temperature polysilicon (hereinafter abbreviated as "LTPS") process has been studied.

According to the LTPS process, a driver circuit and the like can be directly formed on a panel substrate (glass substrate, for example) on which a pixel including a switching device (thin film transistor (TFT), for example) and the like is formed. This enables the number of parts to be decreased, whereby the size and weight of the display panel can be reduced. Moreover, LTPS enables the pixel size to be reduced by applying a conventional silicon process technology while maintaining the aperture ratio. Furthermore, LTPS has high charge mobility and small parasitic capacitance in comparison with amorphous silicon (a-Si). Therefore, a charging period for the pixel formed on the substrate can be secured even if the pixel select period per pixel is reduced due to an increase in the screen size, whereby the image quality can be improved.

Therefore, the LCD panel size can be reduced due to a reduction of the mounting area and the image quality can be improved by comb-tooth distributing the scan lines or the data lines of the LCD panel formed by using the LTPS process.

However, in the case where a display driver drives the data lines of the comb-tooth distributed LCD panel from two opposite sides of the LCD panel, it is necessary to change the order of gray-scale data which is supplied corresponding to the arrangement order of the data lines in a conventional LCD panel.

A conventional display driver cannot change the order of gray-scale data supplied corresponding to the data lines. Therefore, a dedicated data scramble IC must be added when driving the comb-tooth distributed LCD panel by using a conventional display driver.

In the LCD panel formed by using the LTPS process, a demultiplexer which connects one data signal supply line with one of the data lines for each color which can be connected with a set of pixel electrodes for R, G, and B (first to third color components which make up one pixel) is provided. In this case, data signals for R, G, and B are transmitted on the data signal supply line by time division by utilizing the high charge mobility of LTPS. The data signals for each color component are sequentially shifted and output to the data lines by the demultiplexer in the select period of the pixel, and written into the pixel electrodes provided for each color component. According to this configuration, the number of terminals for outputting the data signals to the data signal supply line from the driver can be reduced. Therefore, it is possible to deal with an increase in the number of data lines accompanying a reduction of the pixel size without being restricted by the pitch between the terminals.

A demand for an LCD panel in which a plurality of sets of data lines, besides one set of data lines, are comb-tooth distributed is expected to increase. In this case, the display driver must multiplex the data signals for (3×N) dots (N is a natural number), and output the multiplexed data signals to the data signal supply line of the LCD panel (3N-dot multiplex drive).

However, in the case of performing 3N-dot multiplex drive, it does not suffice to merely increase the degree of multiplexing. Specifically, the data scramble method differs depending on the number N of sets of data lines of the comb-tooth distributed LCD panel.

Moreover, the period until the gray-scale data is actually supplied to the display driver after the signal indicating the starting time of capturing the gray-scale data to the display driver has changed depends on the type of controller and is not constant. Therefore, in the case of driving the comb-tooth distributed LCD panel, the capture order of the gray-scale data goes wrong.

According to the following embodiments, a display driver which drives the data lines independent of the supply timing of the gray-scale data and an electro-optical device including the display driver can be provided.

Moreover, according to the following embodiments, a display driver which can perform 3N-dot multiplex drive for a comb-tooth distributed display panel independent of the supply timing of the gray-scale data and an electro-optical device including the display driver can be provided.

The embodiments of the present invention are described below in detail with reference to the drawings.

1. Electro-optical Device

FIG. 1 shows an outline of a configuration of an electro-optical device. FIG. 1 shows a liquid crystal device as an example of an electro-optical device. A liquid crystal device may be incorporated in various electronic instruments such as a portable telephone, portable information instrument (PDA or the like), digital camera, projector, portable audio player, mass storage device, video camera, electronic notebook, or global positioning system (GPS).

A liquid crystal device 10 includes an LCD panel 20 (display panel in a broad sense), a display driver 30 (source driver), and scan drivers 40 and 42 (gate drivers).

The liquid crystal device 10 does not necessarily include all of these circuit blocks. The liquid crystal device 10 may have a configuration in which part of the circuit blocks is omitted.

The LCD panel 20 includes a plurality of scan lines (gate lines), a plurality of data lines (source lines) which intersect the scan lines, and a plurality of pixels, each of the pixels being specified by one of the scan lines and one of the data lines. In the case where one pixel consists of three color components of RGB, one pixel consists of three dots, one dot each for red, green, and blue. The dot may be referred to as an element point which makes up each pixel. The data lines corresponding to one pixel may be referred to as data lines for the number of color components which make up one pixel.

Each pixel includes a thin film transistor (hereinafter abbreviated as "TFT") (switching device) and a pixel electrode. The TFT is connected with the data line, and the pixel electrode is connected with the TFT.

The LCD panel 20 is formed on a panel substrate such as a glass substrate. A plurality of scan lines, arranged in the x direction in FIG. 1 and extending in the y direction, and a plurality of data lines, arranged in the y direction and extending in the x direction, are disposed on the panel substrate. In the LCD panel 20, the data lines are comb-tooth distributed. In FIG. 1, the data lines are comb-tooth distributed so as to be driven from a first side of the LCD panel 20 and a second side which faces the first side. The comb-tooth distribution may be referred to as a distribution in which a given number of data lines (one or a plurality of data lines) are alternately distributed from two opposite sides (first and second sides of the LCD panel 20) toward the inside of the LCD panel 20 in the shape of comb teeth.

Figure 2:
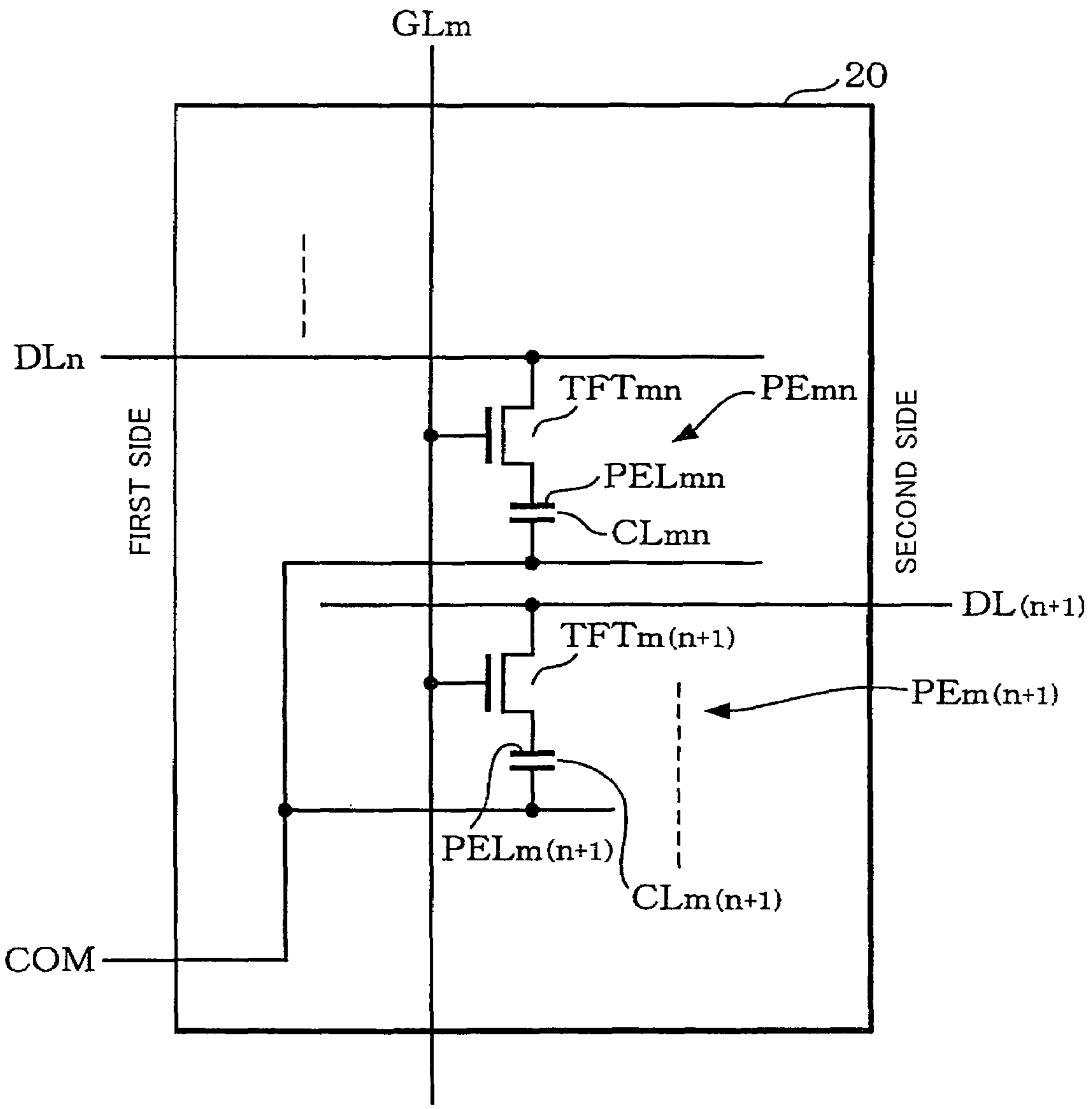
FIG. 2 is a schematic diagram showing a configuration of a pixel.

FIG. 2 schematically shows a configuration of the pixel. In FIG. 2, one pixel consists of one dot. A pixel PEmn is disposed at a position corresponding to the intersecting point of the scan line GLm ($1 \leqq m \leqq X$, X and m are integers) and the data line DLn ($1 \leqq n \leqq Y$, Y and n are integers). The pixel PEmn includes the TFTmn and the pixel electrode PELmn.

A gate electrode of the TFTmn is connected with the scan line GLm. A source electrode of the TFTmn is connected with the data line DLn. A drain electrode of the TFTmn is connected with the pixel electrode PELmn. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. Transmissivity of the pixel changes corresponding to the voltage applied between the pixel electrode and the common electrode COM. A voltage VCOM supplied to the common electrode COM is generated by a power supply circuit (not shown).

The LCD panel 20 is formed by attaching a first substrate on which the pixel electrode and the TFT are formed to a second substrate on which the common electrode is formed, and sealing a liquid crystal as an electro-optical material between the two substrates, for example.

The scan line is scanned by the scan drivers 40 and 42. In FIG. 1, one scan line is driven by the scan drivers 40 and 42 at the same time.

The data line is driven by the display driver 30. The data line is driven by the display driver 30 from the first side of the LCD panel 20 or the second side of the LCD panel 20 which faces the first side. The first and second sides of the LCD panel 20 face in the direction in which the data lines extend.

In the LCD panel 20 in which the data lines are comb-tooth distributed, the data lines are comb-tooth distributed so that the data lines for the number of color components of each pixel disposed corresponding to the adjacent pixels connected with the selected scan line are driven from opposite directions.

In more detail, in the LCD panel 20 in which the data lines are comb-tooth distributed shown in FIG. 2, in the case where the data lines DLn and DL(n+1) are disposed corresponding to the adjacent pixels connected with the selected scan line GLm, the data line DLn is driven by the display driver 30 from the first side of the LCD panel 20, and the data line DL(n+1) is driven by the display driver 30 from the second side of the LCD panel 20.

The above description also applies to the case where the data lines corresponding to the RGB color components are disposed corresponding to one pixel. In this case, in the case where the data line DLn consisting of a set of data lines for three color components (Rn, Gn, Bn) and the data line DL(n+1) consisting of a set of data lines for three color components (R(n+1), G(n+1), B(n+1)) are disposed corresponding to the adjacent pixels connected with the selected scan line GLm, the data line DLn is driven by the display driver 30 from the first side of the LCD panel 20, and the data line DL(n+1) is driven by the display driver 30 from the second side of the LCD panel 20.

The display driver 30 drives the data lines DL1 to DLY of the LCD panel 20 based on gray-scale data for one horizontal scanning period supplied in units of horizontal scanning periods. In more detail, the display driver 30 drives at least one of the data lines DL1 to DLY based on the gray-scale data.

The scan drivers 40 and 42 drive the scan lines GL1 to GLX of the LCD panel 20. In more detail, the scan drivers 40 and 42 sequentially select the scan lines GL1 to GLX within one vertical period, and drive the selected scan line.

The display driver 30 and the scan drivers 40 and 42 are controlled by using a controller (not shown). The controller outputs control signals to the display driver 30, the scan drivers 40 and 42, and the power supply circuit according to the content set by a host such as a central processing unit (CPU). In more detail, the controller supplies an operation mode setting and a horizontal synchronization signal or a vertical synchronization signal generated therein to the display driver 30 and the scan drivers 40 and 42, for example. The horizontal synchronization signal specifies the horizontal scanning period. The vertical synchronization signal specifies the vertical scanning period. The controller controls the power supply circuit relating to polarity reversal timing of the voltage VCOM applied to the common electrode COM.

The power supply circuit generates various voltages applied to the LCD panel 20 and the voltage VCOM applied to the common electrode COM based on a reference voltage supplied from the outside.

In FIG. 1, the liquid crystal device 10 may include the controller, or the controller may be provided outside the liquid crystal device 10. The host (not shown) may be included in the liquid crystal device 10 together with the controller.

At least one of the scan drivers 40 and 42, the controller, and the power supply circuit may be included in the display driver 30.

At least one or all of the display driver 30, the scan drivers 40 and 42, the controller, and the power supply circuit may be formed on the LCD panel 20. For example, the display driver 30 and the scan drivers 40 and 42 may be formed on the LCD panel 20. In this case, the LCD panel 20 may be referred to as an electro-optical device. The LCD panel 20 may be formed to include the data lines, the scan lines, the pixels, each of which is specified by one of the data lines and one of the scan lines, and the display driver which drives the data lines. The LCD panel 20 may include the scan driver which scans the scan lines. The pixels are formed in a pixel formation region of the LCD panel 20.

The advantages of the comb-tooth distributed LCD panel are described below.

Figure 3:
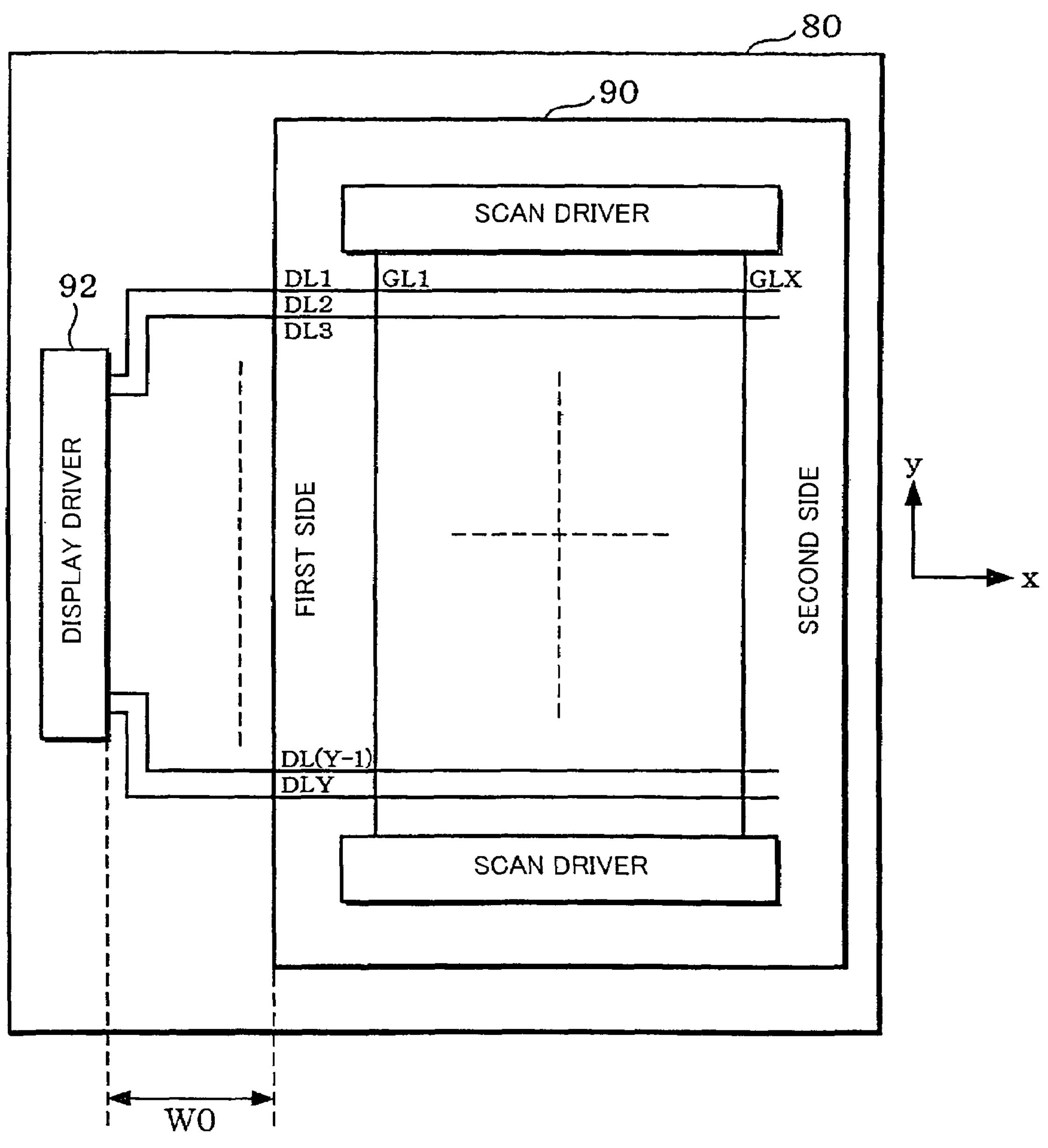
FIG. 3 schematically shows a configuration of an electro-optical device including an LCD panel which is not comb-tooth distributed.

FIG. 3 schematically shows a configuration of an electro-optical device including an LCD panel which is not comb-tooth distributed. An electro-optical device 80 shown in FIG. 3 includes an LCD panel 90 which is not comb-tooth distributed. In the LCD panel 90, the data lines are driven by a display driver 92 from the first side. Therefore, the interconnect region for connecting the data output sections of the display driver 92 with the data lines of the LCD panel 90 is necessary. If the number of data lines is increased and the lengths of the first and second sides of the LCD panel 90 are increased, it is necessary to bend each interconnect, whereby a width W0 is necessary for the interconnect region.

On the contrary, in the electro-optical device 10 shown in FIG. 1, only widths W1 and W2 smaller than the width W0 are respectively necessary on the first and second sides of the LCD panel 20.

Taking mounting on electronic instruments into consideration, it is disadvantageous that the length of the LCD panel (electro-optical device) be increased in the direction of the short side in comparison with the case where the length of the LCD panel is increased in the direction of the long side to some extent. This is undesirable from the viewpoint of the design, since the width of the frame of the display section of the electronic instrument is increased, for example.

In FIG. 3, the length of the LCD panel is increased in the direction of the short side. In FIG. 1, the length of the LCD panel is increased in the direction of the long side. Therefore, the widths of the interconnect regions on the first and second sides can be made narrow to almost an equal extent. In FIG. 1, the non-interconnect region in FIG. 3 can be reduced, whereby the mounting area can be reduced.

A further reduction of the size and an increase in image quality can be achieved by forming such a comb-tooth distributed LCD panel by using LTPS.

Figure 4:
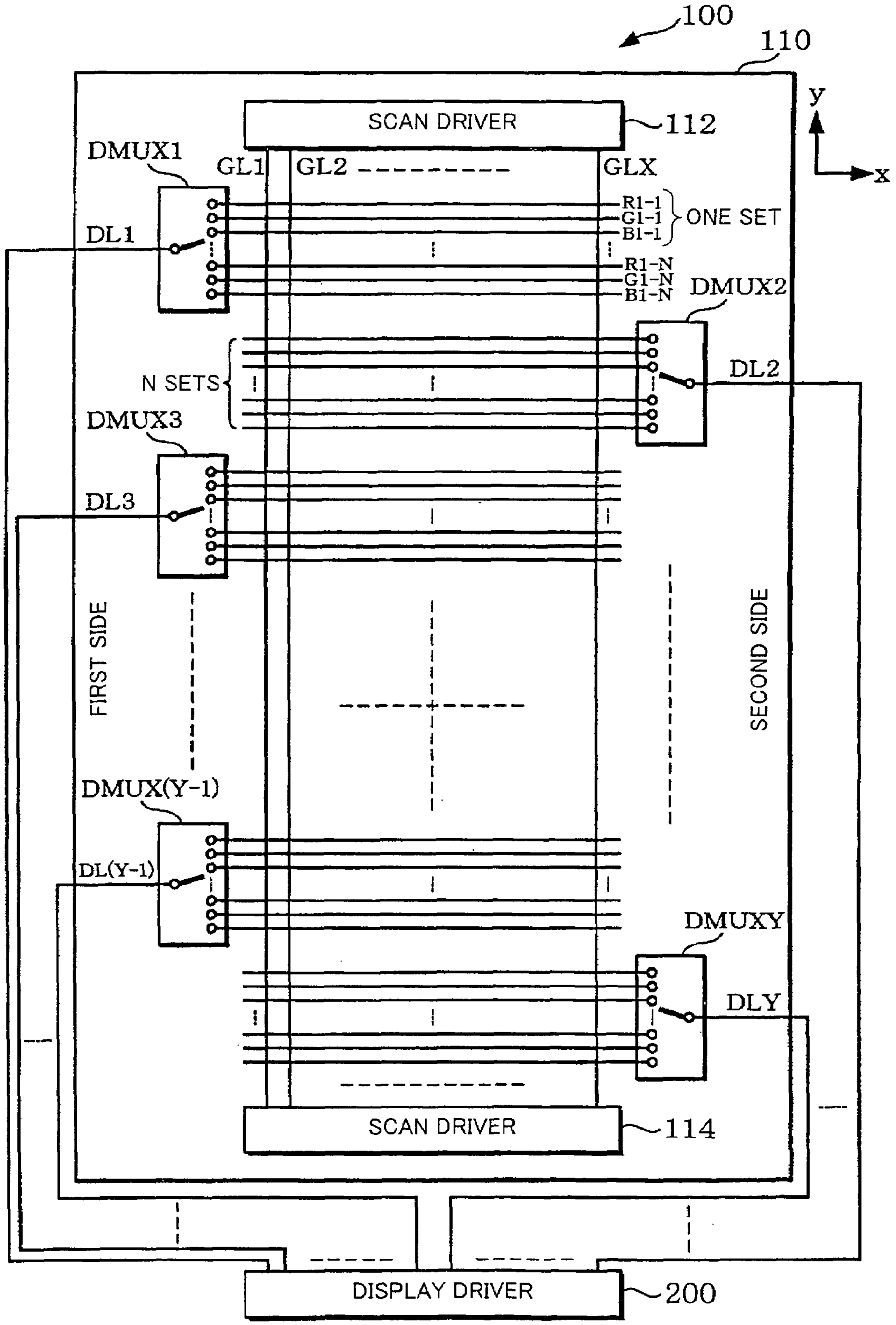
FIG. 4 schematically shows a configuration of an electro-optical device including a comb-tooth distributed LCD panel for 3N-dot multiplex drive.

FIG. 4 shows an outline of a configuration of an electro-optical device including a comb-tooth distributed LCD panel for 3N-dot multiplex drive. An electro-optical device 100 includes an LCD panel 110 and a display driver 200 which drives data lines (data signal supply lines) of the LCD panel 110.

The LCD panel 110 is formed on a panel substrate such as a glass substrate. A plurality of scan lines GL1 to GLX, arranged in the x direction in FIG. 4 and extending in the y direction, and a plurality of data lines, arranged in the y direction and extending in the x direction, are disposed on the panel substrate. Each of the data lines consists of a set of data lines for R (first color component), G (second color component), and B (third color component) ((R1-1, G1-1, B1-1), for example).

In the LCD panel 110, the color component pixel for one dot as shown in FIG. 2 is formed corresponding to the intersecting point of the scan line and the data line.

In the LCD panel 110, the data lines are comb-tooth distributed. In FIG. 4, the data lines are comb-tooth distributed so as to be driven from a first side of the LCD panel 110 and a second side which faces the first side. In FIG. 4, the data lines are comb-tooth distributed inward from two opposite sides in units of N sets of data lines for RGB (3×N data lines) ((R1-1, G1-1, B1-1) to (R1-N, G1-N, B1-N), for example), each set consisting of the data lines for the first to third color components of RGB (first to third color components).

The LCD panel 110 includes a plurality of data signal supply lines, each of the data signal supply lines transmitting multiplexed data in which N sets of data signals for the first to third color components are multiplexed. The LCD panel 110 includes demultiplexers DMUX1 to DMUXY corresponding to the 3×N data lines.

The demultiplexer DMUXk (1≦k≦Y, k is an integer) demultiplexes the multiplexed data and outputs one of the N sets of data signals for the first to third color components to each of the 3×N data lines. The demultiplexer DMUXk includes (1−k)th to (3×N−k)th demultiplex switching devices controlled based on (1−k)th to (3×N−k)th demultiplex control signals, each of the demultiplex switching devices being connected with the data signal supply line DLk at one end and connected with the i-th data line (1≦i≦3×N, i is an integer) at the other end.

The scan lines GL1 to GLX are scanned by scan drivers 112 and 114. In FIG. 4, one scan line is driven by the scan drivers 112 and 114 at the same time.

The data signal supply lines DL1 to DLY are driven by the display driver 200. The data signal supply line is driven by the display driver 200 from the first side of the LCD panel 110 or the second side of the LCD panel 110 which faces the first side.

The demultiplexer DMUXk selectively outputs the data signals for 3×N dots which are multiplexed and supplied to the data signal supply line DLk to the first to 3N-th data lines (or one of the 3×N data lines) by switch control based on the first to 3N-th multiplex control signals.

Figure 5:
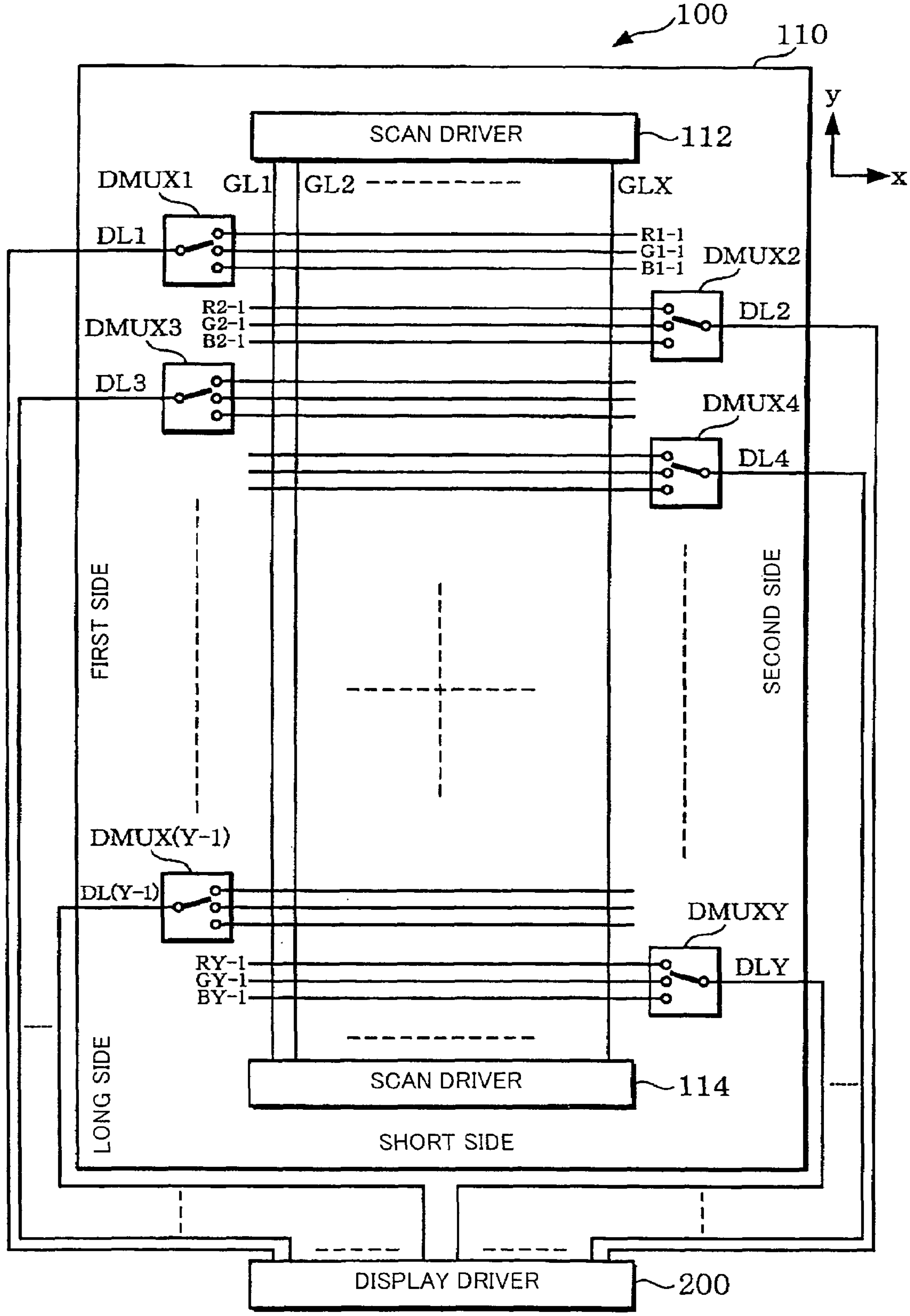
FIG. 5 schematically shows a configuration of an electro-optical device including a comb-tooth distributed LCD panel for three-dot multiplex drive.

FIG. 5 shows an outline of a configuration of an electro-optical device including a comb-tooth distributed LCD panel for three-dot multiplex drive. Specifically, FIG. 5 shows the case where N is “1” in the electro-optical device shown in FIG. 4. The sections of the electro-optical device 100 shown in FIG. 5 which are the same as the sections of the electro-optical device shown in FIG. 4 are indicated by the same symbols. Description of these sections is omitted.

Figure 6:
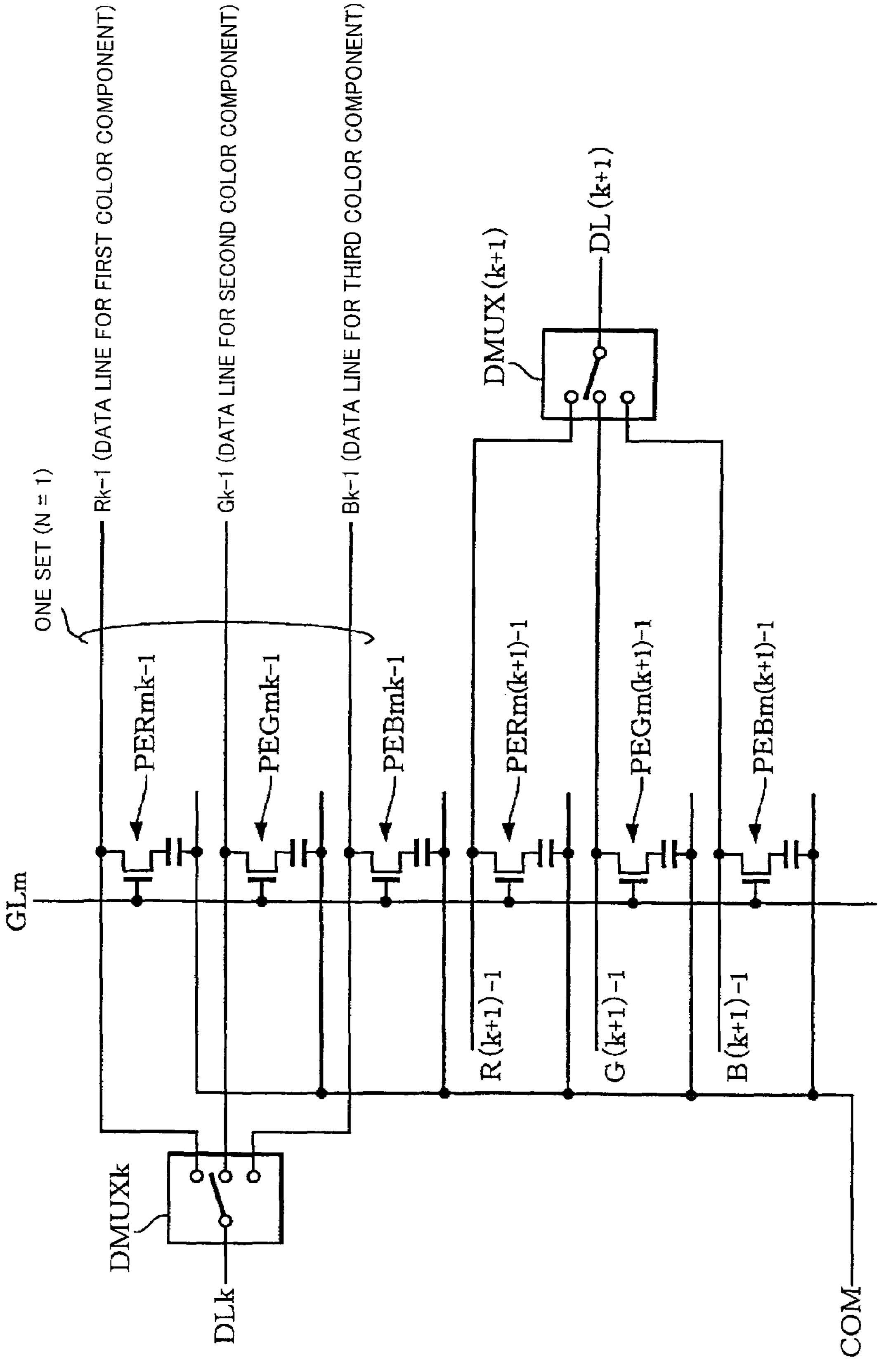
FIG. 6 is a schematic diagram of a configuration of pixels formed on an LCD panel shown in FIG. 5.

FIG. 6 schematically shows a configuration of pixels formed on the LCD panel 110 shown in FIG. 5. An R pixel, G pixel, and B pixel which make up one pixel are formed at the intersecting points of the scan line and the first to third data lines. In FIG. 6, the R pixel PERmk-1 is formed at the intersecting point of the scan line GLm and the data line Rk-1 for the R component. The G pixel PEGmk-1 is formed at the intersecting point of the scan line GLm and the data line Gk-1 for the G component. The B pixel PEBmk-1 is formed at the intersecting point of the scan line GLm and the data line Bk-1 for the B component.

The configuration of the R pixel PERmk-1, the G pixel PEGmk-1, and the B pixel PEBmk-1 (color component pixels) is the same as the configuration shown in FIG. 2. Therefore, description is omitted.

Figure 7A:
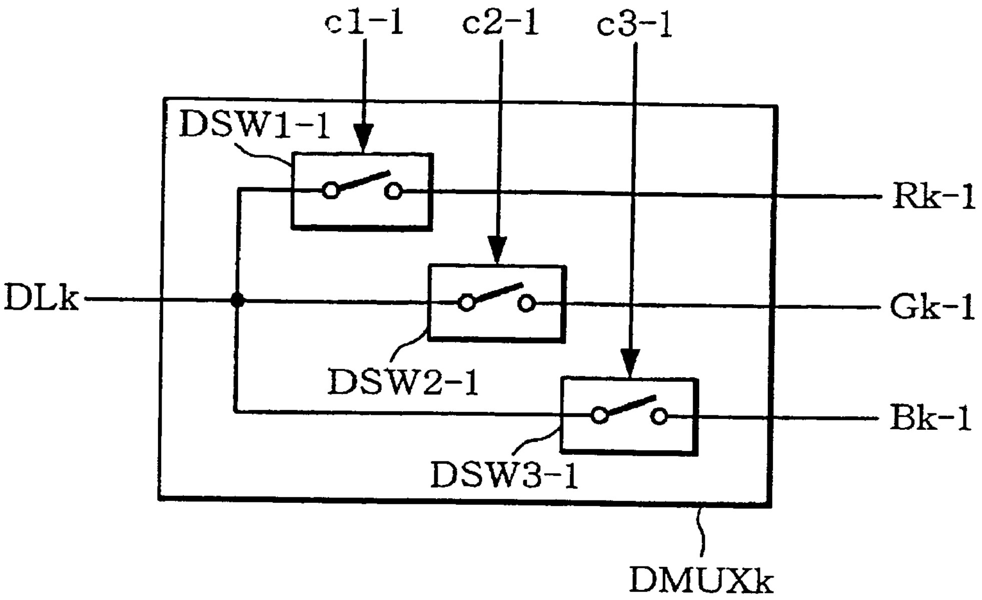
FIG. 7A is a block diagram schematically showing a configuration of a demultiplexer of an LCD panel for three-dot multiplex drive.
Figure 7B:
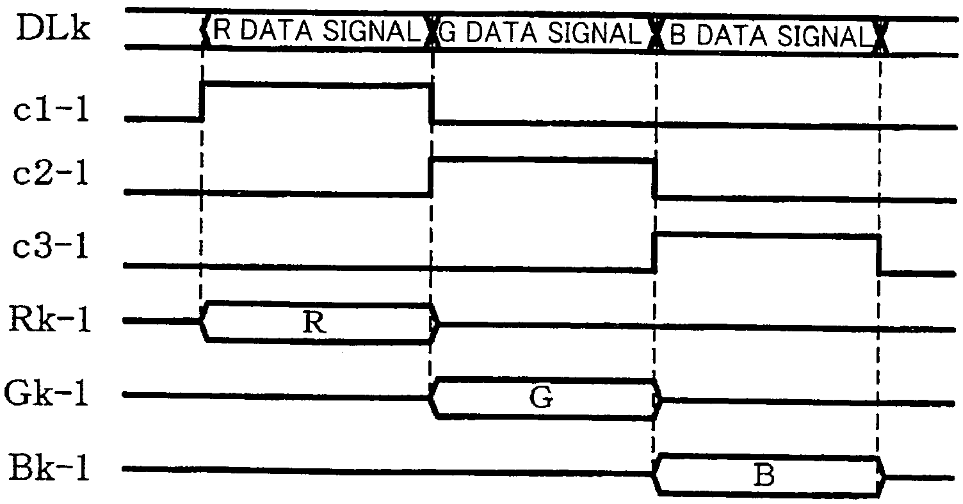
FIG. 7B is a timing diagram showing an operation example of the demultiplexer shown in FIG. 7A.

FIG. 7A shows an outline of a configuration of the demultiplexer DMUXk of the LCD panel for three-dot multiplex drive. FIG. 7B shows a timing diagram of an operation example of the demultiplexer DMUXk.

As shown in FIG. 7A, the demultiplexer DMUXk includes first to third (N=1) demultiplex switching devices DSW1-1 to DSW3-1. The data signal supply line DLk is connected with one end of the first demultiplex switching device DSW1-1, and the data line Rk-1 for the first color component (first data line) is connected with the other end of the first demultiplex switching device DSW1-1. The data signal supply line DLk is connected with one end of the second demultiplex switching device DSW 2-1, and the data line Gk-1 for the second color component (second data line) is connected with the other end of the second demultiplex switching device DSW2-1. The data signal supply line DLk is connected with one end of the third demultiplex switching device DSW3-1, and the data line Bk-1 for the third color component (third data line) is connected with the other end of the third demultiplex switching device DSW3-1.

The first to third demultiplex switching devices DSW1-1 to DSW3-1 are controlled based on first to third (N=1) demultiplex control signals c1-1 to c3-1. In more detail, the first to third demultiplex switching devices DSW1-1 to DSW3-1 are controlled so that one of the first to third demultiplex switching devices DSW1-1 to DSW3-1 is turned ON by the first to third (N=1) demultiplex control signals. The first to third (N=1) demultiplex control signals c1-1 to c3-1 are supplied from the host or the display driver.

The data signal on the data signal supply line DLk, in which the data signals for the first to third (N=1) color components are multiplexed, can be separated and output to the data lines for the first to third color components in one horizontal scanning period, as shown in FIG. 7B.

The first to third demultiplex control signals c1-1 to c3-1 are input in common to the demultiplexers DMUX1 to DMUXY of the LCD panel 110 shown in FIG. 5.

Figure 8:
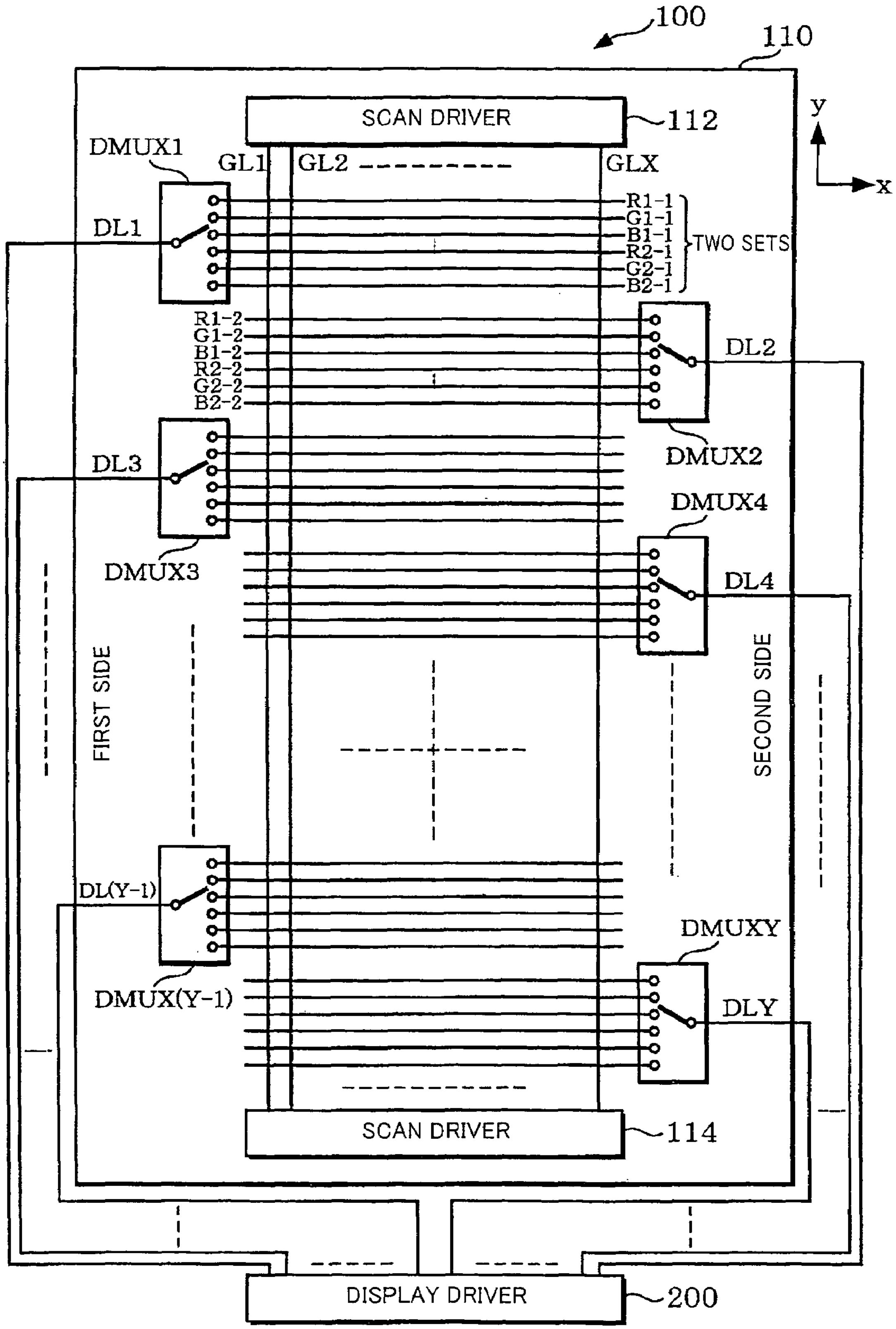
FIG. 8 schematically shows a configuration of an electro-optical device including a comb-tooth distributed LCD panel for six-dot multiplex drive.

FIG. 8 shows an outline of a configuration of an electro-optical device including a comb-tooth distributed LCD panel for six-dot multiplex drive. Specifically, FIG. 8 shows the case where N is “2” in the electro-optical device shown in FIG. 4. The sections of the electro-optical device 100 shown in FIG. 8 which are the same as the sections of the electro-optical device shown in FIG. 4 are indicated by the same symbols. Description of these sections is omitted.

In the LCD panel 110 shown in FIG. 8, the R pixel, G pixel, and B pixel which make up one pixel are formed at the intersecting points of the scan line and the first to sixth (=3×2) data lines, as shown in FIG. 6.

Figure 9A:
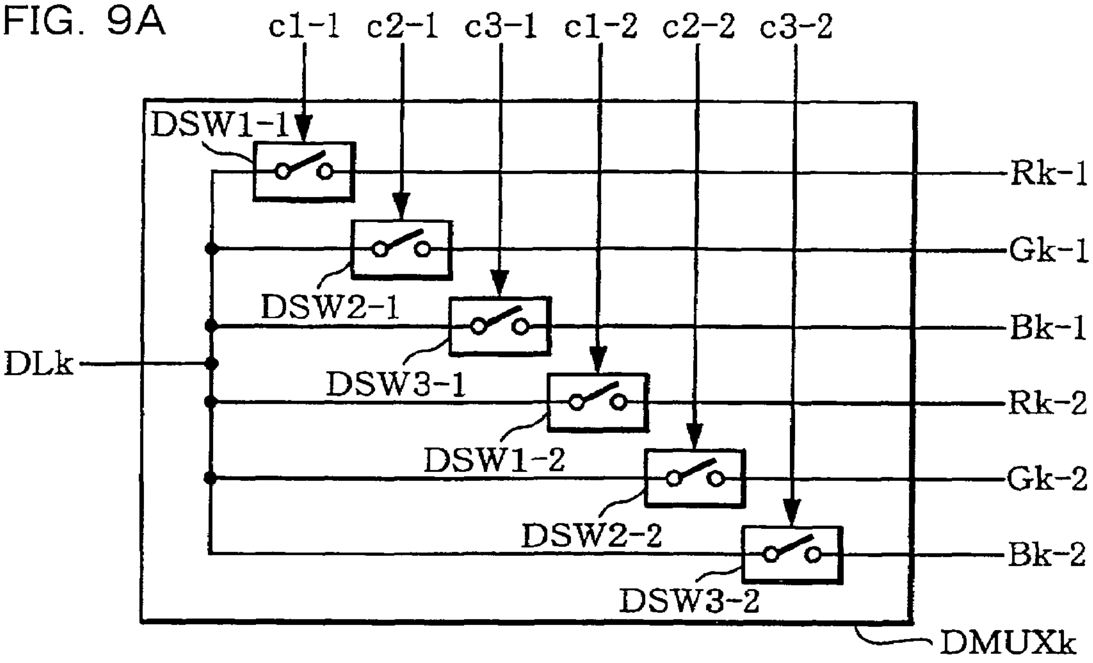
FIG. 9A is a block diagram schematically showing a configuration of a demultiplexer of an LCD panel for six-dot multiplex drive.
Figure 9B:
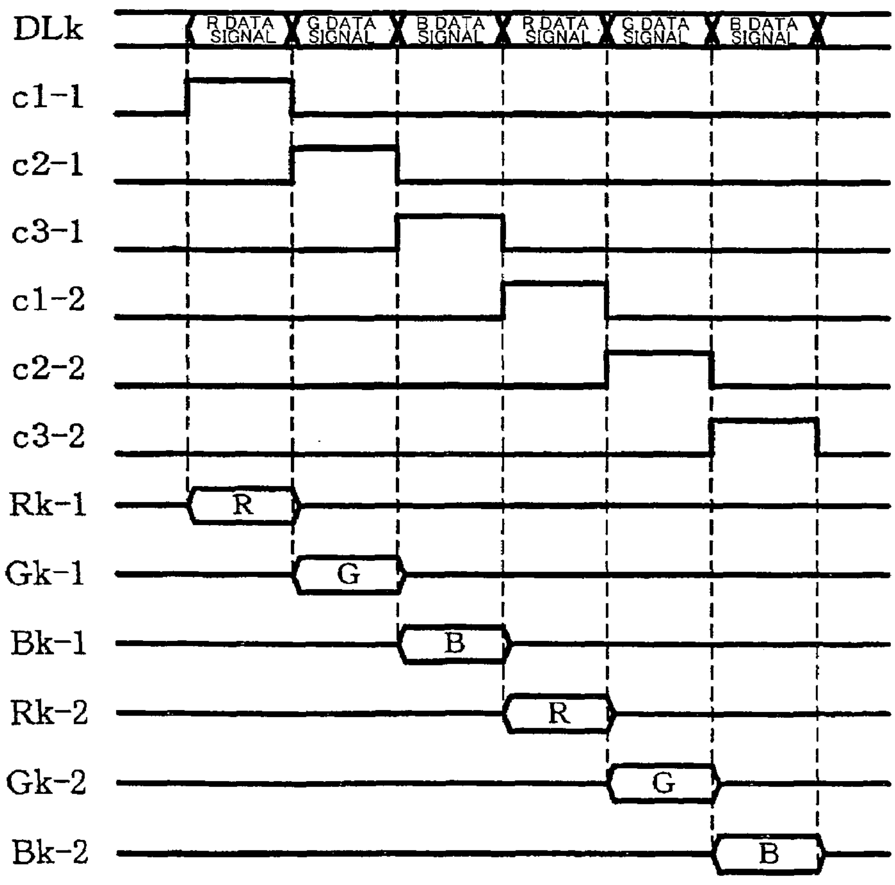
FIG. 9B is a timing diagram showing an operation example of the demultiplexer shown in FIG. 9A.

FIG. 9A shows an outline of a configuration of the demultiplexer DMUXk of the LCD panel for six-dot multiplex drive. FIG. 9B shows a timing diagram of an operation example of the demultiplexer DMUXk.

As shown in FIG. 9A, the demultiplexer DMUXk includes first to sixth (N=2) demultiplex switching devices DSW1-1 to DSW3-1 and DSW1-2 to DSW3-2.

The data signal supply line DLk is connected with one end of the first demultiplex switching device DSW1-1, and the data line Rk-1 for the first color component (first data line) is connected with the other end of the first demultiplex switching device DSW1-1. The data signal supply line DLk is connected with one end of the second demultiplex switching device DSW 2-1, and the data line Gk-1 for the second color component (second data line) is connected with the other end of the second demultiplex switching device DSW2-1. The data signal supply line DLk is connected with one end of the third demultiplex switching device DSW3-1, and the data line Bk-1 for the third color component (third data line) is connected with the other end of the third demultiplex switching device DSW3-1.

The data signal supply line DLk is connected with one end of the fourth demultiplex switching device DSW1-2, and the data line Rk-2 for the first color component (fourth data line) is connected with the other end of the fourth demultiplex switching device DSW1-2. The data signal supply line DLk is connected with one end of the fifth demultiplex switching device DSW2-2, and the data line Gk-2 for the second color component (fifth data line) is connected with the other end of the fifth demultiplex switching device DSW2-2. The data signal supply line DLk is connected with one end of the sixth demultiplex switching device DSW3-2, and the data line Bk-2 for the third color component (sixth data line) is connected with the other end of the sixth demultiplex switching device DSW3-2.

The first to sixth demultiplex switching devices DSW1-1 to DSW3-1 and DSW1-2 to DSW3-2 are controlled based on the first to sixth (N=2) demultiplex control signals c1-1 to c3-1 and c1-2 to c3-2. In more detail, the first to sixth demultiplex switching devices DSW1-1 to DSW3-1 and DSW1-2 to DSW3-2 are controlled so that one of the first to sixth demultiplex switching devices DSW1-1 to DSW3-1 and DSW1-2 to DSW3-2 is turned ON by the first to sixth demultiplex control signals.

The data signal on the data signal supply line DLk, in which the data signals are multiplexed, can be separated and output to the data lines for each color component in one horizontal scanning period, as shown in FIG. 9B.

The first to sixth demultiplex control signals c1-1 to c3-1 and c1-2 to c3-2 are input in common to the demultiplexers DMUX1 to DMUXY of the LCD panel 110 shown in FIG. 8.

In the case where the arrangement order of data output sections of the display driver 200 which performs 3N-dot multiplex drive corresponds to the arrangement order of the data lines of the LCD panel 110, the interconnects which connect the data output sections with the data signal supply lines can be disposed from the first and second sides by disposing the display driver 200 along the short side of the LCD panel 110 as shown in FIGS. 4, 5, and 8, whereby the interconnects can be simplified and the interconnect region can be reduced.

However, in the case where the LCD panel 110 is driven by the display driver 200 which receives the gray-scale data output corresponding to the arrangement order of the data lines of the LCD panel 110 from a general-purpose controller, the order of the received gray-scale data must be changed. The changing method of the arrangement order depends on the number of data signals to be multiplexed.

Figure 10:
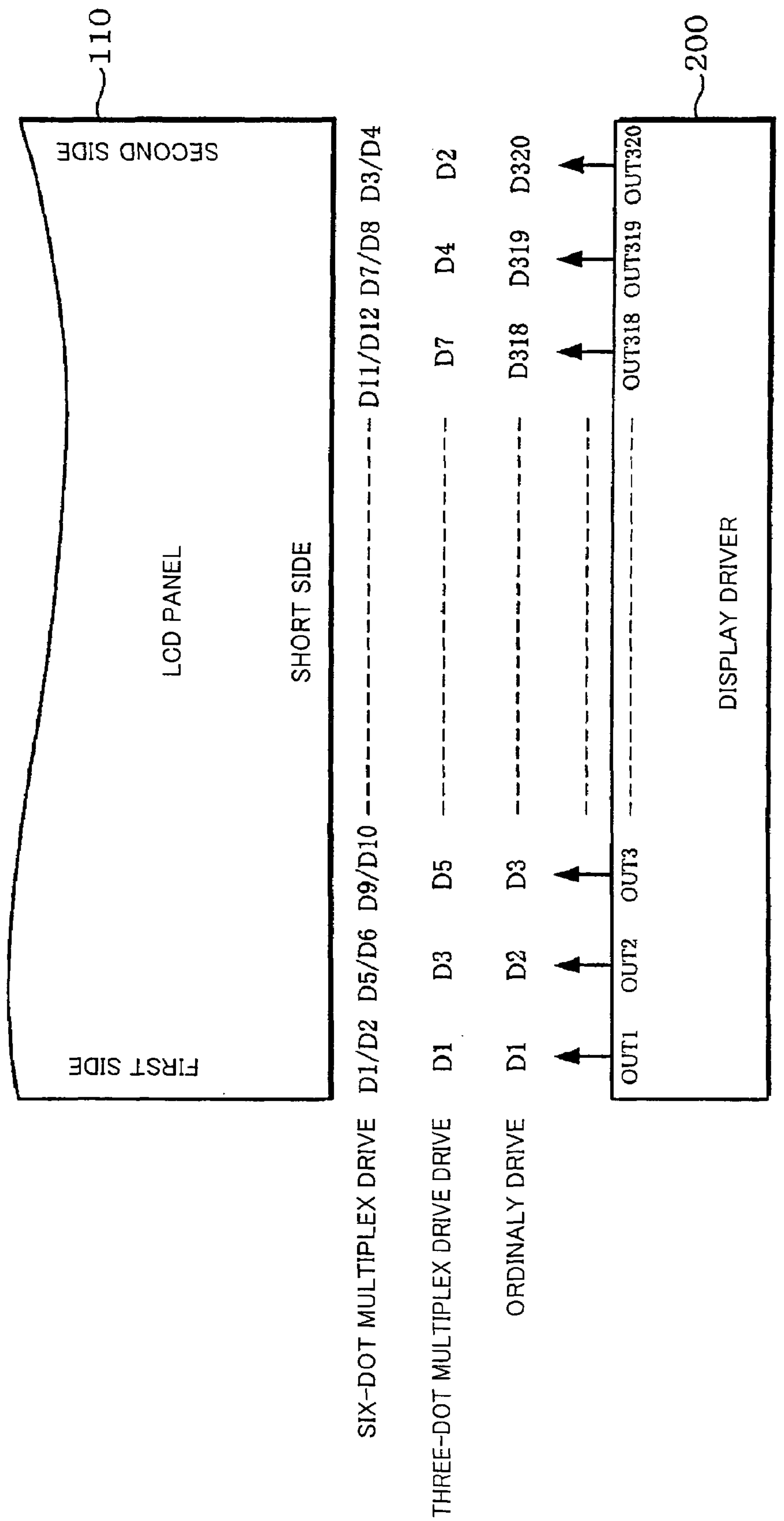
FIG. 10 is illustrative of an arrangement of data signals to be output from data output sections of a display driver.

FIG. 10 is illustrative of the arrangement of the data signals to be output from the data output sections of the display driver 200.

The following description is given on the assumption that the LCD panel includes data signal supply lines DL1 to DL320. The display driver 200 includes data output sections OUT1 to OUT320, and the data output sections are arranged in the direction from the first side to the second side. The data output sections correspond to the data signal supply lines of the LCD panel 110.

Figure 11:
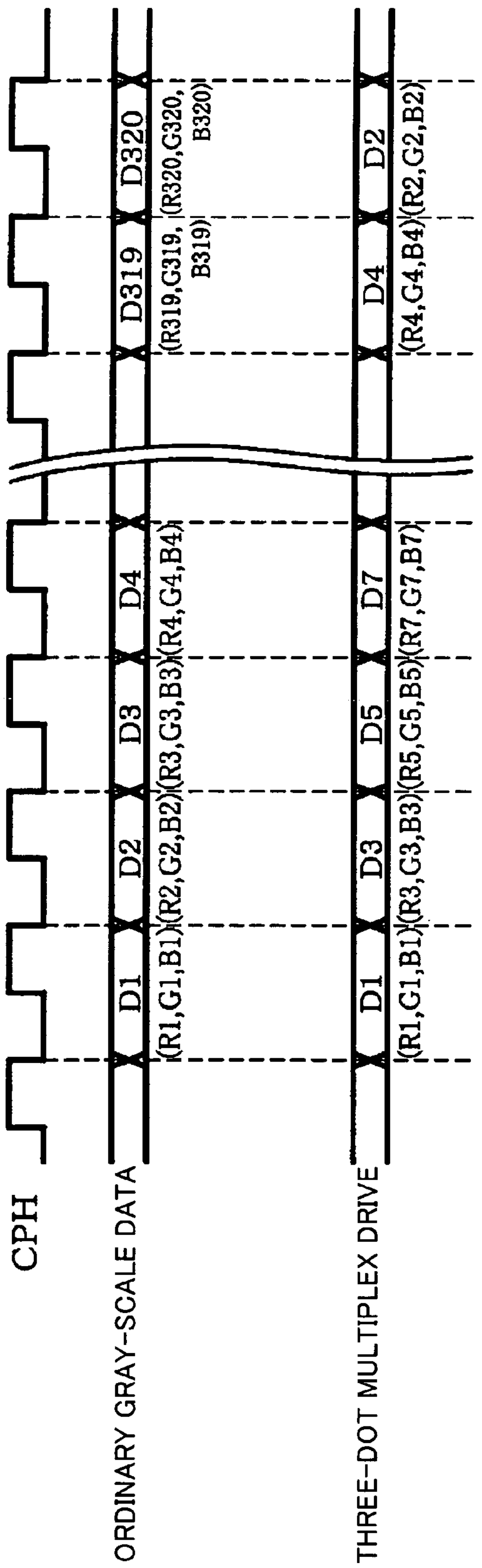
FIG. 11 is illustrative of the necessity of data scrambling for driving a comb-tooth distributed LCD panel.

A general-purpose controller supplies gray-scale data D1 to D320 respectively corresponding to the data signal supply lines DL1 to DL320 to the display driver 200 in synchronization with a reference clock signal CPH, as shown in FIG. 11.

In the case where the display driver 200 drives an LCD panel which is not comb-tooth distributed as shown in FIG. 3, the data output section OUT1 is connected with the data signal supply line DL1, the data output section OUT2 is connected with the data signal supply line DL2, . . . , and the data output section OUT320 is connected with the data signal supply line DL320. Therefore, an image can be displayed without causing a problem. In this case, the display driver 200, to which the gray-scale data is supplied from a general-purpose controller corresponding to the arrangement order of the data lines of the LCD panel, sequentially captures the supplied gray-scale data, and outputs the data signal corresponding to the gray-scale data D1 from the data output section OUT1 and outputs the data signal corresponding to the gray-scale data D2 from the data output section OUT2, and so on.

However, in the case where the display driver 200 drives a comb-tooth distributed LCD panel as shown in FIG. 5, the data output section OUT1 is connected with the data signal supply line DL1, the data output section OUT2 is connected with the data signal supply line DL3, . . . , the data output section OUT319 is connected with the data signal supply line DL4, and the data output section OUT320 is connected with the data signal supply line DL2. Therefore, in the case where the display driver 200 performs three-dot multiplex drive, it is necessary to perform scramble processing for changing the order of the gray-scale data, as shown in FIG. 11.

In the case where the display driver 200 drives a comb-tooth distributed LCD panel as shown in FIG. 8, although the connection relationship between the data output sections and the data signal supply lines is the same as that shown in FIG. 5, the gray-scale data corresponding to the data signal output to the data signal supply line differs from that shown in FIG. 5.

In three-dot multiplex drive, it is necessary to output the data signal corresponding to the gray-scale data D1 from the data output section OUT1, the data signal corresponding to the gray-scale data D3 from the data output section OUT2, . . . , the data signal corresponding to the gray-scale data D4 from the data output section OUT319, and the data signal corresponding to the gray-scale data D2 from the data output section OUT320, as shown in FIG. 10. However, in six-dot multiplex drive, it is necessary to output the data signals corresponding to the gray-scale data D1 and D2 from the data output section OUT1, the data signals corresponding to the gray-scale data D5 and D6 from the data output section OUT2, . . . , the data signals corresponding to the gray-scale data D7 and D8 from the data output section OUT319, and the data signals corresponding to the gray-scale data D3 and D4 from the data output section OUT320.

The display driver 200 in the present embodiment is capable of performing 3N-dot multiplex drive for the comb-tooth distributed LCD panel by capturing the gray-scale data sequentially supplied from a general-purpose controller while appropriately changing the arrangement of the gray-scale data by using the configuration described below.

2. Display Driver

Figure 12:
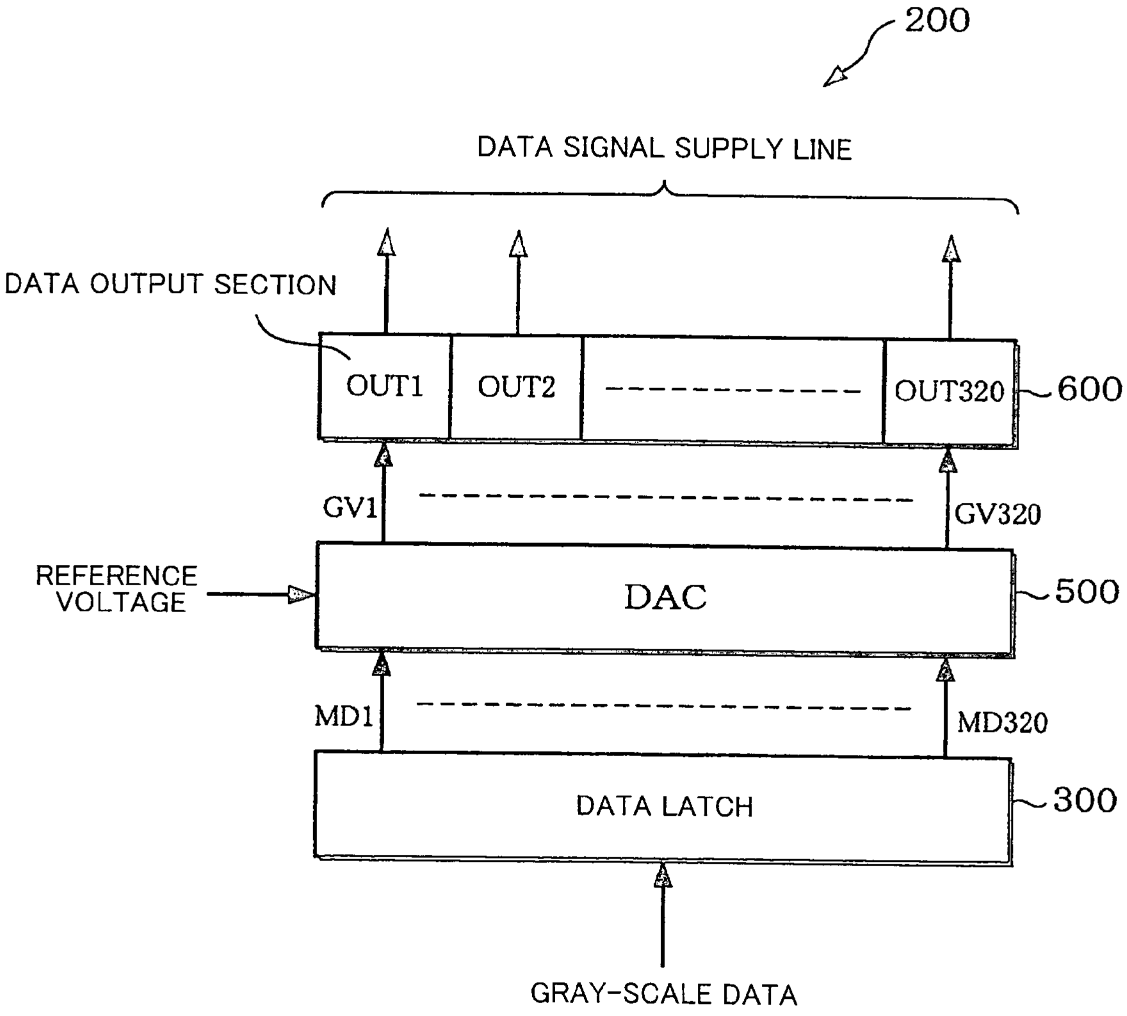
FIG. 12 is a block diagram schematically showing a configuration of a display driver in an embodiment of the present invention.

FIG. 12 shows an outline of a configuration of the display driver 200. The display driver 200 includes a data latch 300, a digital-to-analog converter (DAC) 500 (voltage select circuit in a broad sense), and a data-signal-supply-line driver circuit 600.

The data latch 300 captures the gray-scale data in one horizontal scanning cycle. The data latch 300 multiplexes the gray-scale data for N pixels and outputs the multiplexed data.

The DAC 500 outputs a drive voltage (gray-scale voltage; data signal in a broad sense) corresponding to the gray-scale data included in the multiplexed data in units of data lines selectively from a plurality of reference voltages corresponding to the multiplexed gray-scale data. In more detail, the DAC 500 decodes the gray-scale data included in the multiplexed data and selects one of the reference voltages based on the decoded result. The reference voltage selected by the DAC 500 is output to the data-signal-supply-line driver circuit 600 as the drive voltage.

The data-signal-supply-line driver circuit 600 includes 320 data output sections OUT1 to OUT320. The data-signal-supply-line driver circuit 600 drives the data signal supply lines DL1 to DLN based on the drive voltage output from the DAC 500 through the data output sections OUT1 to OUT320. In the data-signal-supply-line driver circuit 600, the data output sections (OUT1 to OUT320), which drive the data signal supply lines based on the gray-scale data (latch data) included in the multiplexed data, are disposed corresponding to the arrangement order of the data lines. The above description illustrates the case where the data-signal-supply-line driver circuit 600 includes the 320 data output sections OUT1 to OUT320. However, the number of data output sections is not limited thereto.

Figure 13:
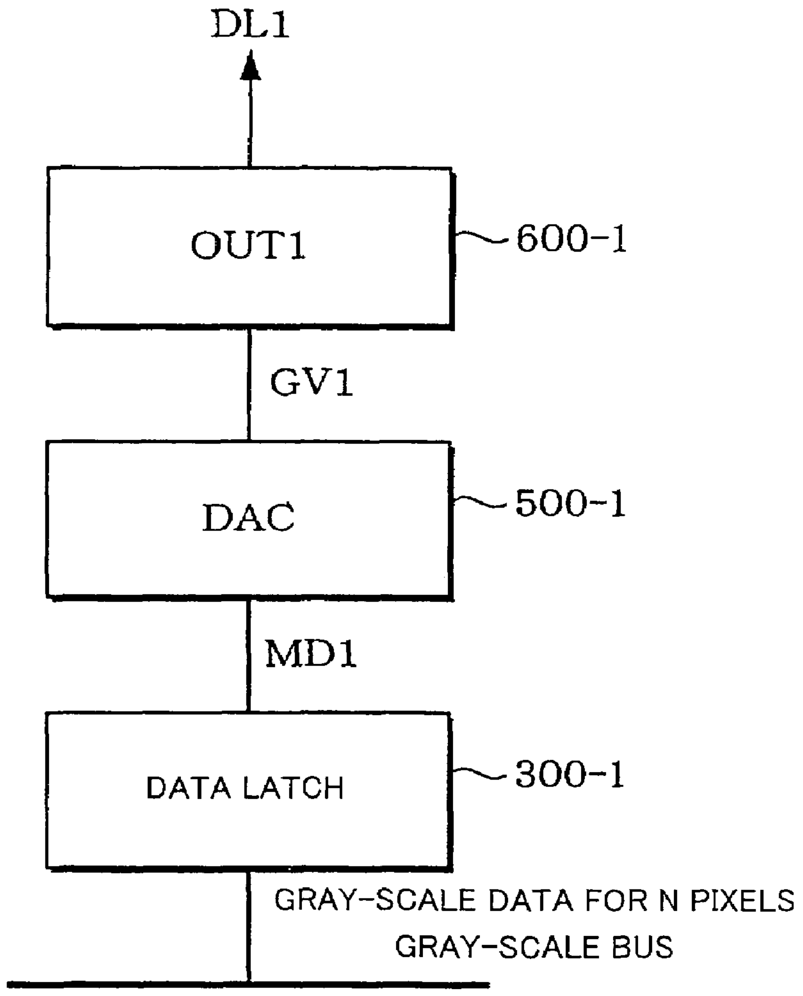
FIG. 13 is a block diagram schematically showing a configuration of a display driver in an embodiment of the present invention for one output.

FIG. 13 shows an outline of a configuration of the display driver 200 for one output. The display driver 200 performs 3N-dot multiplex drive.

The data latch 300-1 captures the gray-scale data for N pixels on the gray-scale bus, to which the gray-scale data is supplied corresponding to the arrangement order of the data lines of the LCD panel. In the case where one pixel is made up of the color component pixels for RGB, the data latch 300-1 captures the gray-scale data for (3×N) dots. The data latch 300-1 generates multiplexed data MD1 in which the captured gray-scale data for N pixels is multiplexed.

The multiplexed data MD1 is output to the DAC 500-1. The DAC 500-1 generates a drive voltage GV1 corresponding to the multiplexed data MD1. In more detail, the DAC 500-1 generates the drive voltage GV1 corresponding to the gray-scale data in the multiplexed data MD1 corresponding to each dot.

The data-signal-supply-line driver circuit 600-1 (data output section OUT1) outputs the data signal to the data signal supply line DL1 connected with the data output section OUT1 based on the drive voltage GV1 output from the DAC 500-1.

Figure 14:
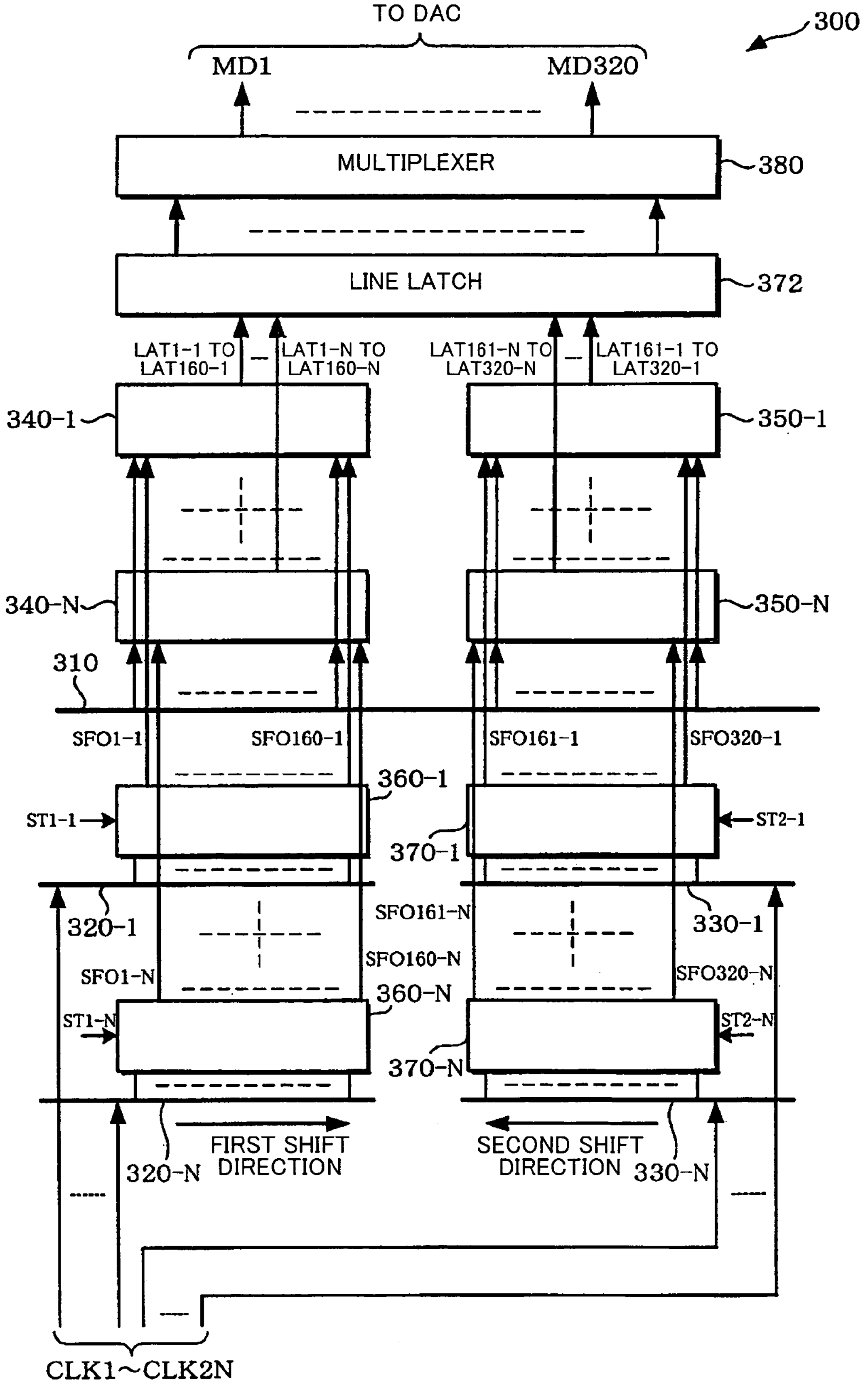
FIG. 14 is a block diagram schematically showing a configuration of a data latch of a display driver in an embodiment of the present invention.

FIG. 14 shows an outline of a configuration of the data latch 300 shown in FIG. 12.

The data latch 300 includes a gray-scale bus 310, N multiplexed first clock signal lines 320-1 to 320-N, N multiplexed second clock signal lines 330-1 to 330-N, N multiplexed first data latches 340-1 to 340-N, N multiplexed second data latches 350-1 to 350-N, N multiplexed first shift registers 360-1 to 360-N, N multiplexed second shift registers 370-1 to 370-N, a line latch 372, and a multiplexer 380.

In the data latch 300, the first and second clock signal lines, the first and second shift registers, and the first and second data latches are N multiplexed and grouped into first to N-th groups. The first to N-th groups share the gray-scale bus 310.

The gray-scale data is supplied to the gray-scale bus 310 corresponding to the arrangement order of the data lines (or data signal supply lines DL1 to DLN) of the LCD panel.

Each of the N first clock signal lines 320-1 to 320-N belongs to one of the first to N-th groups. One of first to 2N-th shift clock signals (2×N shift clock signals) is supplied to each of the N first clock signal lines 320-1 to 320-N.

Each of the N second clock signal lines 330-1 to 330-N belongs to one of the first to N-th groups. One of the first to 2N-th shift clock signals (2×N shift clock signals) is supplied to each of the N second clock signal lines 330-1 to 330-N.

The first to 2N-th shift clock signals are generated based on the reference clock signal CPH. The gray-scale data for R, G, and B is supplied to the gray-scale bus 310 in synchronization with the reference clock signal CPH.

Each of the N first shift registers 360-1 to 360-N belongs to one of the first to N-th groups. Each of the N first shift registers 360-1 to 360-N includes a plurality of flip-flops. Each of the N first shift registers 360-1 to 360-N shifts a shift start signal in a first shift direction based on the shift clock signal, and outputs a shift output from each of the flip-flops.

The first shift register 360-j belonging to the j-th group ($1 \leqq j \leqq N$, j is an integer) shifts a shift start signal ST1-j in the first shift direction based on the shift clock signal on the first clock signal line 320-j belonging to the j-th group, and outputs the shift output from each of the flip-flops. The first shift direction may be the direction from the first side to the second side of the LCD panel 110. The shift outputs SFO1-j to SFO160-j output from the first shift register 360-j belonging to the j-th group are output to the first data latch 340-j belonging to the j-th group.

Figure 15:
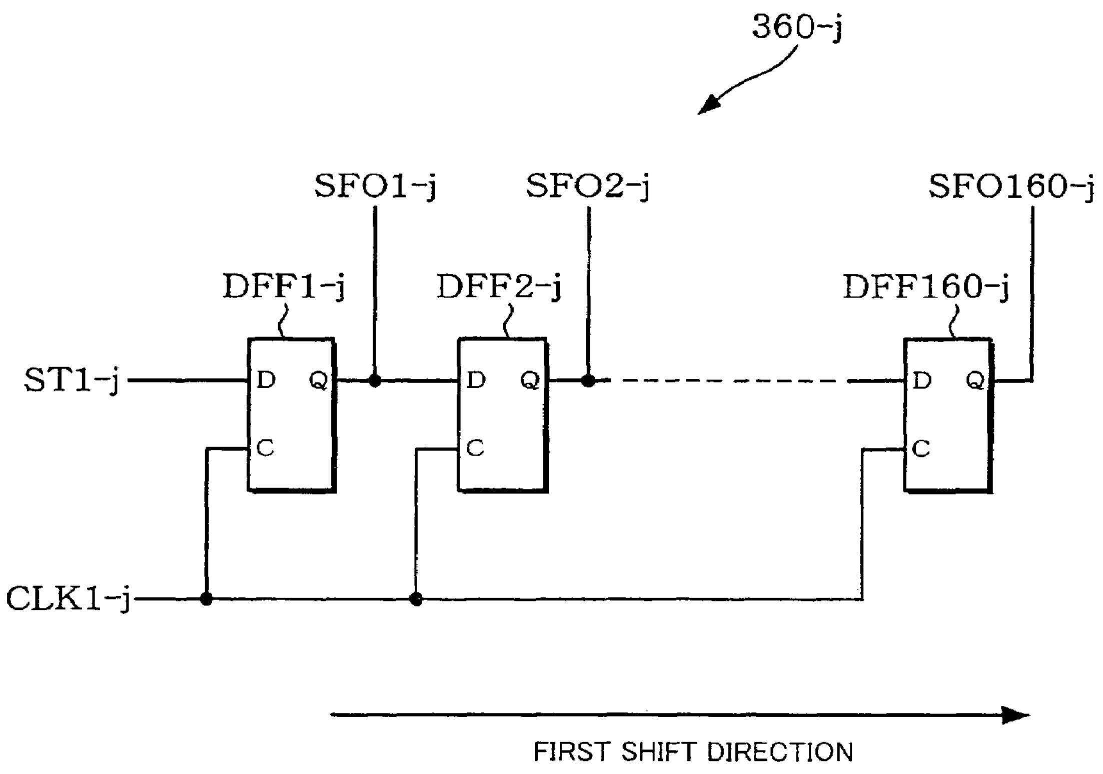
FIG. 15 is a circuit diagram of a configuration example of a first shift register in a j-th group.

FIG. 15 shows a configuration example of the first shift register 360-j belonging to the j-th group. In the first shift register 360-j belonging to the j-th group, D flip-flops DFF1-j to DFF160-j are connected in series so as to shift the shift start signal in the first shift direction. A Q terminal of the D flip-flop DFFf ($1 \leqq f \leqq 159$, f is a natural number) is connected with a D terminal of the D flip-flop DFF(f+1) in the subsequent stage. Each of the D flip-flops captures and holds the signal input to the D terminal at the rising edge of the signal input to a C terminal, and outputs the held signal from the Q terminal as the shift output SFO. In FIG. 15, the shift clock signal CLK1-j among the first to 2N-th shift clock signals is supplied to the first clock signal line 320-j belonging to the j-th group.

In FIG. 14, each of the N second shift registers 370-1 to 370-N belongs to one of the first to N-th groups. Each of the N second shift registers 370-1 to 370-N includes a plurality of flip-flops. Each of the N first shift registers 370-1 to 370-N shifts the shift start signal in a second shift direction based on the shift clock signal and outputs the shift output from each of the flip-flops.

The second shift register 370-j belonging to the j-th group shifts a shift start signal ST2-j in the second shift direction based on the shift clock signal on the second clock signal line 330-j belonging to the j-th group, and outputs the shift output from each of the flip-flops. The second shift direction is the direction opposite to the first shift direction. The second shift direction may be the direction from the second side to the first side of the LCD panel 110. The shift outputs SFO161-j to SFO320-j from the second shift register 370-j belonging to the j-th group are output to the second data latch 350-j belonging to the j-th group.

Figure 16:
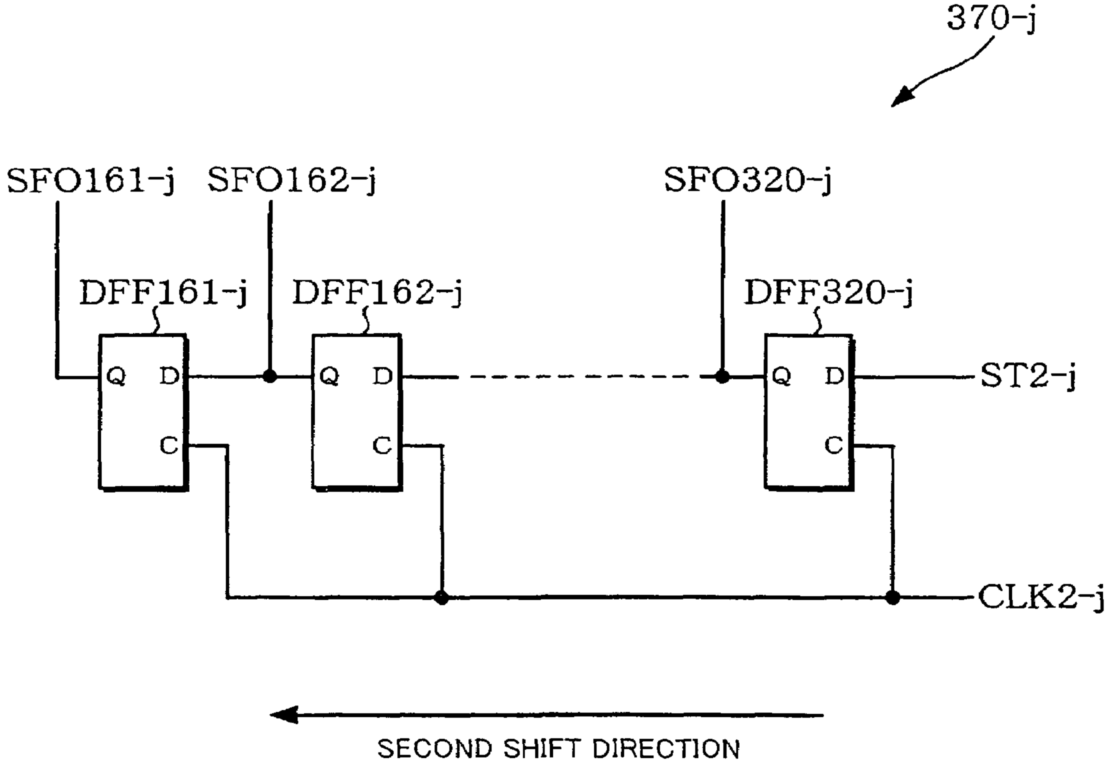
FIG. 16 is a circuit diagram of a configuration example of a second shift register in a j-th group.

FIG. 16 shows a configuration example of the second shift register 370-j belonging to the j-th group. In the second shift register 370-j belonging to the j-th group, D flip-flops DFF320-j to DFF161-j are connected in series so as to shift the shift start signal in the second shift direction. A Q terminal of the D flip-flop DFFg (162≦g≦320, g is a natural number) is connected with a D terminal of the D flip-flop DFF(g−1) in the subsequent stage. Each of the D flip-flops captures and holds the signal input to the D terminal at the rising edge of the signal input to a C terminal, and outputs the held signal from the Q terminal as the shift output SFO.

In FIG. 14, each of the N first data latches 340-1 to 340-N belongs to one of the first to N-th groups. Each of the N first data latches 340-1 to 340-N holds the gray-scale data on the gray-scale bus 310 based on the shift outputs from the N first shift registers 360-1 to 360-N.

The first data latch 340-j belonging to the j-th group includes a plurality of flip-flops FF1-j to FF160-j (not shown) which correspond respectively to the data output sections OUT1 to OUT160. The flip-flop FFh-j (1≦h≦160, h is an integer) holds the gray-scale data on the gray-scale bus 310 based on the shift output SFOh-j from the first shift register 360-j belonging to the j-th group. The gray-scale data held in the flip-flops of the first data latch 340-j belonging to the j-th group is output to the line latch 372 as latch data LAT1-j to LAT160-j.

Each of the N second data latches 350-1 to 350-N belongs to one of the first to N-th groups. Each of the N second data latches 350-1 to 350-N holds the gray-scale data on the gray-scale bus 310 based on the shift outputs from the N second shift registers 370-1 to 370-N.

The second data latch 350-j belonging to the j-th group includes a plurality of flip-flops FF161-j to FF320-j (not shown) which correspond respectively to the data output sections OUT161 to OUT320. The flip-flop FFh-j (161≦h≦320) holds the gray-scale data on the gray-scale bus 310 based on the shift output SFOh-j from the second shift register 370*j* belonging to the j-th group. The gray-scale data held in the flip-flops of the second data latch 350-j belonging to the j-th group is output to the line latch 372 as latch data LAT161-j to LAT320-j.

In FIG. 14, the gray-scale data held in the N first data latches 340-1 to 340-N and the N second data latches 350-1 to 350-N is latched by the line latch 372. However, the present invention is not limited thereto. The gray-scale data held in the N first data latches 340-1 to 340-N and the N second data latches 350-1 to 350-N may be directly output to the multiplexer 380. However, the gray-scale data can be continuously captured without rewriting the preceding gray-scale data by providing the line latch 372 between the data latch and the multiplexer 380. Moreover, since the data line can be driven after stabilizing the gray-scale data, deterioration of image quality can be prevented.

In FIG. 14, the line latch 372 is shared by each group. However, the present invention is not limited thereto. For example, the line latch 372 may be considered as 2×N sets of line latches, each of the line latches belonging to one of the first to N-th groups and latching the gray-scale data held in the first or second data latch in each group.

The gray-scale data latched by the line latch 372 is multiplexed by the multiplexer 380. In more detail, the multiplexer 380 generates first multiplexed data MD1 to MD160 in which the gray-scale data held in the first data latch in each group (N sets of gray-scale data for RGB) is multiplexed, and generates second multiplexed data MD161 to MD320 in which the gray-scale data held in the second data latch in each group (N sets of gray-scale data for RGB) is multiplexed. In more detail, the multiplexer 380 generates the first multiplexed data MDf (1≦f≦160, f is an integer) in which the gray-scale data LATf-1 to LATf-N held in the flip-flops FFf-1 to FFf-N of the N first data latches is multiplexed, and generates the second multiplexed data MDg (161≦g≦320, g is an integer) in which the gray-scale data LATg-1 to LATg-N held in the flip-flops FFg-1 to FFg-N of the N second data latches is multiplexed.

The first multiplexed data MD1 to MD160 is generated by multiplexing the gray-scale data held in the flip-flops FF1-1 to FF160-N of the N first data latches at time division timing shown in FIG. 9B, for example.

The second multiplexed data MD161 to MD320 is generated by multiplexing the gray-scale data held in the flip-flops FF161-1 to FF320-N of the N second data latches at time division timing shown in FIG. 9B, for example.

Figure 17:
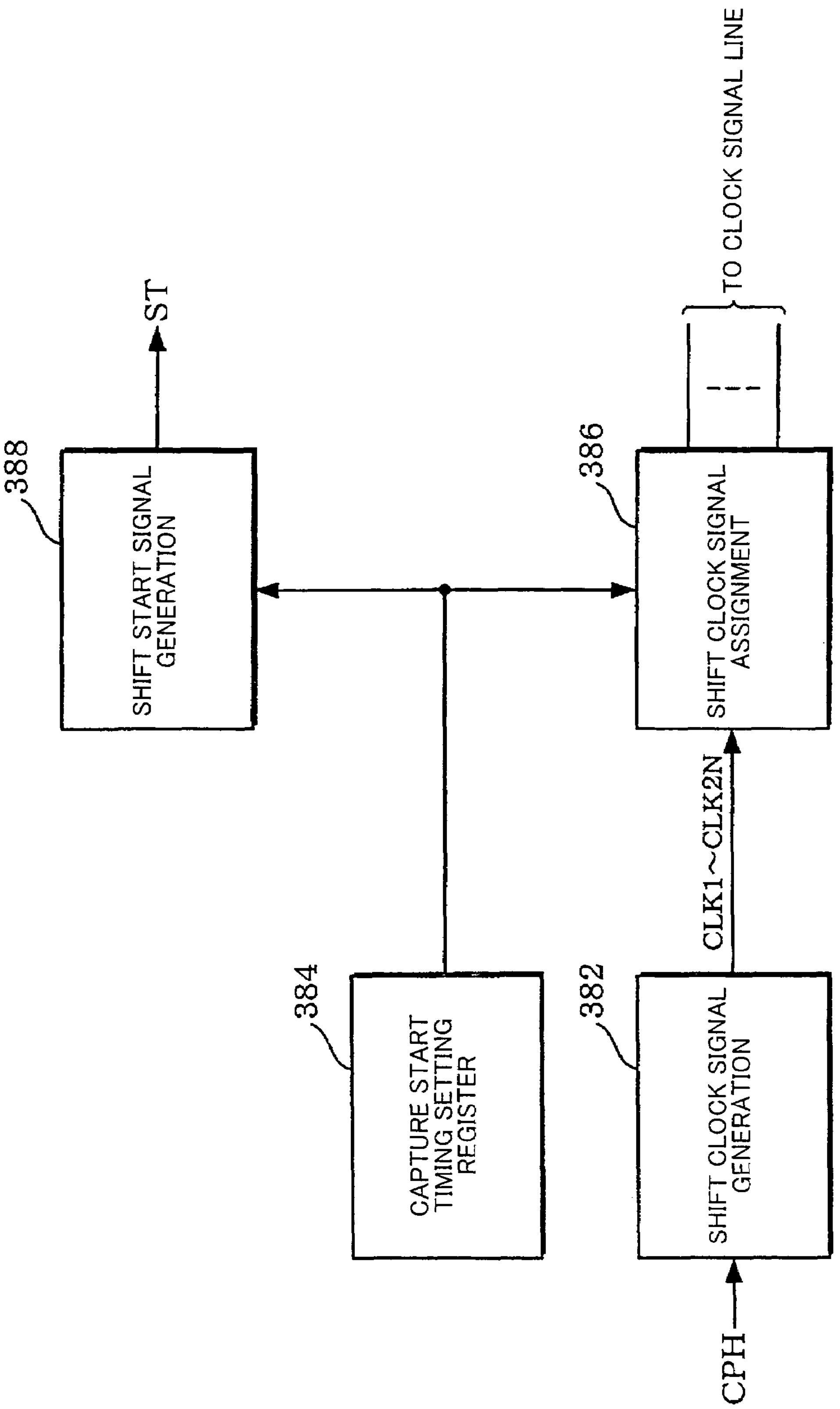
FIG. 17 is a configuration diagram of a circuit block which generates first to 2N-th shift clock signals.

FIG. 17 shows an outline of a configuration of a circuit block which generates the first to 2N-th shift clock signals. This circuit block may be included in the data latch 300.

A shift clock signal generation circuit 382 generates the first to 2N-th shift clock signals based on the reference clock signal.

A capture start timing setting register 384 is a register which can be set by the host or the like. The capture,start timing setting register 384 is a register for setting the period between a capture start timing instruction signal EIO and the starting time of capturing the gray-scale data. The capture start timing instruction signal EIO is input from the controller in order to instruct the starting time of capturing the gray-scale data. The gray-scale data is supplied from the controller after the controller has changed the capture start timing instruction signal EIO. The period between the capture start timing instruction signal EIO and the starting time of capturing the gray-scale data is determined by the timing at which the controller supplies the gray-scale data to the display driver 200. The timing at which the gray-scale data is supplied to the display driver 200 based on the capture start timing instruction signal EIO differs depending on the type of the controller. The user may use a capture start timing setting register 384 in order to absorb the timing dependent on the controller.

The capture start timing setting register 384 is a register which can be set by the host or the like. The number of reference clock signals CPH between the changing time (rising edge or falling edge) of the capture start timing instruction signal EIO and the starting time of capturing the gray-scale data is set in the capture start timing setting register 384.

A shift clock signal assignment circuit 386 assigns and outputs each of the first to 2N-th shift clock signals generated by the shift clock signal generation circuit 382 to one of the first and second clock signal lines 320-1 to 320-N and 330-1 to 330-N belonging to the first to N-th groups corresponding to the content of the capture start timing setting register 384. In more detail, the shift clock signal assignment circuit 386 assigns and outputs each of the first to 2N-th shift clock signals (2×N shift clock signals) to one of the first and second clock signal lines 320-1 to 320-N and 330-1 to 330-N belonging to the first to N-th groups corresponding to the number of reference clock signals CPH between the changing time of the capture start timing instruction signal EIO and the starting time of capturing the gray-scale data.

A shift start signal generation circuit 388 generates the shift start signal ST based on the content of the capture start timing setting register 384. In more detail, the shift start signal generation circuit 388 changes the changing time (rising edge or falling edge) of the shift start signal ST corresponding to the content of the capture start timing setting register 384. This enables the gray-scale data from various controllers of which the supply timing of the gray-scale data is not constant to be captured.

The shift start signal ST becomes the shift start signals ST1-1 to ST1-N and ST2-1 to ST2-N output to the first and second shift registers 360-1 to 360-N and 370-1 to 370-N belonging to the first to N-th groups. The shift start signal ST may be signals which are separately generated for the first and second shift registers 360-1 to 360-N and 370-1 to 370-N belonging to the first to N-th groups, or a signal having the same phase input in common to the first and second shift registers 360-1 to 360-N and 370-1 to 370-N.

In this example, the capture start timing setting register 384 and the shift start signal generation circuit 388 are included in the display driver which drives the comb-tooth distributed LCD panel. However, the capture start timing setting register 384 and the shift start signal generation circuit 388 may be included in a display driver which drives an LCD panel which is not comb-tooth distributed.

In this case, the display driver drives data lines or data signal supply lines of the LCD panel. The display driver includes a gray-scale bus to which gray-scale data is supplied, a capture start timing setting register for setting a period between a changing time of a given capture start timing instruction signal and a starting time of capturing the gray-scale data, and a shift start signal generation circuit which generates a shift start signal based on the content of the capture start timing setting register. The display driver further includes a shift register which includes a plurality of flip-flops, shifts the shift start signal based on a given shift clock signal, and outputs the shift output from each of the flip-flops, and a data latch which includes a plurality of flip-flops, each of the flip-flops holding the gray-scale data based on the shift output from the shift register. The display driver outputs a data signal corresponding to the gray-scale data held in the data latch to the data lines by using a data line driver circuit provided instead of the data-signal-supply-line driver circuit shown in FIG. 12.

Figure 18:
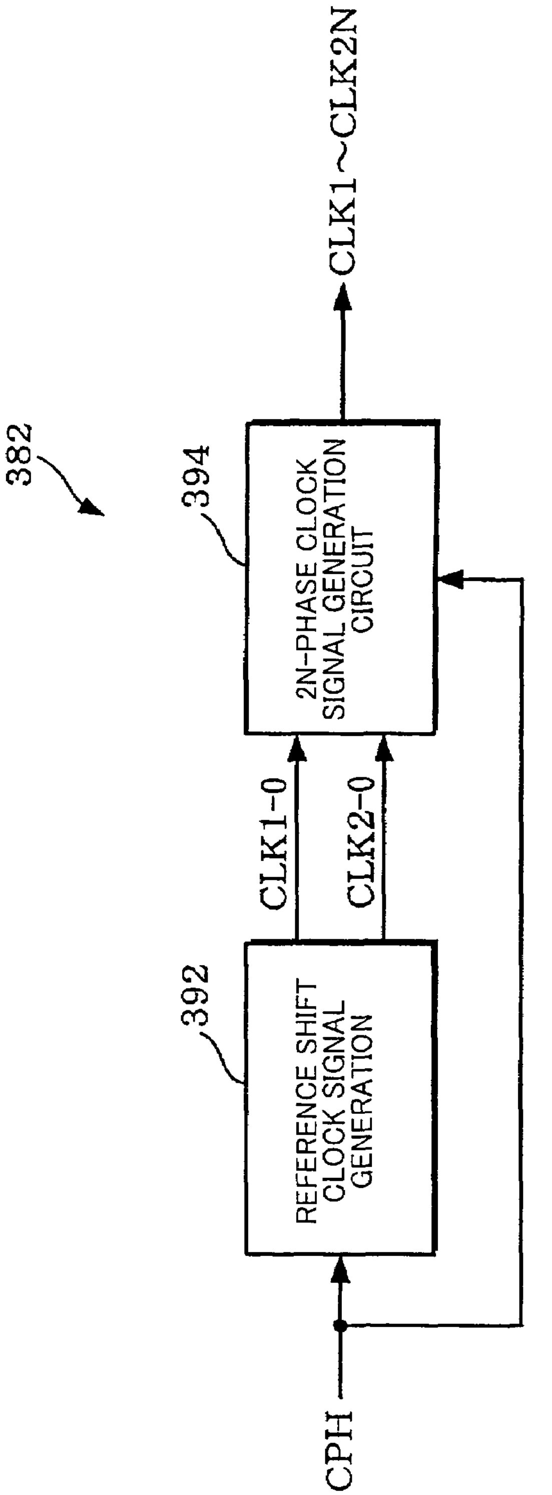
FIG. 18 is a block diagram schematically showing a configuration of a shift clock signal generation circuit.

FIG. 18 shows an outline of a configuration of the shift clock signal generation circuit 382. The shift clock signal generation circuit 382 includes a reference shift clock signal generation circuit 392 and a 2N-phase clock signal generation circuit 394.

The reference shift clock signal generation circuit 392 generates reference shift clock signals CLK1-0 and CLK2-0 based on the reference clock signal CPH. The 2N-phase clock signal generation circuit 394 generates first to 2N-th shift clock signals CLK1 to CLK2N based on the reference shift clock signals CLK1-0 and CLK2-0. The first to 2N-th shift clock signals CLK1 to CLK2N (2×N shift clock signals) include a period in which the shift clock signals CLK1 to CLK2N differ in phase.

The expression "two clock signals differ in phase" may refer to the relationship in which the waveforms of the two clock signals become approximately the same by eliminating the shift on the time axis. When the waveform of one clock signal is expressed by $f(t)$ and the waveform of the other clock signal is expressed by $f(t+\Delta t)$, the two clock signals differ in phase.

This enables the first to 2N-th shift clock signals CLK1 to CLK2N to be generated by using a simple configuration.

In the reference shift clock signal generation circuit 392, the shift start signals ST1-1 to ST1-j and ST2-1 to ST2-j in the first to N-th groups are allowed to have the same phase by generating the first to 2N-th shift clock signals CLK1 to CLK2N by using the reference shift clock signals CLK1-0 and CLK2-0 as described below, whereby the configuration and control can be simplified.

Figure 19:
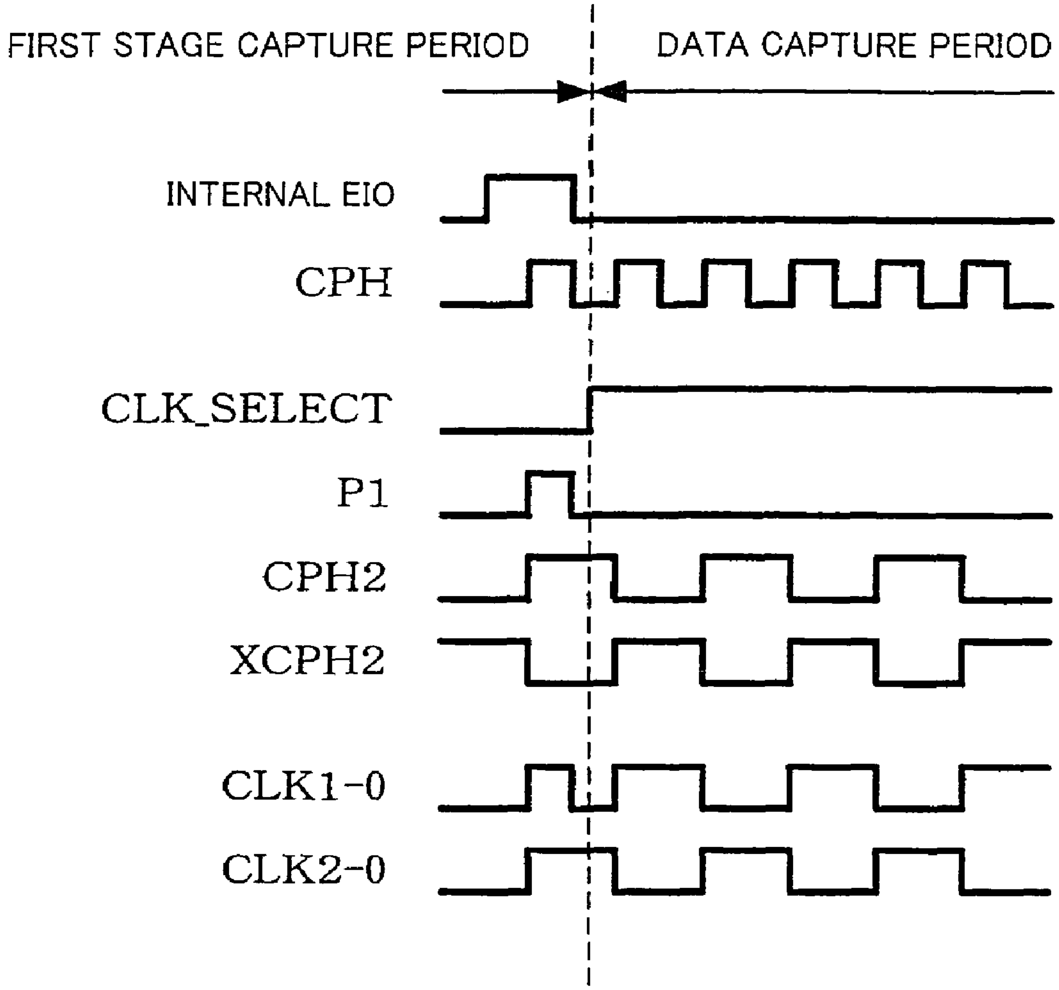
FIG. 19 is a timing diagram showing an example of generation timing of a reference shift clock signal by a reference shift clock signal generation circuit.

FIG. 19 shows an example of generation timing of the reference shift clock signals CLK1-0 and CLK2-0 by the reference shift clock signal generation circuit 392. An internal EIO signal is the capture start timing instruction signal EIO input to the display driver 200 from the controller and captured in the display driver 200. In order to allow the shift start signals ST1-1 to ST1-N and ST2-1 to ST2-N to have the same phase, it is necessary to capture the shift start signal in the first stage of the first and second shift registers in each group.

The reference shift clock signal generation circuit 392 generates a clock signal select signal CLK_SELECT which specifies a first stage capture period and a data capture period (shift operation period).

The first stage capture period may be referred to as a period in which the shift start signals ST1-1 to ST1-N are captured in the N first shift registers 360-1 to 360-N or a period in which the shift start signals ST2-1 to ST2-N are captured in the N second shift registers 370-1 to 370-N. The data capture period may be referred to as a period in which the shift start signal captured in the first stage capture period is shifted after the first stage capture period has elapsed.

The reference shift clock signals CLK1-0 and CLK2-0 are provided with edges for capturing the shift start signals by using the clock signal select signal CLK_SELECT.

Therefore, a pulse P1 of the reference clock signal CPH is generated in the first stage capture period. A frequency-divided clock signal CPH2 is generated by dividing the frequency of the reference clock signal CPH. The frequency-divided clock signal CPH2 is the reference shift clock signal CLK2-0. An inverted frequency-divided clock signal XCPH2 is generated by reversing the phase of the frequency-divided clock signal CPH2.

The reference shift clock signal CLK1-0 is generated by selectively outputting the pulse P1 of the reference clock signal CPH in the first stage capture period and selectively outputting the inverted frequency-divided clock signal XCPH2 in the data capture period by using the clock signal select signal CLK_SELECT.

Figure 20:
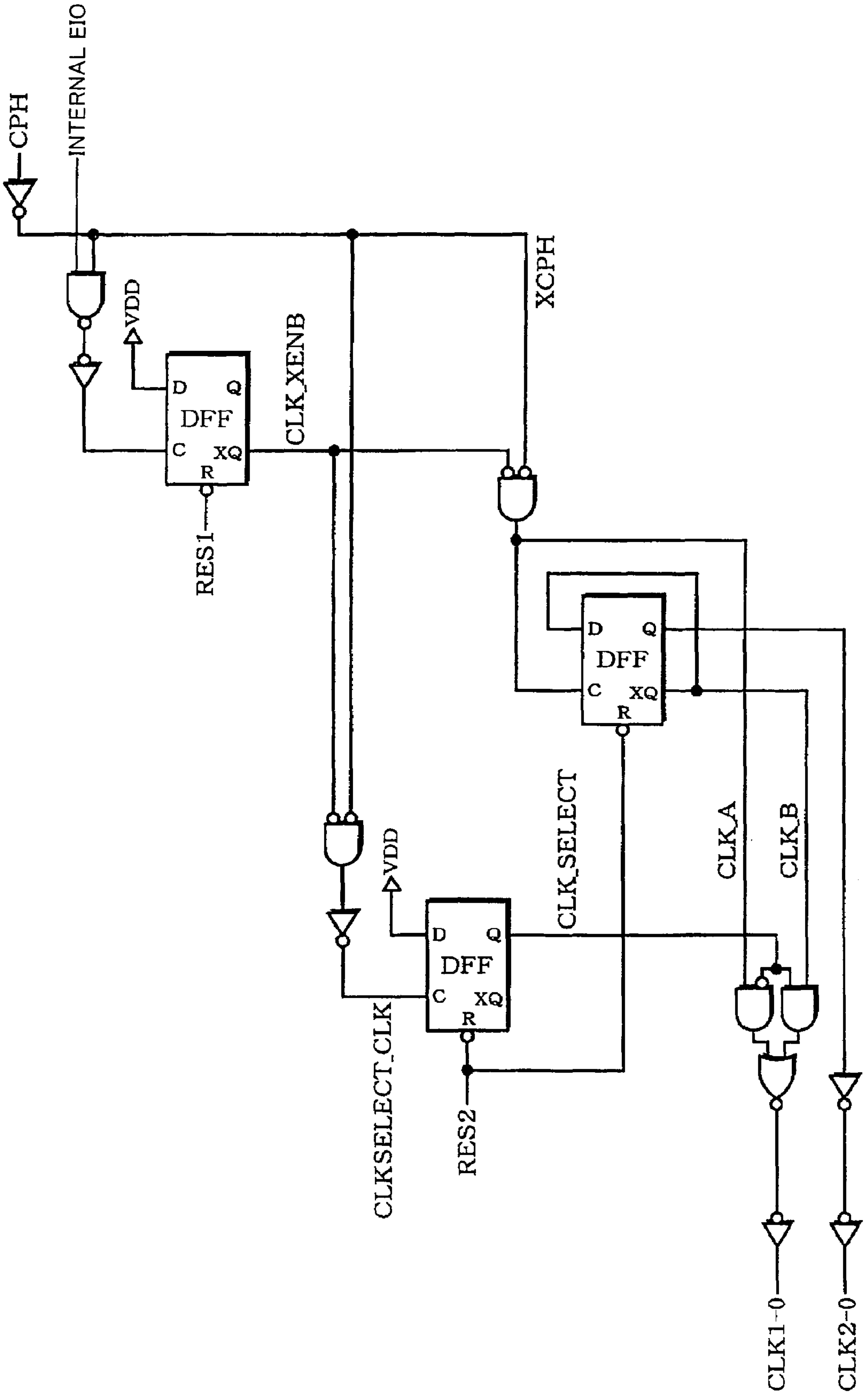
FIG. 20 is a circuit diagram showing a configuration example of a reference shift clock signal generation circuit.

FIG. 20 shows a circuit diagram which is a specific configuration example of the reference shift clock signal generation circuit 392.

Figure 21:
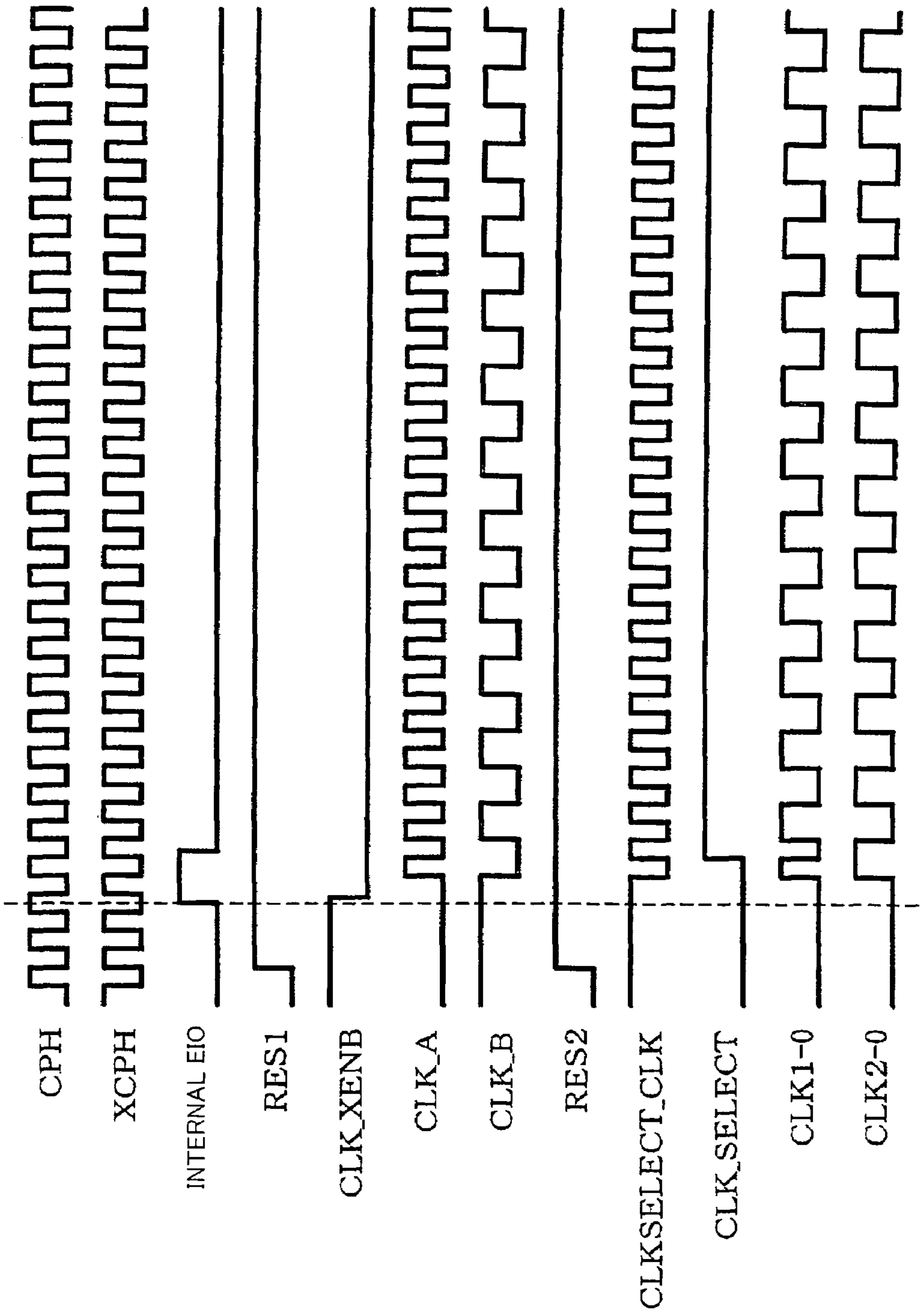
FIG. 21 is a timing diagram showing an operation example of the reference shift clock signal generation circuit shown in FIG. 20.

FIG. 21 shows an example of operation timing of the reference shift clock signal generation circuit 392 shown in FIG. 20.

In FIGS. 20 and 21, clock signals CLK_A and CLK_B are generated by using the reference clock signal CPH, and selectively output by using the clock signal select signal CLK_SELECT. The reference shift clock signal CLK2-0 is a signal generated by reversing the clock signal CLK_B. The reference shift clock signal CLK1-0 is a signal generated by selectively outputting the clock signal CLK_A in the first stage capture period in which the clock signal select signal CLK_SELECT is set at "L", and selectively outputting the clock signal CLK_B in the data capture period in which the clock signal select signal CLK_SELECT is set at "H".

The 2N-phase clock signal generation circuit 394 generates the first to 2N-th shift clock signals CLK1 to CLK2N based on the reference shift clock signals CLK1-0 and CLK2-0 generated as described above.

Figure 22:
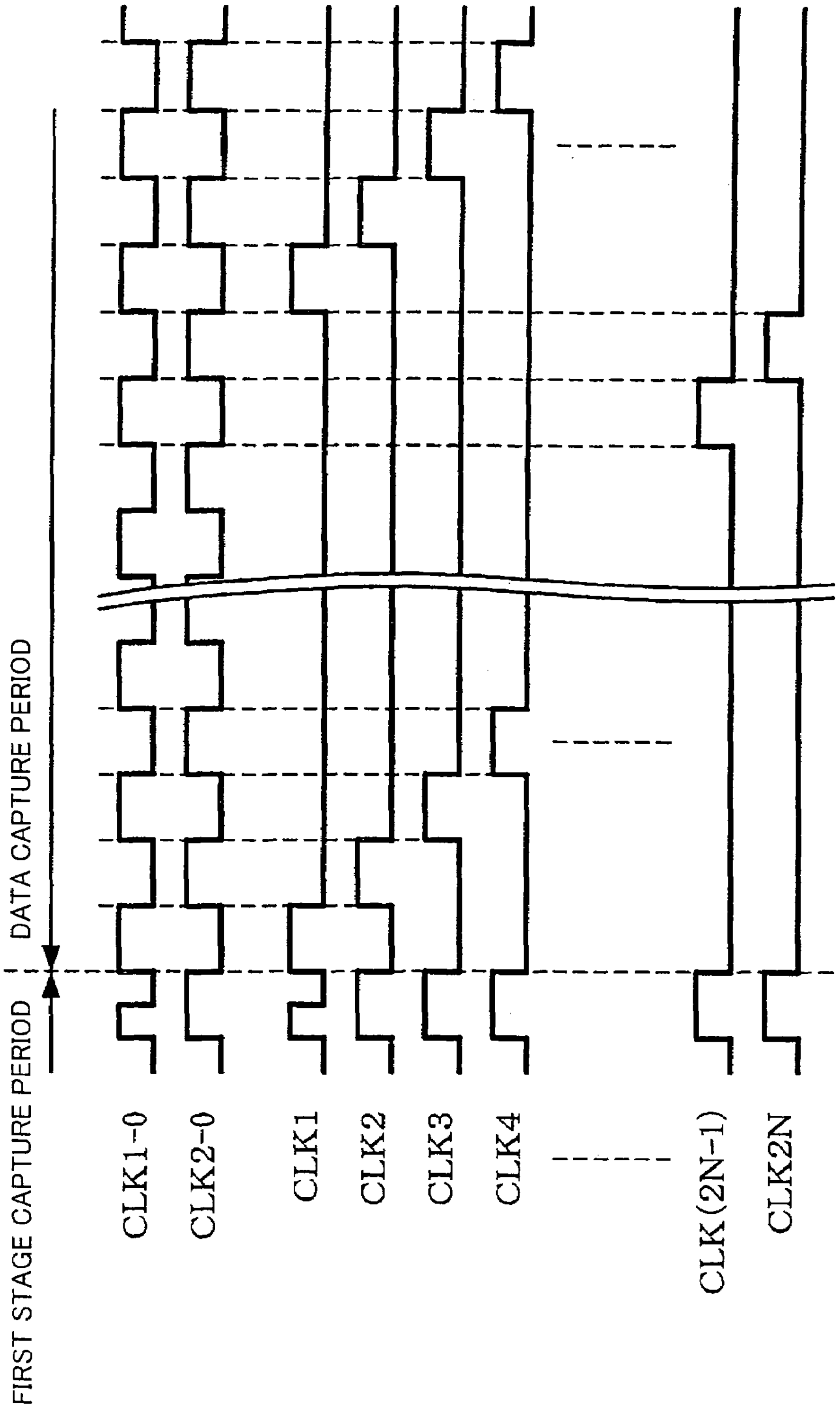
FIG. 22 is a timing diagram showing a generation example of first to 2N-th shift clock signals in a 2N-phase clock signal generation circuit.

FIG. 22 shows a generation example of the first to 2N-th shift clock signals CLK1 to CLK2N in the 2N-phase clock signal generation circuit 394. The 2N-phase clock signal generation circuit 394 generates the first to 2N-th shift clock signals CLK1 to CLK2N which include a period in which the first to 2N-th shift clock signals CLK1 to CLK2N differ in phase based on the reference shift clock signals CLK1-0 and CLK2-0. In more detail, in order to allow the shift start signals in the first stage of each shift register to have the same phase, the first to 2N-th shift clock signals CLK1 to CLK2N have a given pulse in the first stage capture period for capturing the shift start signals in the N first shift registers and the N second shift registers, and differ in phase in the data capture period after the first stage capture period has elapsed.

When the waveform of the first shift clock signal CLK1 is expressed by f(t), the waveform of the p-th shift clock signal CLKp ($1 \leqq p \leqq 2 \times N$, p is an integer) may be expressed by f ($t+2\pi p/N$).

Figure 23:
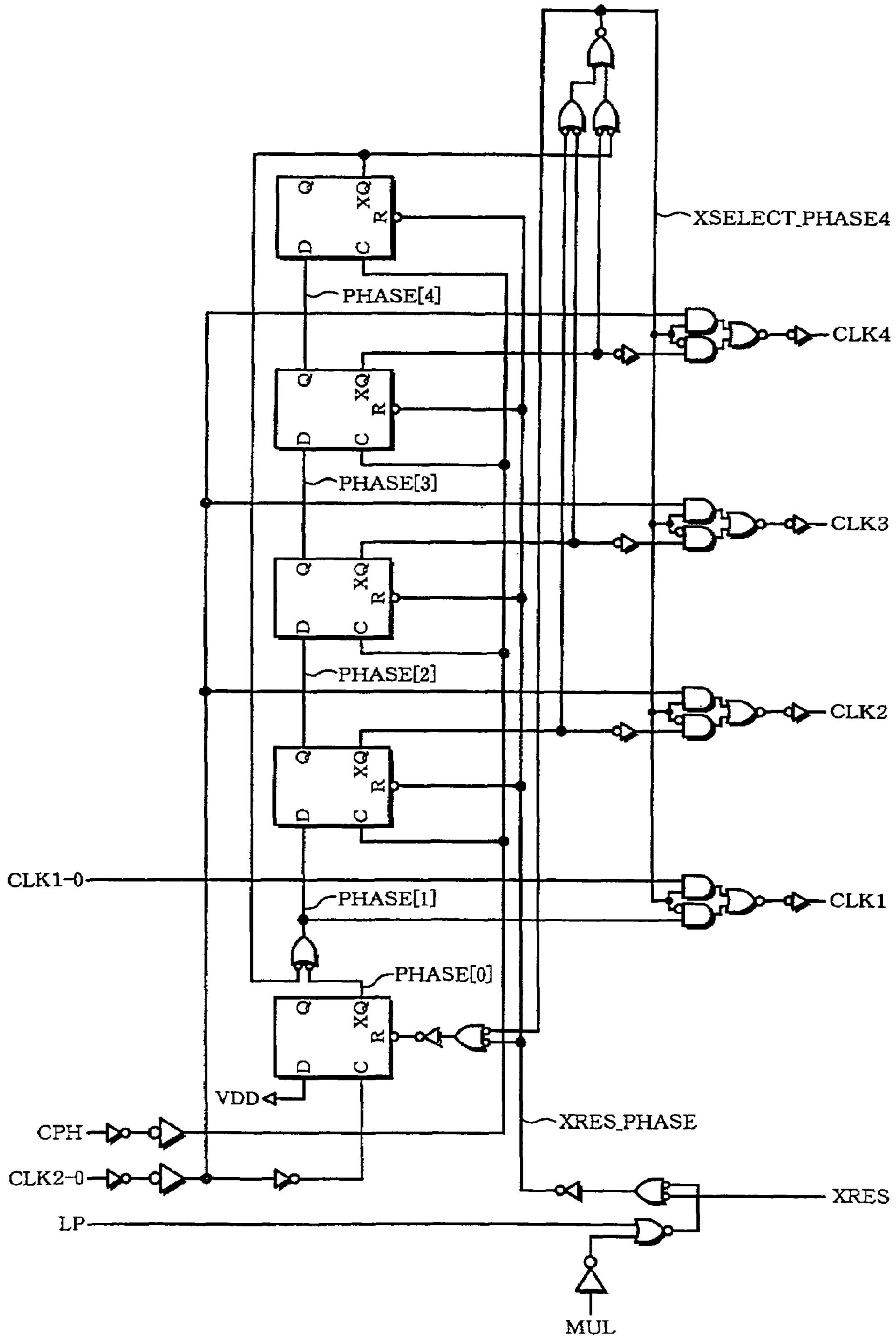
FIG. 23 is a circuit diagram showing a configuration example of a 2N-phase clock signal generation circuit.

FIG. 23 shows a specific configuration example of the 2N-phase clock signal generation circuit 394. FIG. 23 shows the case where N is set at "2". In FIG. 23, the first to fourth (=2×2) shift clock signals CLK1 to CLK4 are generated from the reference shift clock signals CLK1-0 and CLK2-0.

Figure 24:
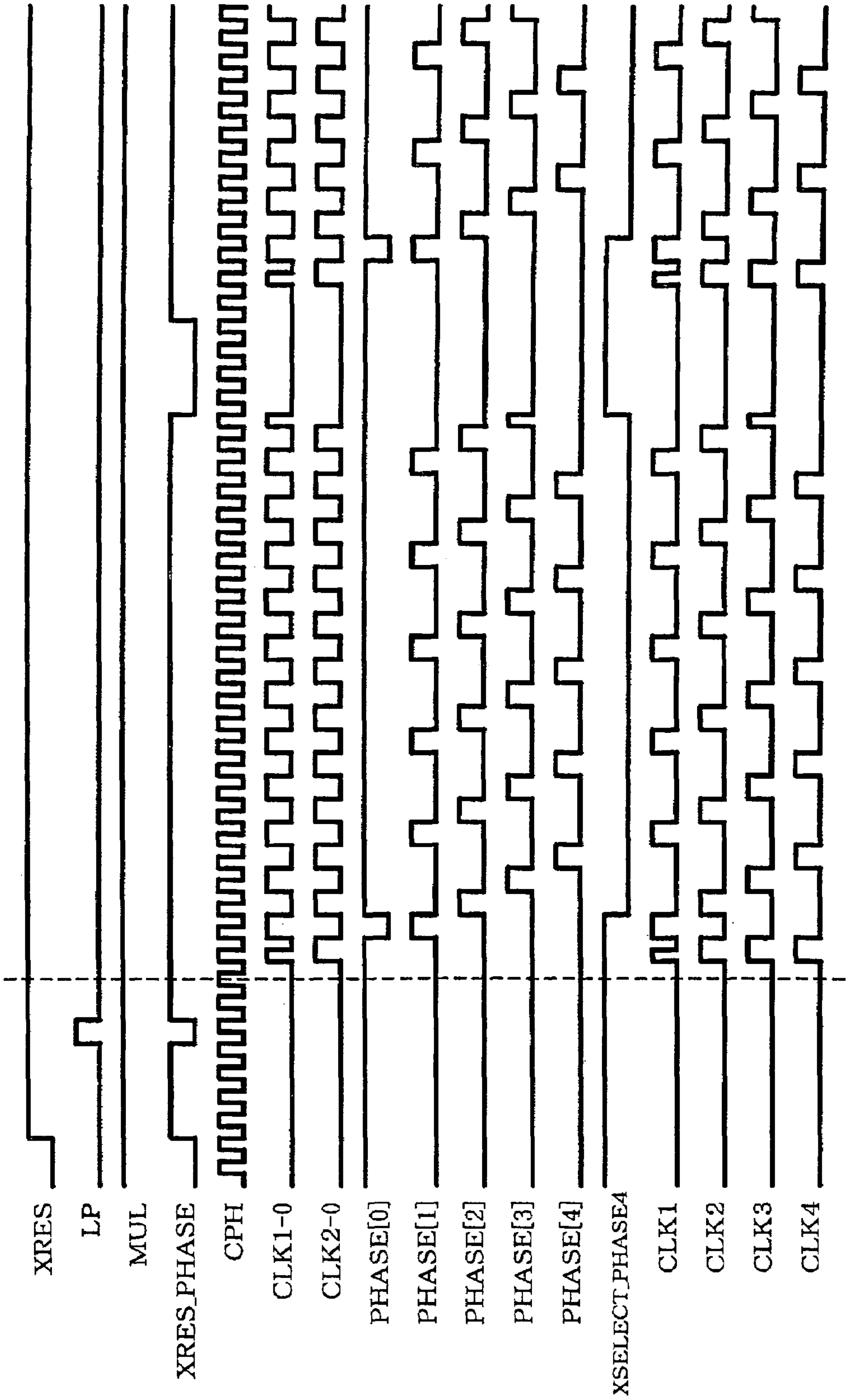
FIG. 24 is a timing diagram showing an operation example of the 2N-phase clock signal generation circuit shown in FIG. 23.

FIG. 24 shows an example of operation timing of the 2N-phase clock signal generation circuit 394 shown in FIG. 23.

A latch pulse LP is a signal which specifies the horizontal scanning period.

N is set at "2" in FIGS. 23 and 24. Therefore, three-dot multiplex drive when N is "1" and six-dot multiplex drive when N is "2" can be switched by the multiplex control signal MUL. In three-dot multiplex drive, only the first and second shift clock signals CLK1 and CLK2 are used. In six-dot multiplex drive, the first to fourth shift clock signals CLK1 to CLK4 are used. The 2×N phase clock signal generation circuit 394 may generate the first to fourth shift clock signals CLK1 to CLK4 for six-dot multiplex drive when the logic level of the multiplex control signal MUL is "H", and generate the first and second shift clock signals CLK1 and CLK2 for three-dot multiplex drive when the logic level of the multiplex control signal MUL is "L".

In FIG. 24, the pulse in the first stage capture period is output by using a select phase signal XSELECT_PHASE4, and pulses corresponding to the phase signals PHASE [1:4] shifted by using the reference clock signal CPH are then output.

Figure 25:
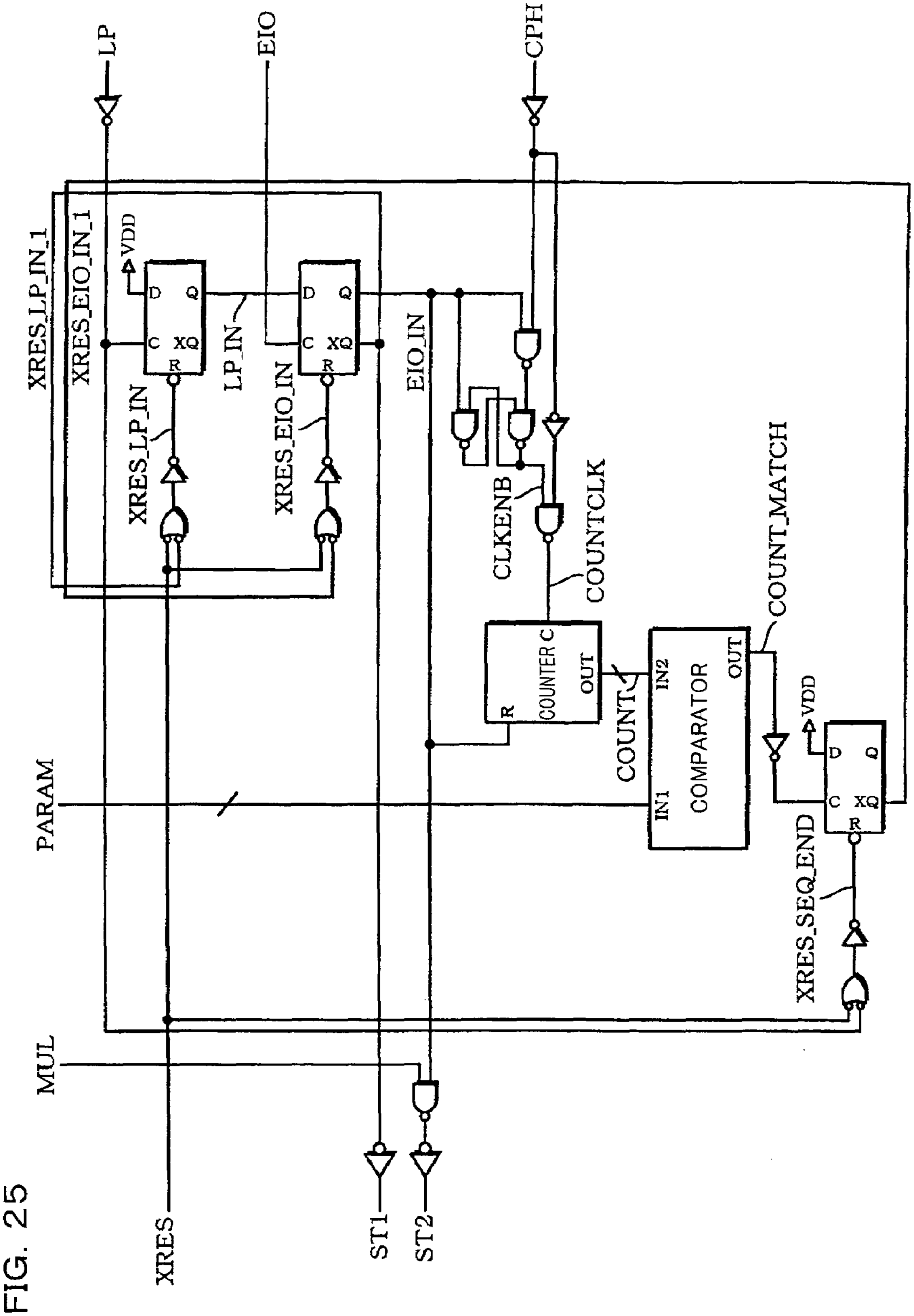
FIG. 25 is a circuit diagram showing a configuration example of a shift start signal generation circuit.

FIG. 25 shows a specific configuration example of the shift start signal generation circuit 388.

Figure 26:
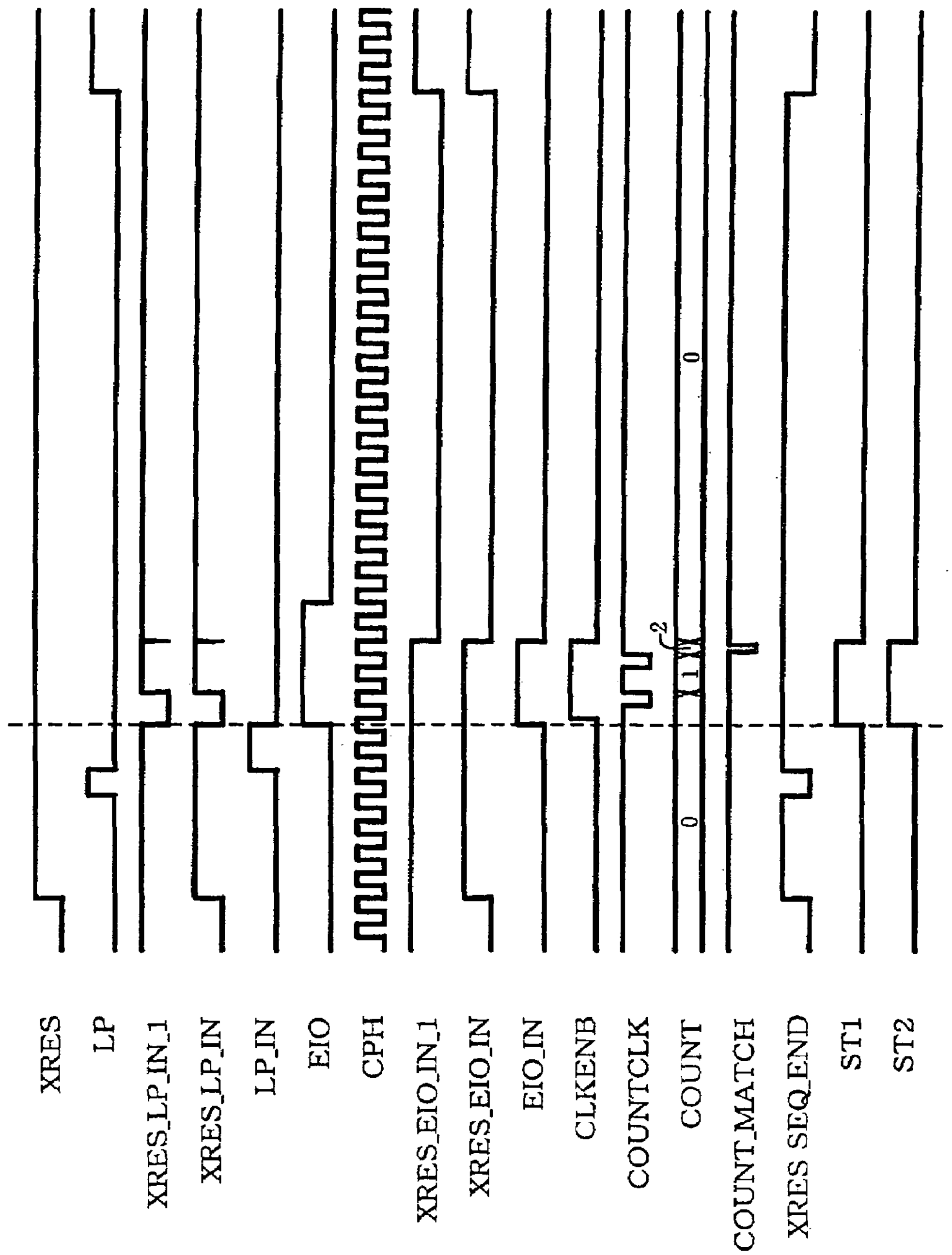
FIG. 26 is a timing diagram showing an operation example of the shift start signal generation circuit shown in FIG. 25.

FIG. 26 shows an operation example of the shift start signal generation circuit 388 shown in FIG. 25. In FIG. 25, set data PARAM (four bits, for example) of the capture start timing setting register 384 is input to the shift start signal generation circuit 388. The shift start signals ST1-1 to ST1-N input to the first shift registers 360-1 to 360-N belonging to the first to N-th groups are indicated as the common shift start signal ST1. The shift start signals ST2-1 to ST2-N input to the second shift registers 370-1 to 370-N belonging to the first to N-th groups are indicated as the common shift start signal ST2.

In FIG. 25, the shift start signal generation circuit 388 includes a counter which counts the number of reference clock signals CPH from the changing time of the capture start timing instruction signal EIO, and a comparator which compares the counted value of the counter with the set data PARAM. The shift start signals ST1 and ST2 are changed by the capture start timing instruction signal EIO, and changed based on the comparison result from the comparator.

FIG. 26 shows an example in which the set data PARAM of the capture start timing setting register 384 is set at "2". The changing time of the shift start signals ST1 and ST2 can be changed in this manner corresponding to the content of the capture start timing setting register 384.

There may be a case where a correct image cannot be displayed even if the shift operation is started by capturing the shift start signal input to the first stage of each shift register by using the first to 2N-th shift clock signals generated as described above. Therefore, each of the first to 2N-th shift clock signals CLK1 to CLK2N must be assigned and output to one of the first and second clock signal lines 320-1 to 320-N and 330-1 to 330-N belonging to the first to N-th groups by using the shift clock signal assignment circuit 386.

Figure 27:
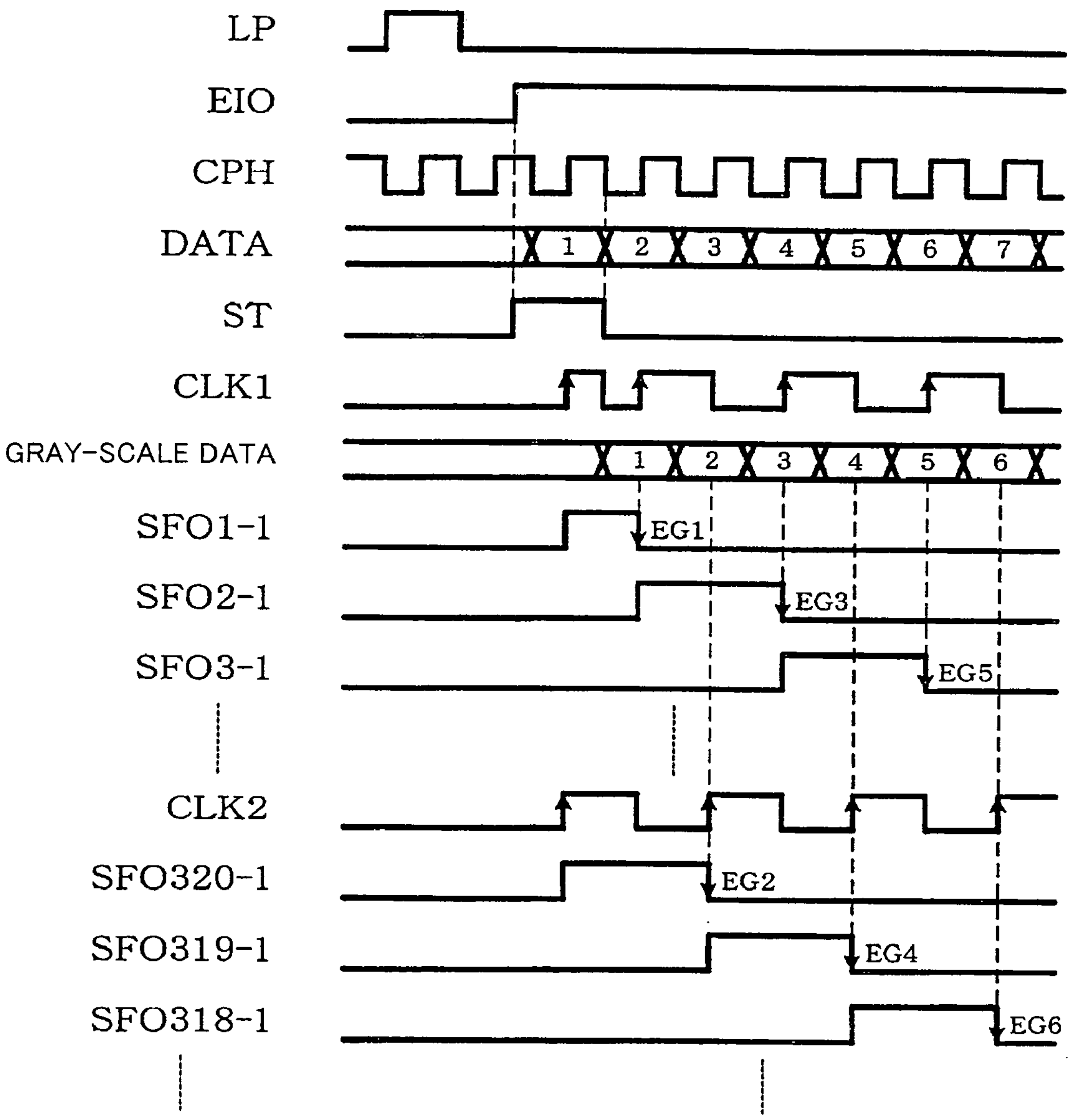
FIG. 27 is a timing diagram of a data latch in a first comparative example.

FIG. 27 shows a first comparative example of the operation timing of the data latch. In the first comparative example, N is set at "1" in the display driver 200 and the first and second shift clock signals CLK1 and CLK2 are respectively assigned and output to the first and second clock signal lines belonging to the first group. FIG. 27 shows the case where the period between the capture start timing instruction signal EIO and the starting time of capturing the gray-scale data at which the gray-scale data (DATA in FIG. 27) supplied from the controller starts to be captured in the data latch 300 is set at "0".

In the display driver 200, the first shift register 360-1 belonging to the first group shifts the shift start signal ST generated by the shift start signal generation circuit 388 in synchronization with the rising edge of the first shift clock signal CLK1. As a result, the first shift register 360-1 belonging to the first group outputs the shift outputs SFO1-1 to SFO160-1 in that order.

The second shift register 370-1 belonging to the first group shifts the shift start signal ST in synchronization with the rising edge of the second shift clock signal CLK2 during the shift operation of the first shift register 360-1 belonging to the first group. As a result, the second shift register 370-1 belonging to the first group outputs the shift outputs SFO320-1 to SFO161-1 in that order.

The first data latch 340-1 belonging to the first group captures the gray-scale data on the gray-scale bus 310 at a falling edge EG of each shift output from the first shift register 360-1 belonging to the first group. As a result, the first data latch 340-1 belonging to the first group captures the gray-scale data D1 at a falling edge EG1 of the shift output SFO1-1, captures the gray-scale data D3 at a falling edge EG3 of the shift output SFO2-1, and captures the gray-scale data D5 at a falling edge EG5 of the shift output SFO3-1, and so on.

The second data latch 350-1 belonging to the first group captures the gray-scale data on the gray-scale bus 310 at a falling edge EG of each shift output from the second shift register 370-1 belonging to the first group. As a result, the second data latch 350-1 belonging to the first group captures the gray-scale data D2 at a falling edge EG2 of the shift output SFO320-1, captures the gray-scale data D4 at a falling edge EG4 of the shift output SFO319-1, and captures the gray-scale data D6 at a falling edge EG6 of the shift output SFO318-1, and so on.

Figure 28:
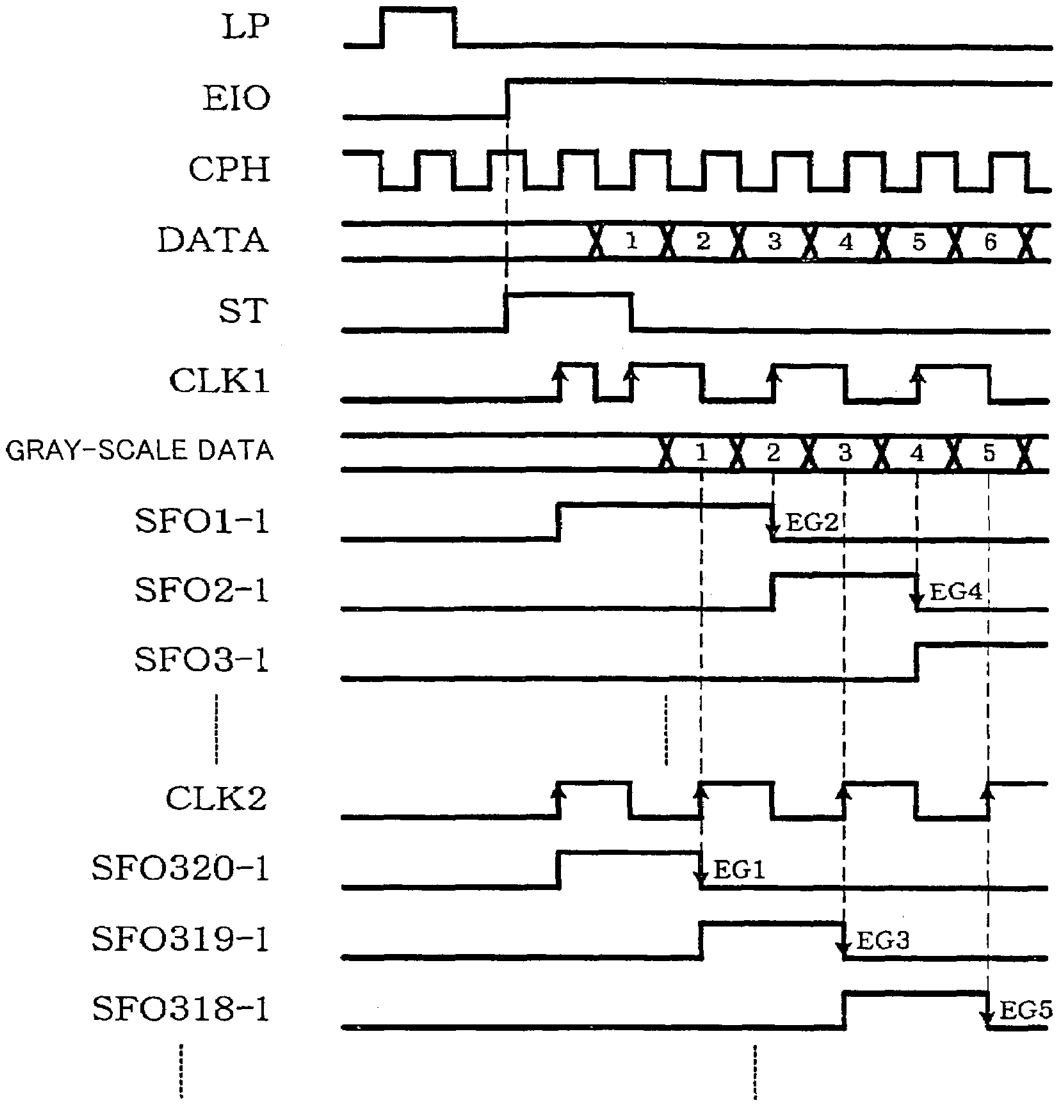
FIG. 28 is a timing diagram of a data latch in a second comparative example.

FIG. 28 shows a second comparative example of the operation timing of the data latch. The second comparative example illustrates the case where the period between the capture start timing instruction signal EIO and the starting time of capturing the gray-scale data at which the gray-scale data (DATA in FIG. 28) supplied from the controller starts to be captured in the data latch 300 is set at "1", differing from the first comparative example.

In the second comparative example, the second data latch 350-1 belonging to the first group captures the gray-scale data D1 at a falling edge EG1 of the shift output SFO320-1, captures the gray-scale data D3 at a falling edge EG3 of the shift output SFO319-1, and captures the gray-scale data D5 at a falling edge EG5 of the shift output SFO318-1, and so on. The first data latch 340-1 belonging to the first group captures the gray-scale data D2 at a falling edge EG2 of the shift output SFO1-1, and captures the gray-scale data D4 at a falling edge EG4 of the shift output SFO2-1, and so on.

As described above, the gray-scale data captured in each data latch differs depending on the period between the capture start timing instruction signal EIO and the starting time of capturing the gray-scale data at which the gray-scale data supplied from the controller starts to be captured in the data latch 300.

In the present embodiment, each of the first to 2N-th shift clock signals CLK1 to CLK2N is assigned and output to one of the first and second clock signal lines 320-1 to 320-N and 330-1 to 330-N belonging to the first to N-th groups by using the shift clock signal assignment circuit 386 as described above.

FIG. 29 shows the assignment content of the first to 2N-th shift clock signals by the shift clock signal assignment circuit 386. FIG. 29 shows the case where N is set at "2" in FIG. 14.

In the case of performing three-dot multiplex drive, when an even number is set in the capture start timing setting register 384, the shift clock signal assignment circuit 386 assigns and outputs the first shift clock signal CLK1 shown in FIG. 24 to the first clock signal line 320-1 belonging to the first group, and assigns and outputs the second shift clock signal CLK2 shown in FIG. 24 to the second clock signal line 330-1 belonging to the first group. When an odd number is set in the capture start timing setting register 384, the shift clock signal assignment circuit 386 assigns and outputs the second shift clock signal CLK2 to the first clock signal line 320-1 belonging to the first group, and assigns and outputs the first shift clock signal CLK1 to the second clock signal line 330-1 belonging to the first group.

Specifically, in the case of performing three-dot multiplex drive, provided that the rising edge or the falling edge of the first reference clock signal CPH immediately after the changing time of the capture start timing instruction signal EIO is "0", the shift clock signal assignment circuit 386 assigns and outputs the first and second shift clock signals CLK1 and CLK2 to either of the first and second clock signal lines belonging to the first group depending on whether the number of reference clock signals CPH between the changing time and the starting time of capturing the gray-scale data is an even number or an odd number.

In the case of performing six-dot multiplex drive, when "4×n (n is a natural number)" is set in the capture start timing setting register 384, the shift clock signal assignment circuit 386 assigns and outputs the first shift clock signal CLK1 to the first clock signal line 320-1 belonging to the first group, the third shift clock signal CLK3 to the second clock signal line 330-1 belonging to the first group, the second shift clock signal CLK2 to the first clock signal line 320-2 belonging to the second group, and the fourth shift clock signal CLK4 to the second clock signal line 330-2 belonging to the second group.

When "4×n+1", "4×n+2", or "4×n+3" is set in the capture start timing setting register 384 in the case of performing six-dot multiplex drive, the shift clock signals are assigned as shown in FIG. 29.

The assignment content of the shift clock signal assignment circuit 386 is appropriately determined corresponding to the waveform of the shift clock signal and the value of N.

As described above, the N first data latches 340-1 to 340-N and the N second data latches 350-1 and 350-N of the data latch 300 can capture the gray-scale data on the gray-scale bus 310 connected in common based on the shift outputs which can be generated separately. The difference in the starting time of capturing the gray-scale data dependent on the controller is absorbed corresponding to the content of the capture start timing setting register 384, and the shift clock signals are assigned to the clock signal lines as described above. This enables the latch data corresponding to each data output section to be captured in the data latch 300 while changing the arrangement order of the gray-scale data on the gray-scale bus.

Therefore, the comb-tooth distributed LCD panel 110 can be driven without using a data scramble IC by driving the data signal supply line from the first side of the LCD panel 110 (electro-optical device) based on the data (LAT1-1 to LAT160-N) held in the flip-flops of the N first data latches 340-1 to 340-N, and driving the data signal supply line from the second side of the LCD panel 110 based on the data (LAT 161-1 to LAT320-N) held in the flip-flops of the N second data latches 350-1 to 350-N.

Moreover, since the gray-scale data on the gray-scale bus 310 can be captured in the data latch at timing which can be separately set, the capture order of the gray-scale data can be changed corresponding to the degree of multiplexing of the gray-scale data, whereby a correct image can be displayed even if 3N-dot multiplex drive is performed for the comb-tooth distributed LCD panel.

The operation of the data latch 300 of the display driver 200 having the above-described configuration is described below.

The case where N is set at "2" in the display driver 200 is described below as an example.

Figure 30:
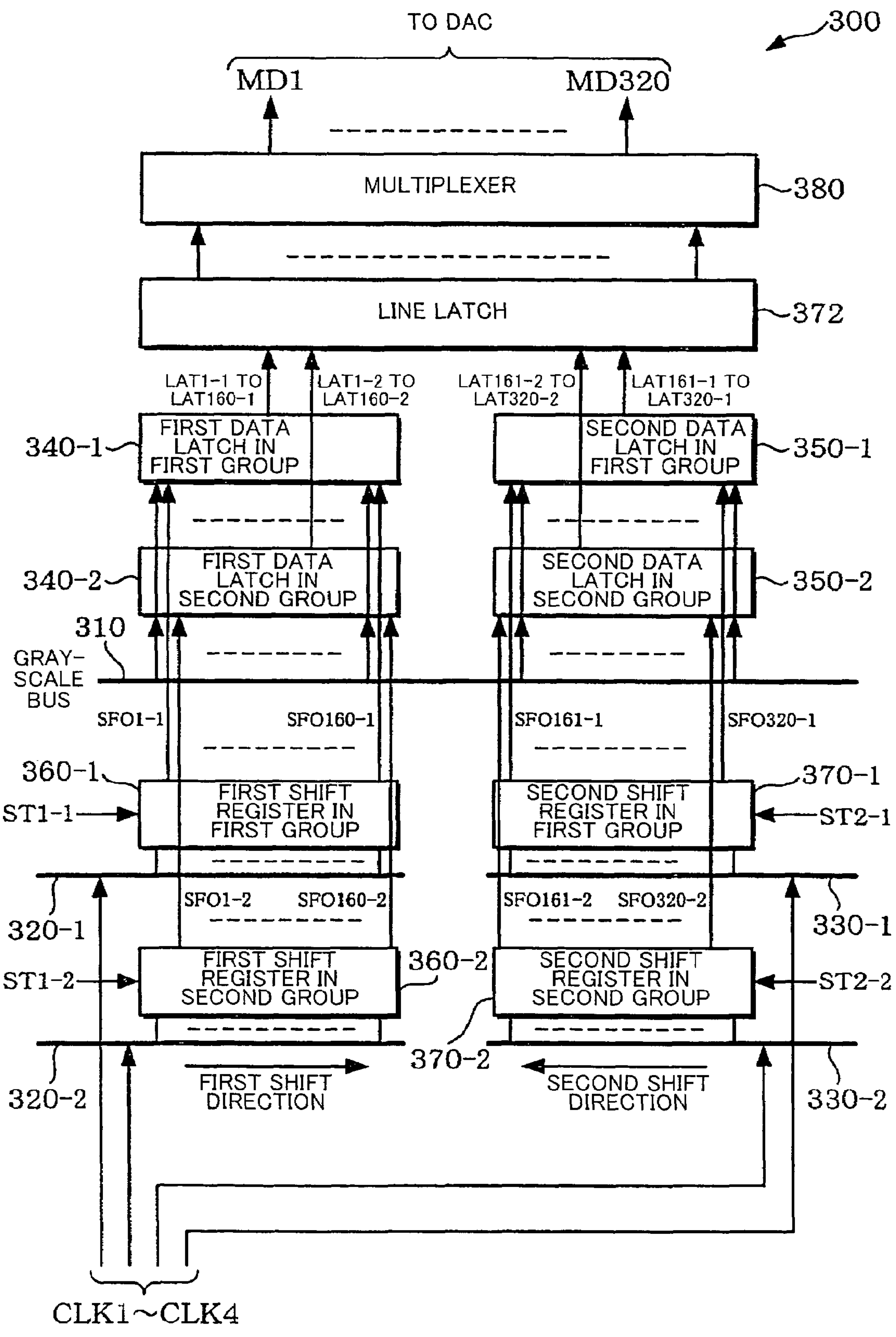
FIG. 30 is a block diagram schematically showing a configuration of a data latch of a display driver when N is "2" in an embodiment of the present invention.

FIG. 30 shows an outline of a configuration of the data latch of the display driver when N is set at "2". In this figure, sections the same as the sections shown in FIG. 14 are indicated by the same symbols and description of these sections is omitted. The display driver 200 including the data latch 300 shown in FIG. 30 can perform three-dot multiplex drive and six-dot multiplex drive by changing the data capture order by changing the logic level of the multiplex control signal.

Figure 31:
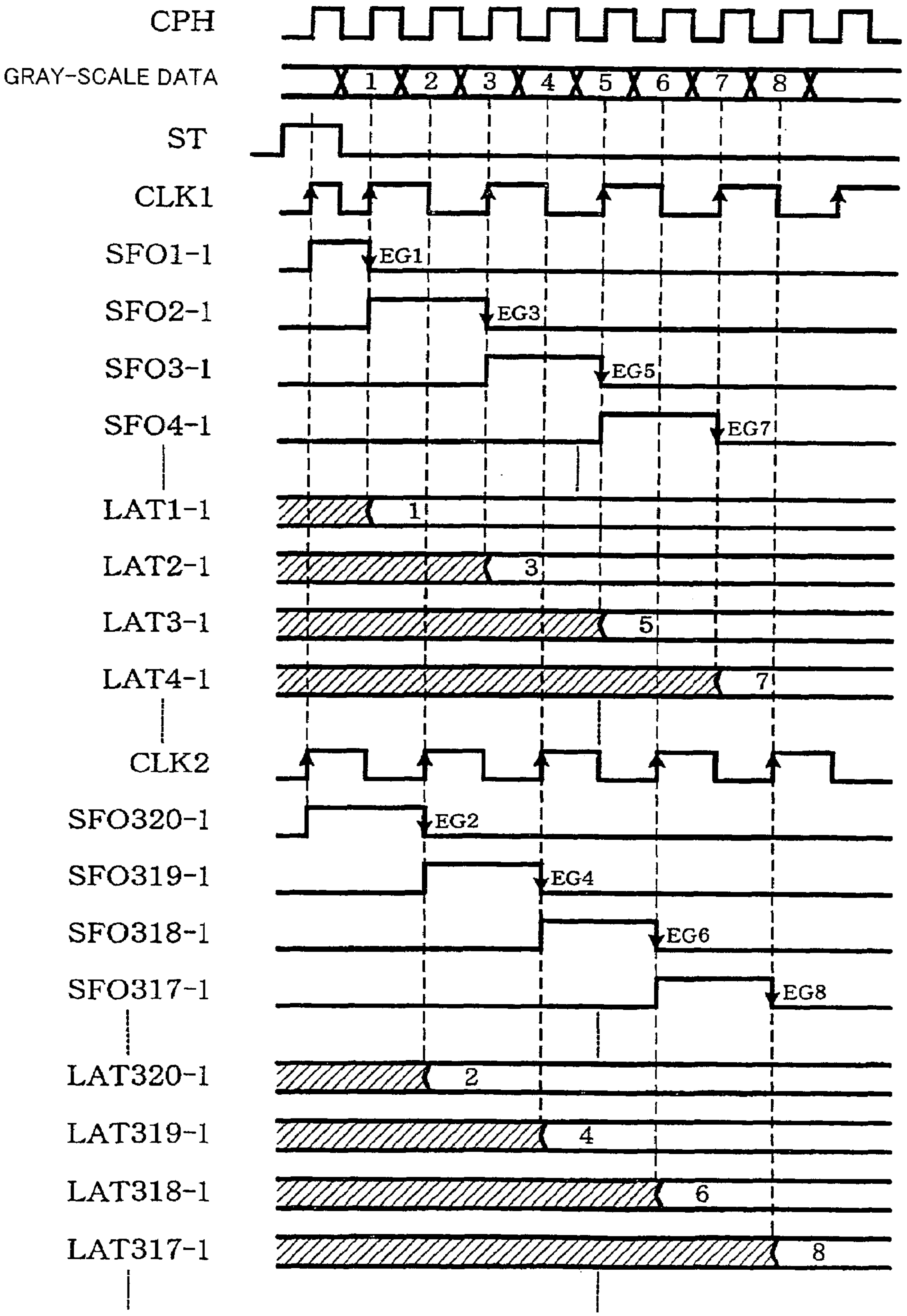
FIG. 31 is a timing diagram showing an example of an operation of a data latch of a display driver in an embodiment of the present invention.

FIG. 31 shows an example of an operation timing chart of the data latch 300 of the display driver 200. FIG. 31 shows timing in the case where the display driver 200 performs three-dot multiplex drive for the electro-optical device 100 shown in FIG. 5. The shift start signals ST1-1, ST1-2, ST2-1, and ST2-2 are indicated as the shift start signal ST having the same phase.

The gray-scale data is supplied to the gray-scale bus 310 corresponding to the arrangement order of the data lines of the LCD panel 110. The gray-scale data includes the gray-scale data for each color component of RGB. In this example, the gray-scale data corresponding to the data signal supply line DL1 selectively connected with the data lines R1-1, G1-1, and B1-1 is illustrated as D1 ("1" in FIG. 31), and the gray-scale data corresponding to the data signal supply line DL2 selectively connected with the data lines R2-1, G2-1, and B2-1 is illustrated as D2 ("2" in FIG. 31), and so on.

The first shift register 360-1 belonging to the first group shifts the shift start signal ST in synchronization with the rising edge of the first shift clock signal CLK1. As a result, the first shift register 360-1 belonging to the first group outputs the shift outputs SFO1-1 to SFO160-1 in that order.

The second shift register 370-1 belonging to the first group shifts the shift start signal ST in synchronization with the rising edge of the second shift clock signal CLK2 during the shift operation of the first shift register 360-1 belonging to the first group. As a result, the second shift register 370-1 belonging to the first group outputs the shift outputs SFO320-1 to SFO161-1 in that order.

The first data latch 340-1 belonging to the first group captures the gray-scale data on the gray-scale bus 310 at a falling edge EG of each shift output from the first shift register 360-1 belonging to the first group. As a result, the first data latch 340-1 belonging to the first group captures the gray-scale data D1 at a falling edge EGI of the shift output SFO1-1, captures the gray-scale data D3 at a falling edge EG3 of the shift output SFO2-1, and captures the gray-scale data D5 at a falling edge EG5 of the shift output SFO3-1, and so on.

The second data latch 350-1 belonging to the first group captures the gray-scale data on the gray-scale bus 310 at a falling edge EG of each shift output from the second shift register 370-1 belonging to the first group. As a result, the second data latch 350-1 belonging to the first group captures the gray-scale data D2 at a falling edge EG2 of the shift output SFO320-1, captures the gray-scale data D4 at a falling edge EG4 of the shift output SFO319-1, and captures the gray-scale data D6 at a falling edge EG6 of the shift output SFO318-1, and so on.

Therefore, the gray-scale data can be captured while changing the arrangement order of the gray-scale data even if three-dot multiplex drive is performed for the electro-optical device 100 shown in FIG. 5, whereby a correct image can be displayed.

Figure 32:
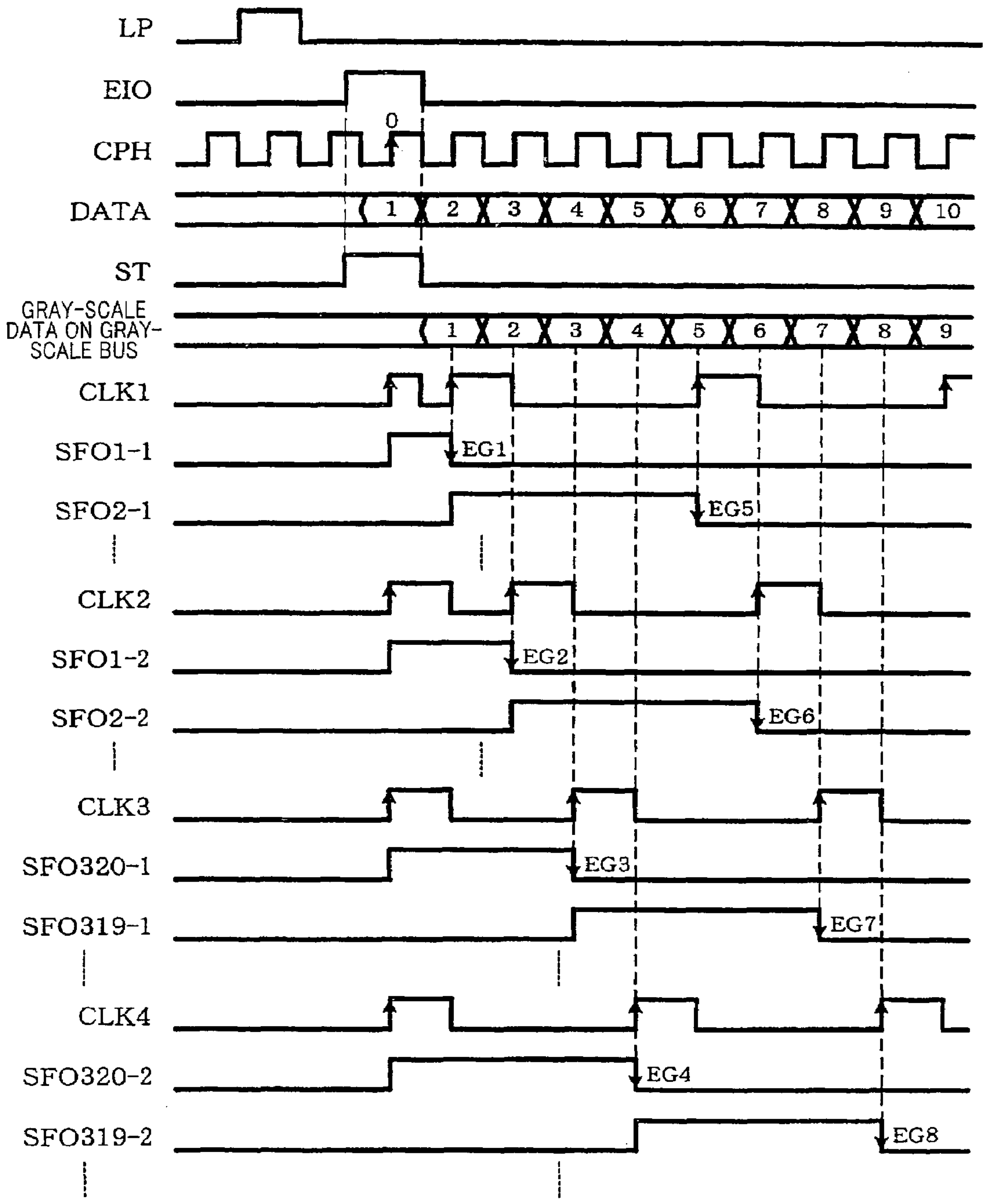
FIG. 32 is a timing diagram showing an operation example of a data latch when "0" is set in a capture start timing setting register in an embodiment of the present invention.

FIG. 32 shows another example of the operation timing chart of the data latch 300 of the display driver 200. FIG. 32 shows timing in the case where the display driver 200 performs six-dot multiplex drive for the electro-optical device 100 shown in FIG. 8. In FIG. 32, “0” is set in the capture start timing setting register 384. Therefore, the first to fourth shift clock signals CLK1 to CLK4 are output to the clock signal lines according to the assignment content shown in FIG. 29.

The gray-scale data is supplied to the gray-scale bus 310 corresponding to the arrangement order of the data lines of the LCD panel 110. In this example, the gray-scale data corresponding to the data signal supply line DL1 selectively connected with the data lines R1-1, G1-1, B1-1, R2-1, G2-1, and B2-1 is illustrated as D1 (“1” in FIG. 32), and the gray-scale data corresponding to the data signal supply line DL2 selectively connected with the data lines R1-2, G1-2, B1-2, R2-2, G2-2, and B2-2 is illustrated as D2 (“2” in FIG. 32), and so on.

The first shift register 360-1 belonging to the first group shifts the shift start signal ST in synchronization with the rising edge of the first shift clock signal CLK1. As a result, the first shift register 360-1 belonging to the first group outputs the shift outputs SFO1-1 to SFO160-1 in that order.

The first shift register 360-2 belonging to the second group shifts the shift start signal ST in synchronization with the rising edge of the second shift clock signal CLK2. As a result, the first shift register 360-2 belonging to the second group outputs the shift outputs SFO1-2 to SFO160-2 in that order.

The second shift register 370-1 belonging to the first group shifts the shift start signal ST in synchronization with the rising edge of the third shift clock signal CLK3 during the shift operation of the first shift registers 360-1 and 360-2 belonging to the first and second groups. As a result, the second shift register 370-1 belonging to the first group outputs the shift outputs SFO320-1 to SFO161-1 in that order.

The second shift register 370-2 belonging to the second group shifts the shift start signal ST in synchronization with the rising edge of the fourth shift clock signal CLK4. As a result, the second shift register 370-2 belonging to the second group outputs the shift outputs SFO320-2 to SFO161-2 in that order.

The first data latch 340-1 belonging to the first group captures the gray-scale data on the gray-scale bus 310 at a falling edge EG of each shift output from the first shift register 360-1 belonging to the first group. As a result, the first data latch 340-1 belonging to the first group captures the gray-scale data D1 at a falling edge EG1 of the shift output SFO1-1, and captures the gray-scale data D5 at a falling edge EG5 of the shift output SFO2-1, and so on.

The first data latch 340-2 belonging to the second group captures the gray-scale data on the gray-scale bus 310 at a falling edge EG of each shift output from the first shift register 360-2 belonging to the second group. As a result, the first data latch 340-2 belonging to the second group captures the gray-scale data D2 at a falling edge EG2 of the shift output SFO1-2, and captures the gray-scale data D6 at a falling edge EG6 of the shift output SFO2-2, and so on.

The second data latch 350-1 belonging to the first group captures the gray-scale data on the gray-scale bus 310 at a falling edge EG of each shift output from the second shift register 370-1 belonging to the first group. As a result, the second data latch 350-1 belonging to the first group captures the gray-scale data D3 at a falling edge EG3 of the shift output SFO320-1, and captures the gray-scale data D7 at a falling edge EG7 of the shift output SFO319-1, and so on.

The second data latch 350-2 belonging to the second group captures the gray-scale data on the gray-scale bus 310 at a falling edge EG of each shift output from the second shift register 370-2 belonging to the second group. As a result, the second data latch 350-2 belonging to the second group captures the gray-scale data D4 at a falling edge EG4 of the shift output SFO320-2, and captures the gray-scale data D8 at a falling edge EG8 of the shift output SFO319-2, and so on.

The gray-scale data for two pixels captured in each group is multiplexed by the multiplexer 380 and output to the data signal supply line, as described above. The LCD panel 110 separates the data signals supplied to the data signal supply line DL by using the demultiplexer, and outputs the data signals to the corresponding data line.

Figure 33:
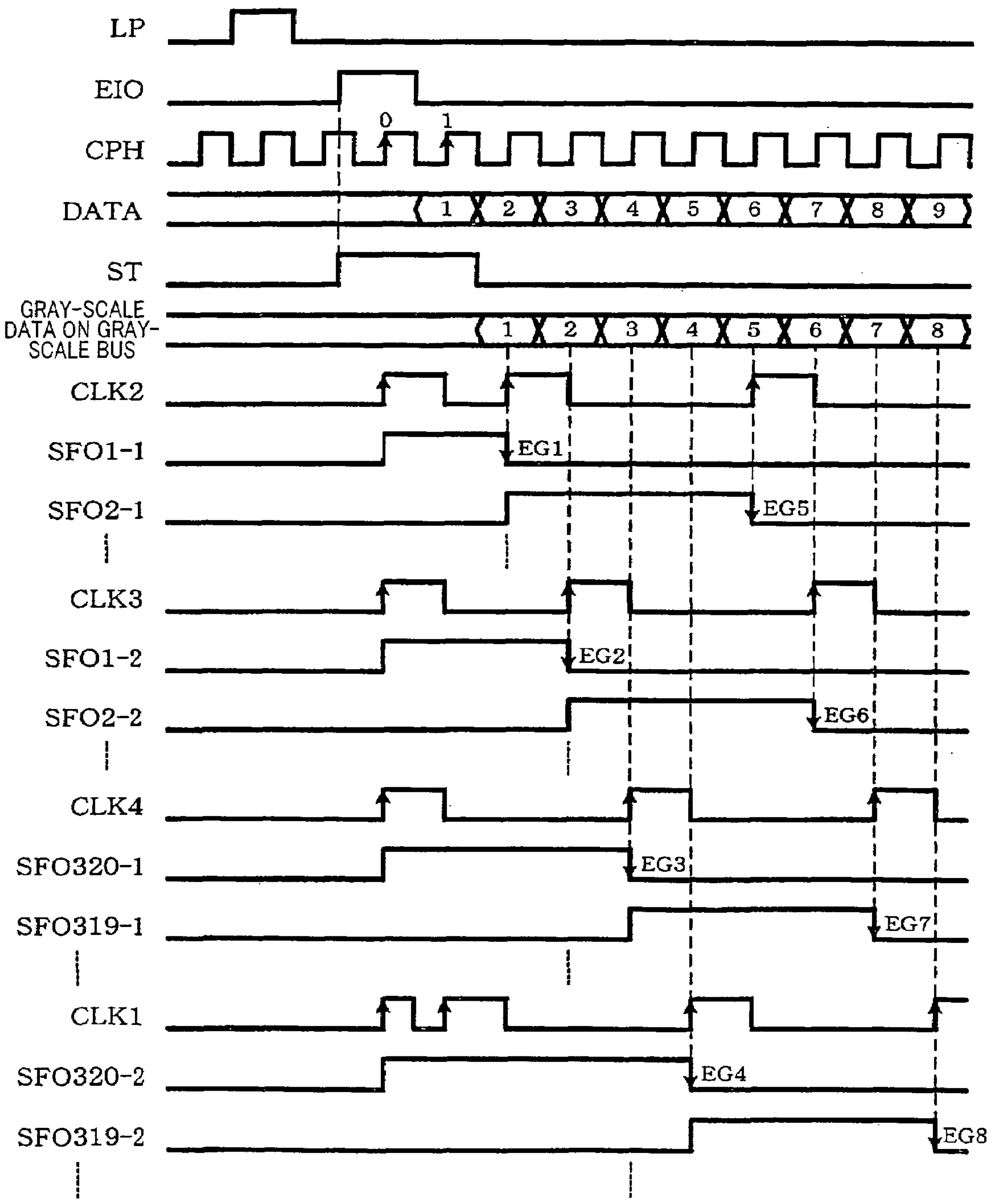
FIG. 33 is a timing diagram showing an operation example of a data latch when "1" is set in a capture start timing setting register in an embodiment of the present invention.

FIG. 33 shows another example of the operation timing chart of the data latch 300 of the display driver 200. In this example, “1” is set in the capture start timing setting register 384 in FIG. 32. Therefore, the first to fourth shift clock signals CLK1 to CLK4 are output to the clock signal lines according to the assignment content shown in FIG. 29.

The first data latch 340-1 belonging to the first group captures the gray-scale data D1 at a falling edge EGI of the shift output SFO1-1, and captures the gray-scale data D5 at a falling edge EG5 of the shift output SFO2-1, and so on, in the same manner as in FIG. 32.

The first data latch 340-2 belonging to the second group captures the gray-scale data D2 at a falling edge EG2 of the shift output SFO1-2, and captures the gray-scale data D6 at a falling edge EG6 of the shift output SFO2-2, and so on.

The second data latch 350-1 belonging to the first group captures the gray-scale data D3 at a falling edge EG3 of the shift output SFO320-1, and captures the gray-scale data D7 at a falling edge EG7 of the shift output SFO319-1, and so on.

The second data latch 350-2 belonging to the second group captures the gray-scale data D4 at a falling edge EG4 of the shift output SFO320-2, and captures the gray-scale data D8 at a falling edge EG8 of the shift output SFO319-2, and so on.

Figure 34:
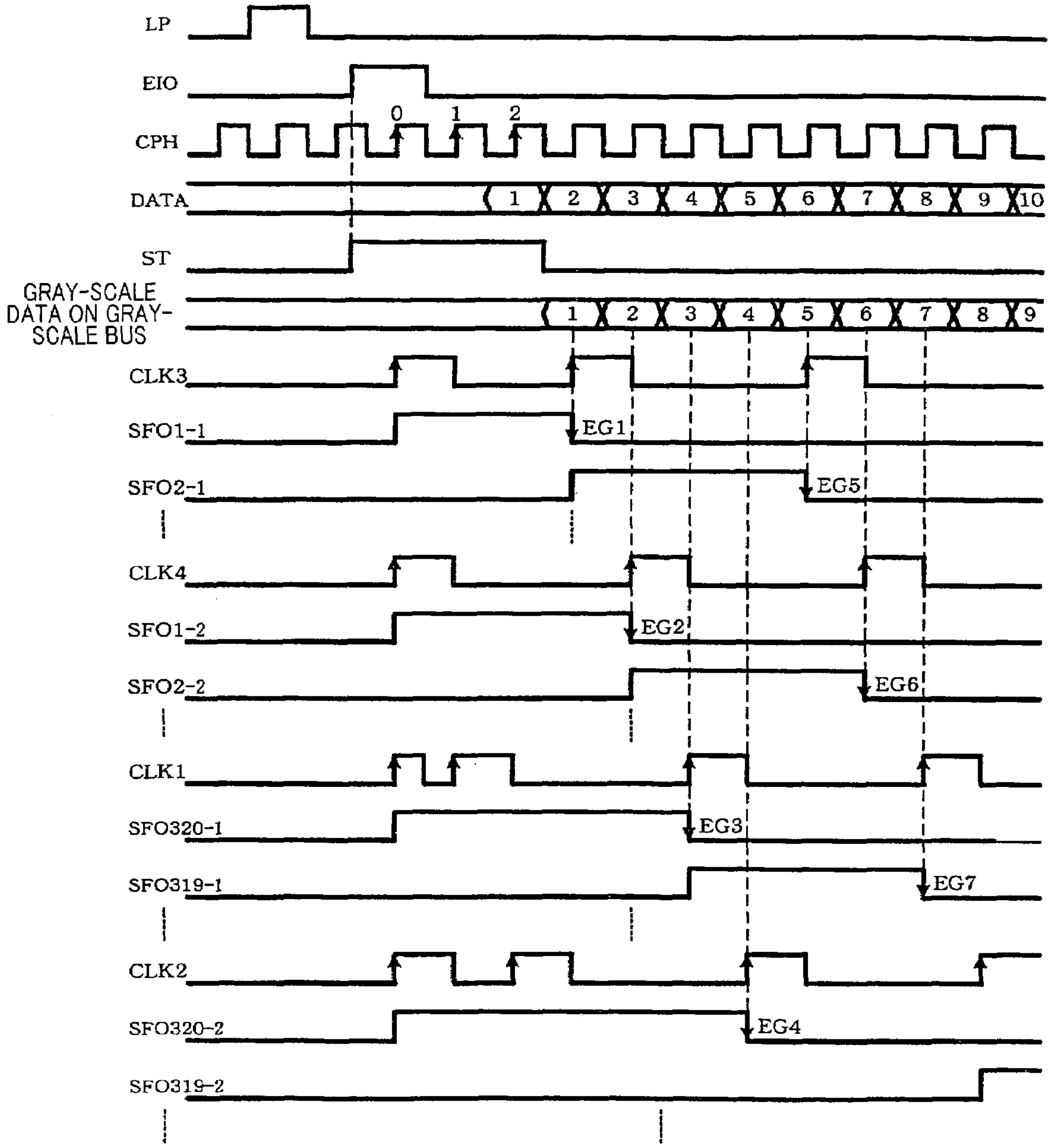
FIG. 34 is a timing diagram showing an operation example of a data latch when "2" is set in a capture start timing setting register in an embodiment of the present invention.

FIG. 34 shows another example of the operation timing chart of the data latch 300 of the display driver 200. In this example, "2" is set in the capture start timing setting register 384 in FIG. 32.

Figure 35:
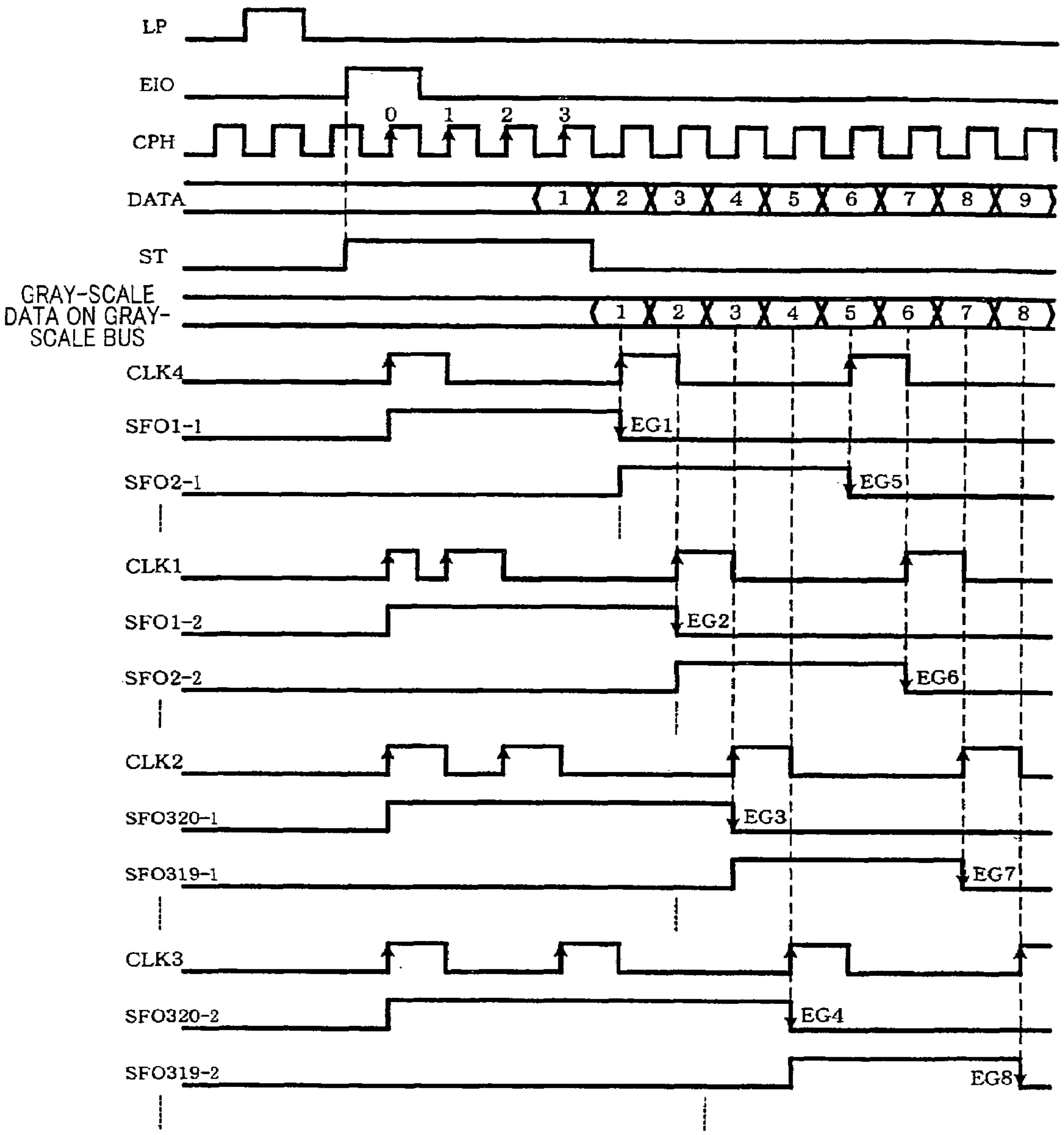
FIG. 35 is a timing diagram showing an operation example of a data latch when "3" is set in a capture start timing setting register in an embodiment of the present invention.

FIG. 35 shows yet another example of the operation timing chart of the data latch 300 of the display driver 200. In this example, "3" is set in the capture start timing setting register 384 in FIG. 32.

As shown in FIGS. 32 to 35, the gray-scale data can be captured in the arrangement order for performing six-dot multiplex drive as shown in FIG. 10, even if the interval between the capture start timing instruction signal EIO and the supply start timing of the gray-scale data is changed. Therefore, the gray-scale data can be captured while changing the arrangement order of the gray-scale data even if six-dot multiplex drive is performed for the electro-optical device 100 shown in FIG. 8, whereby a correct image can be displayed.

The present invention is not limited to the above-described embodiment. Various modifications and variations are possible within the spirit and scope of the present invention. The above embodiment is described taking as an example an active matrix type liquid crystal panel in which each pixel of the display panel includes a TFT. However, the present invention is not limited thereto. The present invention can also be applied to a passive matrix type liquid crystal panel. The present invention can be applied to a plasma display device in addition to the liquid crystal panel, for example.

Part of requirements of any claim of the present invention could be omitted from a dependent claim which depends on that claim. Moreover, part of requirements of any independent claim of the present invention could be made to depend on any other independent claim.

The following features are disclosed relating to the above-described embodiment.

One embodiment of the present invention provides a display driver which drives a plurality of data lines of an electro-optical device which includes a plurality of pixels, a plurality of scan lines, and the data lines, the display driver comprising:

a gray-scale bus to which gray-scale data is supplied;

a capture start timing setting register in which is set a period between a changing time of a given capture start timing instruction signal and a staring time of capturing the gray-scale data;

a shift start signal generation circuit which generates a shift start signal based on a setting state of the capture start timing setting register;

a shift register which includes a plurality of flip-flops, shifts the shift start signal based on a given shift clock signal, and outputs a shift output from each of the flip-flops;

a data latch which includes a plurality of flip-flops, each of which holds the gray-scale data on the gray-scale bus based on the shift output from the shift register; and a data line driver circuit which outputs a data signal corresponding to the gray-scale data held in the data latch to the data lines.

The capture start timing instruction signal is supplied from a controller connected with the display driver.

The period between the changing time of the capture start timing instruction signal and the starting time of capturing the gray-scale data or the staring time of supplying the gray-scale data may be set in the capture start timing setting register. In a broad sense, it suffices that the amount of time difference between the capture start timing instruction signal and the gray-scale data which is the capture target be set in the capture start timing setting register.

In this display driver, the gray-scale data is captured by the shift output obtained by shifting the shift start signal of which the changing time is changed corresponding to the content of the capture start timing setting register by providing the capture start timing setting register and the shift start signal generation circuit. Therefore, a display driver which normally displays an image based on the captured gray-scale data, even if the period between the capture start timing instruction signal output from the controller and the capture start timing (or supply start timing) of the gray-scale data depends on the type of the controller, can be provided.

Another embodiment of the present invention provides a display driver display driver which drives a plurality of data signal supply lines of an electro-optical device which includes a plurality of pixels, a plurality of scan lines, a plurality of data lines, the data signal supply lines, and a plurality of demultiplexers, the data lines including data line groups alternately distributed inward from two opposite sides of the electro-optical device in a shape of comb teeth, each of the data line groups consisting of 3×N numbers of the data lines (N is a natural number), each of the data signal supply lines transmitting multiplexed data in which N set of data signals for first to third color components is multiplexed, and each of the demultiplexers demultiplexing the multiplexed data and outputting one of the data signals for the first to third color components to each of the 3×N data lines, the display driver comprising:

a gray-scale bus to which gray-scale data for one of the first to third color components is supplied corresponding to an arrangement order of each of the data lines;

N first clock signal line being provided with one of 2×N shift clock signals and belonging to one of first to N-th groups;

N second clock signal line being provided with one of the 2×N shift clock signals and belonging to one of the first to N-th groups;

a capture start timing setting register in which is set a period between a changing time of a given capture start timing instruction signal and a staring time of capturing the gray-scale data;

a shift start signal generation circuit which generates a shift start signal based on a setting state of the capture start timing setting register;

a shift clock signal assignment circuit which assigns and outputs each of the 2×N shift clock signals to one of the first clock signal lines and one of the second clock signal lines based on a setting state of the capture start timing setting register;

N first shift register including a plurality of flip-flops, shifting the shift start signal in a first shift direction based on one of the shift clock signals, outputting a shift output from each of the flip-flops, and belonging to one of the first to N-th groups;

N second shift register including a plurality of flip-flops, shifting the shift start signal in a second shift direction opposite to the first direction based on one of the shift clock signals, outputting a shift output from each of the flip-flops in the second shift register, and belonging to one of the first to N-th groups;

N first data latch holding the gray-scale data on the gray-scale bus based on the shift output from the first shift register and belonging to one of the first to N-th groups;

N second data latch holding the gray-scale data on the gray-scale bus based on the shift output from the second shift register and belonging to one of the first to N-th groups;

a multiplexer which generates first multiplexed data in which N set of the gray-scale data held in the first data latch is multiplexed and second multiplexed data in which N set of the gray-scale data held in the second data latch is multiplexed; and a data-signal-supply-line driver circuit in which a plurality of data output sections are disposed corresponding to the arrangement order of each of the data lines, each of the data output sections outputting a data signal corresponding to the first or second multiplexed data to one of the data signal supply lines, wherein the first shift register belonging to a j-th group (1≦j≦N, j is an integer) among the first to N-th groups outputs the shift output based on one of the shift clock signals on the first clock signal line belonging to the j-th group, wherein the second shift register belonging to the j-th group outputs the shift output based on one of the shift clock signals on the second clock signal line belonging to the j-th group, wherein the first data latch belonging to the j-th group holds the gray-scale data based on the shift output from the first shift register belonging to the j-th group, and wherein the second data latch belonging to the j-th group holds the gray-scale data based on the shift output from the second shift register belonging to the j-th group.

In this display driver, the display driver can perform 3N-dot multiplex drive for the data signal supply lines of the electro-optical device having the comb-tooth distributed data lines. The display driver includes the N first data latch and the N second data latch, and captures the data on the gray-scale bus by using the clock signals separately set. The display driver generates the first multiplexed data in which the N set of gray-scale data captured by the N first data latch are multiplexed and the second multiplexed data in which the N set of gray-scale data captured by the N second data latch are multiplexed by using the multiplexer. The display driver drives each of the data signal supply lines based on the first or second multiplexed data by using one of the data output sections of the data-signal-supply-line driver circuit in which the data output sections are disposed corresponding to the arrangement order of each of the data lines of the electro-optical device as the drive target. The N first shift register and the N second shift register output the shift outputs obtained by shifting the shift start signal of which the changing time is changed corresponding to the content of the capture start timing setting register by providing the capture start timing setting register and the shift start signal generation circuit.

According to this display driver, even if the gray-scale data is supplied from a general-purpose controller corresponding to the arrangement order of each of the data lines of the electro-optical device as the drive target, the gray-scale data can be captured in the N first data latch and the N second data latch corresponding to the comb-tooth distribution by setting the clock signals in the order corresponding to the number N of sets of multiplexing. Therefore, a display driver which enables the mounting area to be reduced due to the comb-tooth distribution and the image quality to be improved by using LTPS can be provided. Moreover, an image based on the captured gray-scale data can be normally displayed, even if the period between the change of the capture start timing instruction signal output from the controller and the staring time of capturing (or starting time of supplying) the gray-scale data depends on the type of the controller, for example.

This display driver may include a line latch which latches N set of the gray-scale data held in the first data latch and N set of the gray-scale data held in the second data latch, and the multiplexer may generate the first multiplexed data in which the N set of gray-scale data from the first data latch among the gray-scale data held in the line latch is multiplexed, and may generate the second multiplexed data in which the N set of gray-scale data from the second data latch among the gray-scale data held in the line latch is multiplexed.

According to this display driver, since the gray-scale data is multiplexed by the multiplexer after capturing the gray-scale data in the line latch, the gray-scale data can be continuously captured without rewriting the preceding gray-scale data. Moreover, since the data lines can be driven after stabilizing the gray-scale data, deterioration of image quality can be prevented.

With this display driver, the data-signal-supply-line driver circuit may drive the data signal supply lines from a first side of the electro-optical device based on the first multiplexed data, and may drive the data signal supply lines from a second side of the electro-optical device based on the second multiplexed data, the second side being opposite to the first side.

According to this display driver, the mounting area for the display driver can be reduced.

This display driver may include a shift clock signal generation circuit which generates the 2×N shift clock signals based on a given reference clock signal, the gray-scale data may be supplied to the gray-scale bus in synchronization with the reference clock signal, and the 2×N shift clock signals may include a period in which the shift clock signals differ in phase.

With this display driver, the 2×N shift clock signals may include a given pulse in a first stage capture period for capturing the shift start signal in each of the first and second shift registers, and may differ in phase in a data capture period after the first stage capture period has elapsed.

According to this display driver, generation of the 2×N shift clock signals can be simplified and the shift start signals output to each shift register may have the same phase. Therefore, the configuration and control of the display driver can be simplified.

With this display driver, the shift clock signal assignment circuit may output the 2×N shift clock signals to one of the N first clock signal line and the N second clock signal line corresponding to number of a given reference clock signal between the changing time of the capture start timing instruction signal and the staring time of capturing the gray-scale data.

According to this display driver, a display driver which can properly display an image by performing 3N-dot multiplex drive for the comb-tooth distributed data lines, even if the gray-scale data is supplied from various controllers in which the period between the capture start timing instruction signal and the supply start timing of the gray-scale data is not constant, can be provided.

With this display driver, when the number of the reference clock signal at a rising edge or a falling edge of the reference clock signal immediately after the changing time of the capture start timing instruction signal is "0", the shift clock signal assignment circuit may output the 2×N shift clock signals to one of the N first clock signal line and the N second clock signal line depending on whether the number of the reference clock signal between the changing time of the capture start timing instruction signal and the starting time of capturing the gray-scale data is an even number or an odd number.

According to this display driver, a display driver which can properly display an image by performing three-dot multiplex drive for the comb-tooth distributed data lines, even if the gray-scale data is supplied from various controllers in which the period between the capture start timing instruction signal and the supply start timing of the gray-scale data is not constant, can be provided.

With, this display driver, a direction from a first side to a second side of the electro-optical device in which the data lines extend may be the same as one of the first and second shift directions, the second side being opposite to the first side.

With, any of these display drivers, when a direction in which the scan lines extend is a long side and a direction in which the data lines extend is a short side, the display driver may be disposed along the short side of the electro-optical device.

According to any of these display drivers, the mounting area of the comb-tooth distributed electro-optical device can be reduced as the number of data lines is increased.

A further embodiment of the present invention provides an electro-optical device including:

a plurality of pixels;

a plurality of scan lines;

a plurality of data lines, the data lines including data line groups alternately distributed inward from two opposite sides of the electro-optical device in a shape of comb teeth, and each of the data line groups consisting of 3×N numbers of the data lines (N is a natural number);

a plurality of data signal supply lines, each of the data signal supply lines transmitting multiplexed data in which N set of data signals for first to third color components is multiplexed;

a plurality of demultiplexers, each of the demultiplexers demultiplexing the multiplexed data and outputting one of the data signals for the first to third color components to each of the 3×N data lines; and the display driver as defined in claim 2 which drives the data signal supply lines.

A still further embodiment of the present invention provides an electro-optical device including:

a display panel including:

a plurality of pixels;

a plurality of scan lines;

a plurality of data lines, the data lines including data line groups alternately distributed inward from two opposite sides of the electro-optical device in a shape of comb teeth, and each of the data line groups consisting of 3×N numbers of the data lines (N is a natural number);

a plurality of data signal supply lines, each of the data signal supply lines transmitting multiplexed data in which N set of data signals for first to third color components is multiplexed; and a plurality of demultiplexers, each of the demultiplexers demultiplexing the multiplexed data and outputting one of the data signals for the first to third color components to each of the 3×N data lines, and the display driver as defined in claim 2 which drives the data signal supply lines.

According to the above electro-optical devices, an electro-optical device which can perform 3N-dot multiplex drive for comb-tooth distributed data lines independent of the supply timing of the gray-scale data can be provided.

What is claimed is:

1. A display driver which drives a plurality of data lines of an electro-optical device which includes a plurality of pixels, a plurality of scan lines, and the data lines, the display driver comprising:

a gray-scale bus to which gray-scale data is supplied;

a capture start timing setting register in which is set a period between a changing time of a given capture start timing instruction signal and a starting time of capturing the gray-scale data;

a shift start signal generation circuit which generates a shift start signal based on a setting state of the capture start timing setting register;

a shift register which includes a plurality of flip-flops, shifts the shift start signal based on a given shift clock signal, and outputs a shift output from each of the flip-flops;

a data latch which includes a plurality of flip-flops, each of which holds the gray-scale data on the gray-scale bus based on the shift output from the shift register; and a data line driver circuit which outputs a data signal corresponding to the gray-scale data held in the data latch to the data lines.

2. A display driver which drives a plurality of data signal supply lines of an electro-optical device which includes a plurality of pixels, a plurality of scan lines, a plurality of data lines, the data signal supply lines, and a plurality of demultiplexers, the data lines including data line groups alternately distributed inward from two opposite sides of the electro-optical device in a shape of comb teeth, each of the data line groups consisting of 3×N numbers of the data lines (N is a natural number), each of the data signal supply lines transmitting multiplexed data in which N set of data signals for first to third color components is multiplexed, and each of the demultiplexers demultiplexing the multiplexed data and outputting one of the data signals for the first to third color components to each of the 3×N data lines, the display driver comprising:

a gray-scale bus to which gray-scale data for one of the first to third color components is supplied corresponding to an arrangement order of each of the data lines;

N first clock signal line being provided with one of 2×N shift clock signals and belonging to one of first to N-th groups;

N second clock signal line being provided with one of the 2×N shift clock signals and belonging to one of the first to N-th groups;

a capture start timing setting register in which is set a period between a changing time of a given capture start timing instruction signal and a starting time of capturing the gray-scale data;

a shift start signal generation circuit which generates a shift start signal based on a setting state of the capture start timing setting register;

a shift clock signal assignment circuit which assigns and outputs each of the 2×N shift clock signals to one of the first clock signal lines and one of the second clock signal lines based on a setting state of the capture start timing setting register;

N first shift register including a plurality of flip-flops, shifting the shift start signal in a first shift direction based on one of the shift clock signals, outputting a shift output from each of the flip-flops, and belonging to one of the first to N-th groups;

N second shift register including a plurality of flip-flops, shifting the shift start signal in a second shift direction opposite to the first direction based on one of the shift clock signals, outputting a shift output from each of the flip-flops in the second shift register, and belonging to one of the first to N-th groups;

N first data latch holding the gray-scale data on the gray-scale bus based on the shift output from the first shift register and belonging to one of the first to N-th groups;

N second data latch holding the gray-scale data on the gray-scale bus based on the shift output from the second shift register and belonging to one of the first to N-th groups;

a multiplexer which generates first multiplexed data in which N set of the gray-scale data held in the first data latch is multiplexed and second multiplexed data in which N set of the gray-scale data held in the second data latch is multiplexed; and a data-signal-supply-line driver circuit in which a plurality of data output sections are disposed corresponding to the arrangement order of each of the data lines, each of the data output sections outputting a data signal corresponding to the first or second multiplexed data to one of the data signal supply lines, wherein the first shift register belonging to a j-th group ($1 \leqq j \leqq N$, j is an integer) among the first to N-th groups outputs the shift output based on one of the shift clock signals on the first clock signal line belonging to the j-th group, wherein the second shift register belonging to the j-th group outputs the shift output based on one of the shift clock signals on the second clock signal line belonging to the j-th group, wherein the first data latch belonging to the j-th group holds the gray-scale data based on the shift output from the first shift register belonging to the j-th group, and wherein the second data latch belonging to the j-th group holds the gray-scale data based on the shift output from the second shift register belonging to the j-th group.

3. The display driver as defined in claim 2, comprising:

a line latch which latches N set of the gray-scale data held in the first data latch and N set of the gray-scale data held in the second data latch, wherein the multiplexer generates the first multiplexed data in which the N set of gray-scale data from the first data latch among the gray-scale data held in the line latch is multiplexed, and generates the second multiplexed data in which the N set of gray-scale data from the second data latch among the gray-scale data held in the line latch is multiplexed.

4. The display driver as defined in claim 2, wherein the data-signal-supply-line driver circuit drives the data signal supply lines from a first side of the electro-optical device based on the first multiplexed data, and drives the data signal supply lines from a second side of the electro-optical device based on the second multiplexed data, the second side being opposite to the first side.

5. The display driver as defined in claim 3, wherein the data-signal-supply-line driver circuit drives the data signal supply lines from a first side of the electro-optical device based on the first multiplexed data, and drives the data signal supply lines from a second side of the electro-optical device based on the second multiplexed data, the second side being opposite to the first side.

6. The display driver as defined in claim 2, comprising:

a shift clock signal generation circuit which generates the 2×N shift clock signals based on a given reference clock signal, wherein the gray-scale data is supplied to the gray-scale bus in synchronization with the reference clock signal, and wherein the 2×N shift clock signals include a period in which the shift clock signals differ in phase.

7. The display driver as defined in claim 3, comprising:

a shift clock signal generation circuit which generates the 2×N shift clock signals based on a given reference clock signal, wherein the gray-scale data is supplied to the gray-scale bus in synchronization with the reference clock signal, and wherein the 2×N shift clock signals include a period in which the shift clock signals differ in phase.

8. The display driver as defined in claim 4, comprising:

a shift clock signal generation circuit which generates the 2×N shift clock signals based on a given reference clock signal, wherein the gray-scale data is supplied to the gray-scale bus in synchronization with the reference clock signal, and wherein the 2×N shift clock signals include a period in which the shift clock signals differ in phase.

9. The display driver as defined in claim 6, wherein the 2×N shift clock signals include a given pulse in a first stage capture period for capturing the shift start signal in each of the first and second shift registers, and differ in phase in a data capture period after the first stage capture period has elapsed.

10. The display driver as defined in claim 7, wherein the 2×N shift clock signals include a given pulse in a first stage capture period for capturing the shift start signal in each of the first and second shift registers, and differ in phase in a data capture period after the first stage capture period has elapsed.

11. The display driver as defined in claim 8, wherein the 2×N shift clock signals include a given pulse in a first stage capture period for capturing the shift start signal in each of the first and second shift registers, and differ in phase in a data capture period after the first stage capture period has elapsed.

12. The display driver as defined in claim 2, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

13. The display driver as defined in claim 3, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

14. The display driver as defined in claim 4, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

15. The display driver as defined in claim 5, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

16. The display driver as defined in claim 6, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

17. The display driver as defined in claim 7, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

18. The display driver as defined in claim 8, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

19. The display driver as defined in claim 9, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

20. The display driver as defined in claim 10, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

21. The display driver as defined in claim 11, wherein the shift clock signal assignment circuit outputs the 2×N shift clock signals to one of the N first clock signal line and the N second clock signal line corresponding to number of a given reference clock signal between the changing time of the capture start timing instruction signal and the staring time of capturing the gray-scale data.

22. The display driver as defined in claim 12, wherein, when the number of the reference clock signal at a rising edge or a falling edge of the reference clock signal immediately after the changing time of the capture start timing instruction signal is “0”, the shift clock signal assignment circuit outputs the 2×N shift clock signals to one of the N first clock signal line and the N second clock signal line depending on whether the number of the reference clock signal between the changing time of the capture start timing instruction signal and the starting time of capturing the gray-scale data is an even number or an odd number.

23. The display driver as defined in claim 13, wherein, when the number of the reference clock signal at a rising edge or a falling edge of the reference clock signal immediately after the changing time of the capture start timing instruction signal is “0”, the shift clock signal assignment circuit outputs the 2×N shift clock signals to one of the N first clock signal line and the N second clock signal line depending on whether the number of the reference clock signal between the changing time of the capture start timing instruction signal and the starting time of capturing the gray-scale data is an even number or an odd number.

24. The display driver as defined in claim 2, wherein a direction from a first side to a second side of the electro-optical device in which the data lines extend is the same as one of the first and second shift directions, the second side being opposite to the first side.

25. The display driver as defined in claim 1, wherein, when a direction in which the scan lines extend is a long side and a direction in which the data lines extend is a short side, the display driver is disposed along the short side of the electro-optical device.

26. The display driver as defined in claim 2, wherein, when a direction in which the scan lines extend is a long side and a direction in which the data lines extend is a short side, the display driver is disposed along the short side of the electro-optical device.

27. An electro-optical device comprising:

a plurality of pixels;

a plurality of scan lines;

a plurality of data lines, the data lines including data line groups alternately distributed inward from two opposite sides of the electro-optical device in a shape of comb teeth, and each of the data line groups consisting of 3×N numbers of the data lines (N is a natural number);

a plurality of data signal supply lines, each of the data signal supply lines transmitting multiplexed data in which N set of data signals for first to third color components is multiplexed;

a plurality of demultiplexers, each of the demultiplexers demultiplexing the multiplexed data and outputting one of the data signals for the first to third color components to each of the 3×N data lines; and the display driver as defined in claim 2 which drives the data signal supply lines.

28. An electro-optical device comprising:

a display panel including:

a plurality of pixels;

a plurality of scan lines;

a plurality of data lines, the data lines including data line groups alternately distributed inward from two opposite sides of the electro-optical device in a shape of comb teeth, and each of the data line groups consisting of 3×N numbers of the data lines (N is a natural number);

a plurality of data signal supply lines, each of the data signal supply lines transmitting multiplexed data in which N set of data signals for first to third color components is multiplexed; and a plurality of demultiplexers, each of the demultiplexers demultiplexing the multiplexed data and outputting one of the data signals for the first to third color components to each of the 3×N data lines, and the display driver as defined in claim 2 which drives the data signal supply lines.

* * * * *